(12) United States Patent
Nakamura et al.

(10) Patent No.: US 7,283,683 B1
(45) Date of Patent: Oct. 16, 2007

(54) IMAGE PROCESSING DEVICE AND IMAGE PROCESSING METHOD

(75) Inventors: Mitsuaki Nakamura, Tenri (JP); Keisuke Iwasaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/600,936

(22) PCT Filed: Nov. 20, 1998

(86) PCT No.: PCT/JP98/05228

§ 371 (c)(1),
(2), (4) Date: Oct. 3, 2000

(87) PCT Pub. No.: WO99/38319

PCT Pub. Date: Jul. 29, 1999

(30) Foreign Application Priority Data

Jan. 23, 1998 (JP) .............................. P10-011645

(51) Int. Cl.
*G06K 9/40* (2006.01)
*G06K 9/34* (2006.01)

(52) U.S. Cl. ...................... 382/274; 382/263; 382/176

(58) Field of Classification Search ................ 382/274, 382/263, 176
See application file for complete search history.

(56) References Cited

U.S. PATENT DOCUMENTS 5,028,782 A * 7/1991 Nakajima .................. 250/587
5,608,819 A 3/1997 Ikeuchi
5,684,600 A 11/1997 Miyazaki et al.
5,687,252 A * 11/1997 Kanno et al. ............... 382/176

(Continued)

FOREIGN PATENT DOCUMENTS

EP        0 435 658 A2      7/1991

(Continued)

OTHER PUBLICATIONS

"Selective Image Sharpening", Image Analysis Handbook. University of Tokyo Press Jan. 17 1991, p. 549.*

(Continued)

*Primary Examiner*—Matthew C. Bella
*Assistant Examiner*—Wes Tucker
(74) *Attorney, Agent, or Firm*—David G. Conlin; Peter J. Manus; Edwards Angell Palmer & Dodge LLP

(57) ABSTRACT

In an image processing device, in order to display an image on a display device having nonlinear gradation characteristics, first, a contrast estimation unit (37) estimates the contrast of the image represented by the image data (51) input from an image input device. Next, a luminance correction unit (38) subjects the pixel data constituting the image data (51) to a luminance conversion process on the basis of the estimated contrast and the gradation characteristics. Furthermore, the pixel data may sometimes be subjected to a sharpening process. The level of the sharpening performed for one or a plurality of character regions in the image represented by the image data (51) is higher than that for the pixel data of the pixels in remaining regions other than the character regions in the image. The image data (52) comprising the pixel data subjected to these processes is supplied to the display device. Therefore, the visibility of the image displayed on the display device can be improved.

28 Claims, 21 Drawing Sheets

U.S. PATENT DOCUMENTS

| | | | |
|---|---|---|---|
| 5,742,703 A * | 4/1998 | Lin et al. | 382/176 |
| 5,801,791 A * | 9/1998 | Yamazaki et al. | 348/629 |
| 5,848,181 A * | 12/1998 | Ogata | 382/169 |
| 5,982,926 A * | 11/1999 | Kuo et al. | 382/167 |
| 6,035,061 A * | 3/2000 | Katsuyama et al. | 382/177 |
| 6,201,893 B1 * | 3/2001 | Shiraiwa et al. | 382/167 |
| 6,240,206 B1 * | 5/2001 | Tokuyama et al. | 382/176 |
| 6,246,780 B1 * | 6/2001 | Sato | 382/107 |
| 6,266,439 B1 * | 7/2001 | Pollard et al. | 382/164 |
| 6,271,934 B1 * | 8/2001 | Hayashi | 358/1.9 |
| 6,486,863 B1 * | 11/2002 | Doihara et al. | 345/89 |
| 2003/0174887 A1 * | 9/2003 | Oh et al. | 382/168 |

FOREIGN PATENT DOCUMENTS

| | | |
|---|---|---|
| EP | 0 645 737 A | 3/1995 |
| EP | 0768792 A2 * | 4/1997 |
| JP | 61276071 A * | 12/1986 |
| JP | A 61-276071 | 12/1986 |
| JP | A 63-039280 | 2/1988 |
| JP | 3-126180 | 5/1991 |
| JP | A 03-201772 | 9/1991 |
| JP | A 05-167852 | 7/1993 |
| JP | 6-131455 | 5/1994 |
| JP | A-63-08924 | 11/1994 |
| JP | A 07-240841 | 9/1995 |
| JP | 9-91419 | 4/1997 |
| JP | A 09-212642 | 8/1997 |

OTHER PUBLICATIONS

"The Photographs dont' look good! What's wrong?", http://www.lenswork.com/calibrate.htm, Aug. 27, 2000.*

* cited by examiner

IMAGE PROCESSING DEVICE AND IMAGE PROCESSING METHOD

TECHNICAL FIELD

The present invention relates to an image processing device and method for displaying images on display means having biased gradation characteristics.

BACKGROUND ART

In recent years, so-called electronic publishing has been proposed as a technique for issuing publications. Electronic publications published by the electronic publishing comprise sentence data representing sentences and image data representing images such as illustrations, and are memorized on memory media. A reader prepares a device provided with a memory medium reading device and a display device in advance, and loads the memory medium into the reading device. The image data and the sentence data on the memory medium are read by the reading device and supplied to the display device. The image represented by the image data is displayed on the display screen of the display device. The sentence data is first converted into image data by using character fonts provided in the display device in advance, and the image represented by the image data after the conversion is displayed on the display screen of the display device.

A liquid crystal display device and a cathode ray tube are taken as examples of the display device. The display screen of the display device comprises a plurality of display pixels arranged in matrix. The image comprises a plurality of display pixels arranged in matrix. The image data comprises pixel data representing the luminance of each of pixels constituting the image. The display device illuminates each display pixel at the luminance depending on the pixel data. As a result, the image represented by the image data is displayed on the display screen.

At present, many electronic publications are data forms of published books, that is, contents. Therefore, in the case of generating the electronic publications, the sentence data and the image data are frequently generated by using the contents. In order to generate the electronic publications by using the contents, first, each page of the contents is separated into a portion on which sentences are printed and a portion on which pictures are printed. Next, the portion on which pictures are printed is read by a scanner whereby the image data is generated. Then, the portion on which sentences are printed is read by the scanner whereby image data is generated, and the image data is subjected to a character recognition process whereby the sentence data is generated.

In the case of generating the sentence data in accordance with the procedure, wrong characters and missing characters may occur in the sentences represented by the sentence data owing to recognition errors and the like during the character recognition process. Therefore, it is necessary to proofread the sentences represented by the sentence data once again at the step of generating the sentence data, although the sentences have already been proofread at the step of generating the contents. As a result, the sentences are proofread twice, whereby the generation of the sentence data takes time and labor, and the cost of generating the sentence data increases.

In addition, since the sentence data is the so-called text data for example, each character constituting the sentences is represented by a character code in the sentence data. Therefore, in the case of displaying the sentences represented by the sentence data on the display device, each character of the sentences is represented by a font provided in the display device. For this reason, the font used in the case of displaying the character on the display device may differ from the font used in the case of printing the character on each page of the contents. As a result, the impression of the appearance of the sentences displayed on the display device may differ from that of the sentences printed on each page of the contents, and this difference may make readers feel uncomfortable.

In order to save time and labor for proofreading and to maintain the impression of the appearance of the sentences printed on each page of the contents, it is considered that each page of the contents is not separated into sentences and pictures, but it is assumed to be a single picture. In this case, an electronic publication comprises image data representing each entire page of the contents, and the image data is generated by reading each page of the contents by using the scanner. At this time, the following three problems occur.

As a first problem, in the case of generating the image data by reading each page of the contents by using the scanner, the contrast of the image represented by the image data is not necessarily the maximum contrast in conformity with the standard of the image data. This occurs because the color of the background of each page of the contents is not necessarily true white, and because the color of the ink is not necessarily true black. In addition, this also occurs owing to the characteristics of the scanner. In the case where an image with a low contrast is displayed on the display device, it may be difficult to read characters. In the case where the display device itself has a low contrast, the visibility of the characters in the image displayed on the display screen is likely to become lower in comparison with the image having the maximum contrast in conformity with the standard of the image data. The image having a low contrast is an image wherein the color of the pixels at the background portion in the image is a color other than true white, such as cream, and the color of the pixels constituting the characters in the image is a color other than true black, such as dark brown as shown in FIG. 23A. The image having the maximum contrast is an image wherein the color of the pixels at the background portion in the image is true white and the color of the pixels constituting the characters in the image is true black as shown in FIG. 23B.

Japanese Unexamined Patent Publication JP-A 63-39280 (1988) has proposed an image processing device for raising the contrast of an image by using a gamma correction process in the case where the gradation of the image is the so-called halftone, that is, when the gradation concentrates on gray, that is, when the contrast of the image is low. In the image processing device in accordance with the present publication, gamma conversion tables individually corresponding to the gradation distributions of a plurality of images have been memorized in a RAM beforehand. When an image to be processed is supplied, the image processing device first detects the gradation distribution of the image and reads one of the gamma conversion tables corresponding to the detected graduation distribution from the RAM. By using the gamma conversion table having been read, the image is subjected to gamma correction. In the image processing device of the present publication, the image processing device of the present publication estimates the gradation distribution of an image to be processed in advance, and the gamma conversion table is generated in accordance with the estimated gradation distribution. Therefore, in the case of processing an image having an unestimated gradation distribution, any gamma table corresponding to the gradation distribution of the image is not available, whereby it is difficult to raise the contrast of the image.

As a second problem, the visibility of an image displayed on the display screen of the display device lowers owing to the fact that the resolution of image data does not coincide with the resolution of the display device. This second problem will be explained below. In the display screen of the display device, generally speaking, a plurality of display pixels are arranged in matrix as shown in FIG. 24, and its resolution differs depending on the number of the display pixels. FIG. 24A is a schematic view showing the whole of the display screen 1, and FIG. 24B is a magnified schematic view showing the portion 2 of the display screen 1. In the following drawings, a pixel and a display pixel are respectively represented by a square, and the luminance of the pixel and the display pixel is represented by the number of oblique lines in the square. The higher the luminance of the pixel and the display pixel, the fewer the number of the oblique lines.

Generally, the resolution of the display device is lower than the resolution of the scanner and the resolution of the printing of the contents. Therefore, small characters formed of dots and lines smaller than the size of the display pixel have been printed as the contents. The small characters cannot be displayed basically on the display screen; however, in the case where the so-called monochrome halftone is used, they can be displayed in a pseudo way. In order to display the small characters by using the monochrome halftone, the luminance of each display pixel is set at the mean value of the luminance of the background in the portion in the contents corresponding to each display pixel and the luminance of a character portion in the portion.

In the case where the small characters are displayed by using the monochrome halftone, a person who watches the display screen feels that the small characters are smoothly displayed, without being conscious of the display pixels, and receives the impression that the small dots and lines are blurred. This is because of the following reason. As shown in FIG. 25A, in the case where the width of the line segments constituting a character 4 drawn in the contents 3 and the size of dots constituting the character 4 are not larger than the size of a display pixel 5, each luminance value of the plurality of display pixels 5 including at least portions of the line segments and dots is determined depending on the ratio of the area of each display pixel 5 and the least portions. In other words, in this case, the luminance of the least portion is distributed to the whole of the display pixel 5. Therefore, the luminance of the display pixel 5 becomes lowered than the luminance of the least portion as shown in FIG. 25B. Accordingly, the small characters give blurred impression.

The image giving blurred impression because of the reason can be converted into an easy-to-see image without blurs by carrying out a sharpening process using the so-called Laplacian. Japanese Unexamined Patent Publications JP-A 5-167852 (1993) and JP-A 7-240841 (1995) are available as conventional technologies regarding the sharpening process.

JP-A 5-167852 has, in the case of carrying out the sharpening process for an image, proposed an image sharpening method for preventing the portions having flat luminance changes in the image from becoming coarse. In the case of carrying out the image sharpening process, first, the second-order differentiation value of the luminance of each of pixels of the image to be processed is obtained as the sharpening evaluation function of each pixel. Next, a coefficient representing the sharpening level of each pixel is determined depending on the sharpening evaluation function of each of the pixels. The sharpening process using the coefficient is carried out for each of the pixels.

In the case of paying attention to the edges of characters in the image and carrying out the sharpening process to enhance the sharpening levels of the edgy portions, the small characters themselves in the image may collapse and the their edges are less likely to be intensified, whereby the sharpening levels of the characters portions in the image are likely to become low. In addition, in the case, the edges of large characters or line segments are intensified at their edges; however, if the sharpening levels of the large characters and line segments are intensified, the line segments become unsmooth and have the so-called jaggies conspicuously. Therefore, in the case of using the sharpening process, it is difficult to make small characters easy to read.

In addition, JP-A 7-240841 has proposed an image sharpening processing device for obtaining the same processing result in the case of subjecting an image to the sharpening process, regardless of the image deteriorating characteristics of the scanner used to generate image data. First, the image sharpening processing device calculates a coefficient for representing the sharpening level of the sharpening process by using scanner characteristic parameters determined on the basis of the MTF of the scanner. Next, the sharpening process using the coefficient is carried out for the image to be processed.

For example, when the image shown in FIG. 26A is subjected to the sharpening process described in the publication, the image shown in FIG. 26B is obtained. If the level of the sharpening is excessive in this case, the luminance distribution of the image becomes close to that of a binary image, whereby the smoothness of characters displayed by using the monochrome halftone is lost. Therefore, in the case of using the sharpening process to carry out uniform sharpening for the whole of an image without considering characters and pictures as explained in the publication, it is difficult to make the small characters easy to read.

Furthermore, Japanese Unexamined Patent Publication JP-A 6-308924 (1994) has proposed a display device for clearly defining the boundary between two different color portions in an image in the case where the image is displayed on a display device. The display screen of the display device comprises a plurality of dots arranged in matrix, and the color of each dot is determined by a plurality of data items in image data representing the image. In the case where data for determining the colors of a plurality of dots constituting a given row or a given column on the display screen is arranged in the same order as that of the dots, if a plurality of data items for dots having the same color are arranged, the data at the most end of the plurality of data items is converted into data for determining the color of dots to black. In the case where the process is used for the image data constituting the electronic publication, the pixel data for determining the color of pixels used to represent the small characters is scarcely converted into data for determining the color of dots to black, since the pixel data is not so much different in luminance from the pixel data for determining the color of the pixels around the small characters because of luminance distribution. Therefore, it is difficult to make the small characters easy to read.

A third problem is that the visibility of an image displayed on the display screen lowers because of the biased gradation characteristics of the display device. This will be described below specifically. The gradation characteristics of the display device are defined as the relationship between the luminance represented by pixel data and the luminance of the display pixels, and more specifically, represent how the luminance of the display pixels illuminated depending on the pixel data changes as the luminance represented by the pixel data changes. The gradation characteristics of the display device are generally nonlinear in many cases.

The gradation characteristics are represented by a gradation characteristic curve 11 in a graph in which the abscissa is the luminance represented by pixel data and the ordinate is the luminance of the display pixels as shown in FIG. 27 for example. The gradation characteristics are better as the gradation characteristic curve 11 is closer to a reference straight line 12 passing through the origin and having an inclination of 45 degrees. The gradation characteristic curve 11 of FIG. 27 is obtained by plotting the luminance of the plurality of display pixels on the imaginary line segment 13 of the image of FIG. 28 displayed on the display device and a plurality of pixel data items for respectively determining the luminance of the pixels. The pixel data is incremented sequentially by a predetermined value in the left-to-right arrangement order of the display pixels.

To correct the gradation characteristics, the image processing device including the display device is provided with a luminance correction table depending on the gradation characteristics. The luminance conversion curve 14 shown in FIG. 29 represents the relationship between the input luminance and the output luminance of the luminance correction table depending on the gradation characteristics represented by the gradation characteristic curve 11 of FIG. 27. In the case where an image to be displayed is subjected to a gradation correction process, the luminance of each pixel of the image is replaced with the output luminance in the luminance correction table corresponding to the input luminance in the luminance correction table, being equal to the luminance of each of the pixels. In the case where the image subjected to the gradation correction process is displayed on the display device, the curve 15 of FIG. 30 represents the relationship between the luminance of the image and the luminance of the display pixels of the display device. As shown in the graph of FIG. 30, in the case, the curve 15 coincides with the reference straight line 12.

Furthermore, for the gradation characteristic correction, the image processing device is provided with a gamma correction table corresponding to the gradation characteristics of the display device. The luminance conversion curve 16 in the graph of FIG. 31 represents the relationship between the input luminance and the output luminance in the gamma correction table corresponding to the gradation characteristics represented by the gradation characteristic curve 11 of FIG. 27. In the case where the image is subjected to the gamma correction process, the luminance of each pixel of the image is replaced with the output luminance in the gamma correction table corresponding to the input luminance values in the gamma correction table, being equal to the luminance of each of the pixels. In the case where the image subjected to the gamma correction process is displayed on the display device, the curve 17 of FIG. 32 represents the relationship between the luminance of the image and the luminance of the display pixels of the display device. As shown in the graph of FIG. 32, in the case, the curve 17 nearly coincides with the reference straight line 12.

In the case where the gradation characteristics of the display device are biased, that is, nonlinear, the image displayed on the display screen becomes harder to see as the gradation characteristic curve 11 is more remote from the reference straight line 12. The change in the visibility of an image depending on the bias of the gradation characteristics is inconspicuous in the case when the image is the so-called gray-scale image, that is a picture; however, the change becomes conspicuous in the case where the small characters are drawn in the image. In the latter case, as the gradation characteristics are more biased, the balance of the ratio between the black portion and the white portion in the region in the image displayed on the display screen, in which the small characters are described, appears to be lost from its original balance. For example, if the image shown in FIG. 33A is subjected to the gradation correction process, the image shown in FIG. 33B is obtained. In this way, a plurality of pixels which should have the same density to represent lines having the same thickness may become faint or dense partially in the region. Therefore, the characters in the region become hard to see because of unevenness. In particular, in the case where the display device is a liquid crystal display device, white small regions are likely to collapse in general; and when the image is displayed, the small characters fade in many cases.

As described above, the image processing device has the three problems. In addition, even when the conventional technologies proposed in the publications are applied to the image processing device, it is difficult to solve the first and second problems. Furthermore, a display device, the bias of the gradation characteristics of which can be adjusted by a user as desired to solve the third problem, is rarely available; for this reason, it is further difficult to solve the third problem.

An object of the invention is to provide an image processing device and an image processing method capable of preventing the reduction of the visibility of an image owing to the bias of the gradation characteristics, the contrast of the image and the resolution of the image.

DISCLOSURE OF INVENTION

An image processing device of a first invention comprises:

display means having predetermined gradation characteristics, image input means for inputting an image composed of a plurality of pixels, contrast estimation means for estimating contrast of the image, and luminance correction means for raising the contrast of the image on the basis of estimated contrast and correcting luminance of each of pixels constituting the image based on the gradation characteristics, wherein the display means displays the image in which the luminance of each of the pixels has been corrected by the luminance correction means.

In accordance with the invention, the luminance conversion means in the image processing device carries out the conversion of the luminance of each of pixels constituting the image in consideration of not only the gradation characteristics of the display means but also the estimated contrast. Therefore, the image processing device can always improve the contrast of the image regardless of how high contrast the image has. At the same time, the characters drawn in the image displayed on the display means become easy to read regardless of the bias of the gradation characteristics of the display means. Therefore, in the case where the image is displayed on the display means, the reduction in visibility of the image owing to both the contrast of the image and the gradation characteristics of the display means can be prevented. Furthermore, a change in luminance distribution between the image input from the image input means and the image to be displayed on the display means owing to the gradation characteristics of the display means does not occur. Therefore, the reproducibility of the image can be improved.

Furthermore, an image processing device of a second invention comprises:

display means having predetermined gradation characteristics, image input means for inputting an image composed of a plurality of pixels, character region extracting means for extracting a character region in which characters are drawn, from the image, sharpening means for carrying out sharpening for remaining regions other than the character region in the image at a predetermined sharpening level and for carrying out sharpening for the character region at a sharpening level higher than the level of the sharpening performed for the remaining regions, and luminance correction means for correcting luminance of each of pixels constituting the character region and the remaining regions subjected to the sharpening based on the gradation characteristics of the display means, wherein the display means displays the image in which the luminance of each of the pixels has been corrected by the luminance correction means.

In accordance with the invention, in the image processing device, the sharpening means makes the level of the sharpening performed for the character region higher than the level of the sharpening performed for the remaining regions. Therefore, the blurs at the edge portions of the characters drawn in the character region are improved; therefore, in the case where the image is displayed on the display means, the characters become easy to read. The blurs at the edge portions occur owing to the difference in resolution between the image and the display means. In addition, the noise included in a picture drawn in the remaining regions is prevented from being intensified by the sharpening process, whereby the picture can be smoothened. At the same time, in the case where the image is displayed on the display means, the characters drawn in the image become easy to read regardless of the bias of the gradation characteristics of the display means. Therefore, the reduction in visibility of the image owing to both the difference in resolution between the image and the display means and the gradation characteristics of the display means can be prevented. In addition, the reproducibility of image can be improved because of the same reason as that for the image processing device of the first invention.

Furthermore, an image processing device of a third invention is characterized in that the sharpening means independently obtains the luminance g(x, y) of each of the sharpened pixels by substituting the luminance f(x, y) of each of pixels constituting the image and the coefficient h(x, y) of the sharpening level of each of the pixels into the following expression:

$$g(x,y)=f(x,y)-h(x,y)\times\nabla^2 f(x,y)$$

and the coefficient h(x, y) of the sharpening level of each of the pixels is a predetermined first constant αi in the case where each of the pixels is in the remaining regions, and the coefficient is a second constant αc larger than the first constant αi in the case where each of the pixels is in the character regions.

In accordance with the invention, the sharpening means obtains the luminance g(x, y) of each of the sharpened pixels in the character regions and the remaining regions on the basis of the expression and replaces the luminance f(x, y) of each of the pixels in the character regions and the remaining regions with the luminance g(x, y) of each of the sharpened pixels. As a result, the character regions and the remaining regions are sharpened. In this case, the sharpening carried out for the character regions differs from the sharpening carried out for the remaining regions by only the coefficient h(x, y) of the expression. Therefore, the sharpening can be carried out for each pixel so that the level of the sharpening carried out for the character regions is higher than that for the remaining regions by only changing the coefficient h(x, y) depending on whether each of the pixels is in the character regions or not. Therefore, the procedure for changing the sharpening level of each pixel is simplified.

Furthermore, an image processing device of a fourth invention is characterized in that the character region extracting means converts the luminance of each of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and from among regions of the circumscribed rectangles used as contours in the image, the character region extracting means extracts a region in which the difference between the maximum value and minimum value of luminance of the plurality of pixels in the respective regions is not less than a reference difference value, as a character region.

In accordance with the invention, the character region extracting means extracts the character region from the image using the procedure. Therefore, in the case where at least one character is drawn in the image, the circumscribed rectangle circumscribing the character can be extracted easily as a character region.

Furthermore, an image processing device of a fifth invention is characterized in that the character region extracting means converts the luminance of each of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and from among regions in the image with the circumscribed rectangles used as contours, the character region extracting means extracts regions arranged in nearly parallel with a predetermined reference axis line as character regions.

In accordance with the invention, the character region extracting means extracts the character regions from the image by using the procedure. Therefore, in the case where a plurality of characters are arranged linearly in the image, the circumscribed rectangles circumscribing the characters respectively can be extracted easily as character regions. The plurality of characters arranged linearly are obtained in the case where sentences are drawn in the image. For these reasons, in the case where sentences are drawn in the image, even if circumscribed rectangles circumscribing a block of connected pixels other than the characters are obtained, the circumscribed rectangles can be prevented from being extracted as character regions. The block of connected pixels other than the characters is a portion of a picture drawn in the image for example.

Furthermore, an image processing device of a sixth invention further comprises:

contrast estimation means for estimating contrast of the image, and contrast correction means for raising the contrast of the image on the basis of estimated contrast.

In accordance with the invention, in the image processing device, in addition to the sharpening process by the sharpening means and the luminance correction process by the luminance correction means, the contrast of the image can be made higher than the original contrast of the image by the contrast correction means. Therefore, the reduction in visibility of the image owing to both the difference in resolution between the image and the display means and the gradation characteristics of the display means can be prevented.

Furthermore, an image processing device of a seventh invention is characterized in that the contrast estimation means generates a histogram of luminance of pixels constituting the image, to obtain a first luminance value corresponding to a maximum value of the histogram in a first range of from a predetermined reference luminance to a maximum of luminance which can be taken by the pixels, to obtain a maximum value of the histogram in a second range of values not less than a minimum of luminance which can be taken by the pixels and less than the reference luminance, to judge whether the maximum value of the histogram in the second range is not less than the predetermined reference value, and the contrast estimation means estimates, in the case where the maximum value of the histogram in the second range is not less than the predetermined reference value, the contrast of the image on the basis of the first luminance value and the luminance value corresponding the maximum value of the histogram in the second range, and in the case where the maximum value of the histogram in the second range is less than the reference value, the contrast of the image on the basis of the first luminance value and the lowest luminance value among the luminance values of all the pixels constituting the image.

In accordance with the invention, the contrast detection means detects the contrast of the image, using the procedure. This is because, when the histogram of the luminance of the pixels of the image is generated in the case where the image is the so-called document image, the number of the pixels having luminance corresponding to the color of the background of the image is extremely larger than the number of the pixels having luminance other than the luminance corresponding to the color of the background at all times. However, it is found that the number of the pixels having luminance corresponding to the color of the characters is nearly equal to the number of the pixels having the other luminance. In this case, the maximum value of the luminance in the second range of the histogram is not always the luminance corresponding to the color of the characters. Therefore, as described above, the luminance used as a reference at the time of obtaining the contrast of the image is changed on the basis of the inequality relationship between the maximum value and the reference value of the luminance in the second range. As a result, the contrast of the image can be obtained at all times regardless of the relationship between the number of the pixels having luminance corresponding to the color of the characters and the number of the pixels having the other luminance.

Furthermore, an image processing device of an eighth invention is characterized in that, in the case where the luminance of each of the pixels is represented by the sum of predetermined three color components, the character region extracting means extracts character regions on the basis of the sum of the three color components, the sharpening means individually sharpens the three color components, and the luminance correction means individually corrects the three color components.

In accordance with the invention, in the case where the luminance is represented by the sum of the three color components, that is, in the case where the image is a color image, the respective means operate as described above. Therefore, even in the case where the image is a color image, the image processing means can prevent the reduction in visibility of the image owing to both the difference in resolution between the image and the display means and the gradation characteristics of the display means, and can improve the reproducibility of the image.

Furthermore, an image processing method of a ninth invention comprises the steps of:

inputting an image composed of a plurality of pixels, estimating contrast of the image, raising the contrast of the image on the basis of estimated contrast and correcting luminance of each of the pixels constituting the image on the basis of gradation characteristics of display means for displaying the image, and displaying the image, in which the luminance of each of the pixels has been corrected, on the display means.

In accordance with the invention, in the case where the image is processed by using the image processing method, the luminance of the pixels constituting the image can be converted in consideration of not only the gradation characteristics of the display means but also the estimated contrast. Therefore, in the case where the image is displayed on the display means, the reduction in visibility of the image owing to both the contrast of the image and the gradation characteristics of the display means can be prevented, and the reproducibility of image can be improved.

Furthermore, an image processing method of a tenth invention comprises the steps of:

inputting an image composed of a plurality of pixels, extracting character regions with drawn characters in the image, sharpening remaining regions other than the character regions in the image at a predetermined sharpening level and sharpening the character regions in the image at a sharpening level higher than the level of the sharpening performed for the remaining regions, correcting the luminance of each of the pixels constituting the character regions and the remaining regions subjected to the sharpening on the basis of the gradation characteristics of display means for displaying the image, and displaying the image, in which the luminance of each of the pixels has been corrected, on the display means.

In accordance with the invention, in the case where the image is processed by using the image processing method, the level of the sharpening performed for the character regions becomes higher than the level of the sharpening performed for the remaining regions. Therefore, in the case where the image is displayed on the display means, the characters become easy to read, and the pictures in the remaining regions can be smoothened at the same time. Furthermore, in the case where the image is displayed on the display means, the characters drawn in the image become easy to read regardless of the bias of the gradation characteristics of the display means. Therefore, the reduction in the visibility of the image owing to both the difference between the resolution of the image and the resolution of the display means and the gradation characteristics of the display means can be prevented. At the same time, the reproducibility of the image can be improved.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
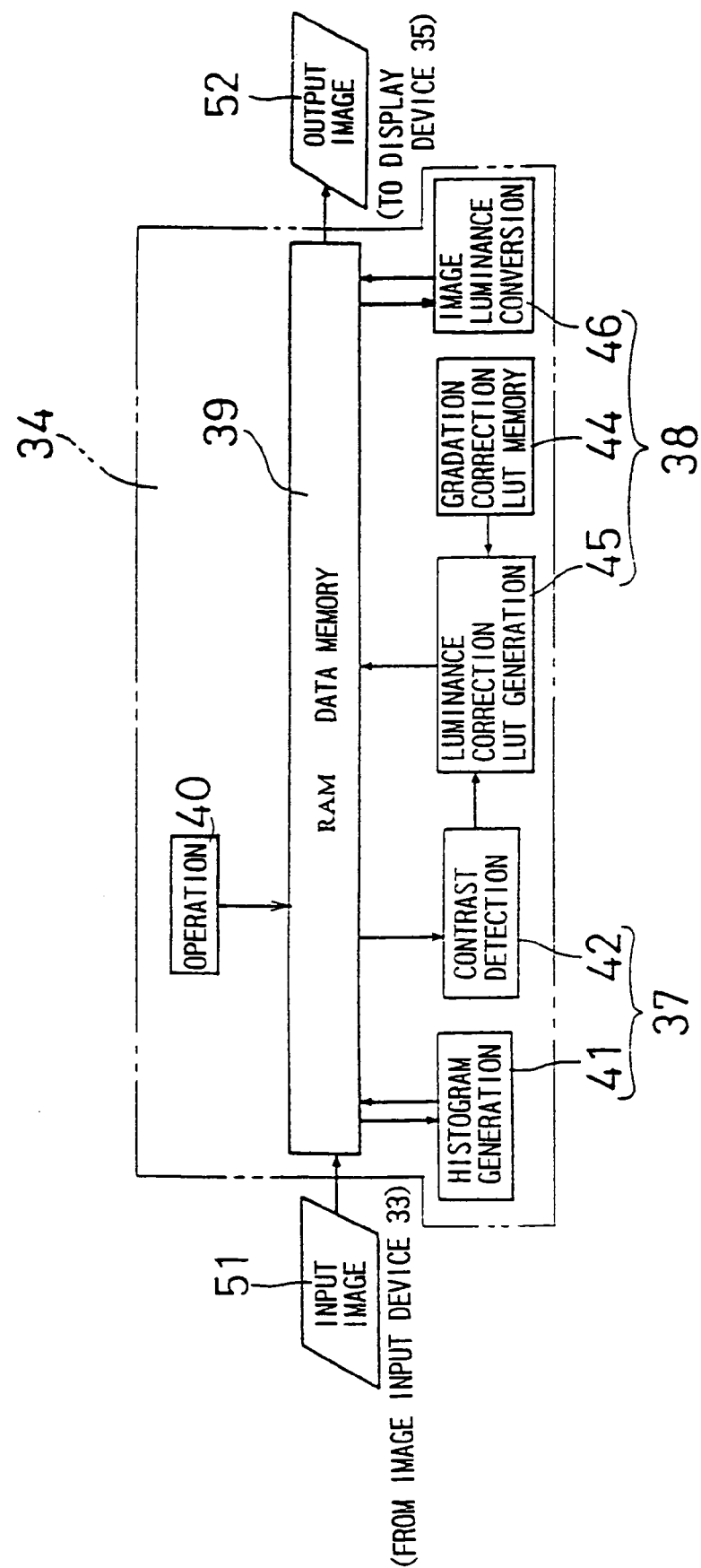
FIG. 1 is a block diagram showing the electrical configuration of a data processing device 34 included in an image processing device 31 in accordance with a first embodiment of the invention.

Now referring to the drawings, preferred embodiments of the invention are described below.

Figure 2:
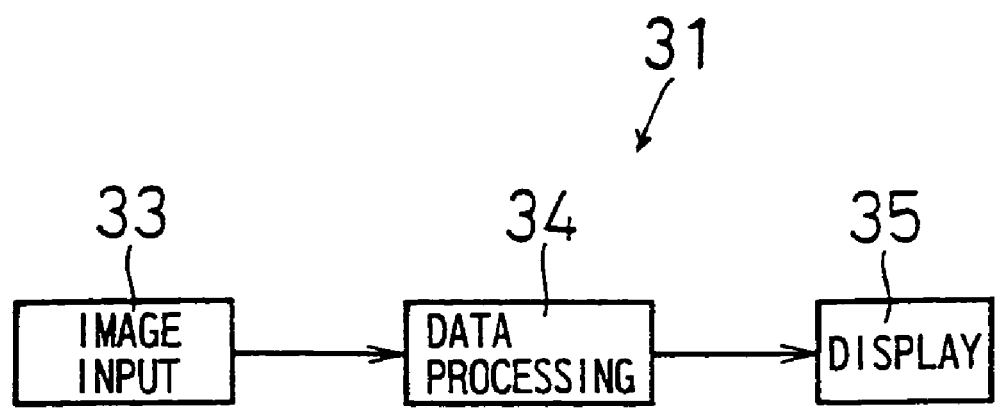
FIG. 2 is a block diagram showing the general electrical configuration of the image processing device 31.

FIG. 1 is a block diagram showing the electrical configuration of a data processing device 34 included in an image processing device 31 in accordance with a first embodiment of the invention. FIG. 2 is a block diagram showing the general electrical configuration of the image processing device 31. Both FIG. 1 and FIG. 2 will be described.

The image processing device 31 includes an image input device 33, a data processing device 34 and a display device 35. The data processing device 34 includes a data memory unit 39, a contrast estimation unit 37, a luminance correction unit 38 and an operation unit 40. The contrast estimation unit 37 includes a histogram generation unit 41 and a contrast detection unit 42. The luminance correction unit 38 includes a gradation characteristic correction lookup table memory means 44, a luminance correction lookup table generation means 45 and an image luminance conversion unit 46. Hereinafter, "lookup table" is sometimes simply referred to as "LUT."

The image input device 33 supplies image data, that is, digital signals representing an image to be processed, to the data processing device 34. The image is the so-called multilevel image and comprises a plurality of pixels arranged in matrix. The image data comprises image data representing the luminance of each of pixels constituting the image and arranged in the order corresponding to the arrangement of the pixels. More specifically, each piece of pixel data corresponds to one of luminance values in a predetermined pixel luminance range. The pixel luminance range is a range of luminance values that can be taken by the pixel data in conformity with the standard of the image data. The luminance value is a value representing luminance quantitatively. The image data supplied from the image input device 33 to the data processing device 34 is hereinafter referred to as input image data 51. In addition, the image represented by the input image data 51 is referred to as an input image.

The data processing device 34 subjects the input image data 51 to an image correction process on the basis of the contrast of the input image and the gradation characteristics of the display device 35. The input image data 51 subjected to the image correction process is hereinafter referred to as output image data 52. The output image data 52 is supplied to the display device 35. The display device 35 displays an image on its display screen on the basis of the output image data 52. The display screen comprises a plurality of display pixels arranged in matrix. The luminance values of the plurality of display pixels are determined on the basis of a plurality of image data items constituting the output image data and the gradation characteristics of the display device 35. The gradation characteristics of the display device 35 are determined uniquely on the basis of the configuration of the display device 35. In comparison with the input image, the image represented by the output image data is different only in the actual value of the luminance of each pixel, but is equal in the other respects. The resolution of the input image is equal to the resolution of the display screen. In other words, the pixels of the input image correspond one-to-one to the pixels of the output image, and the pixels of the image represented by the output image data correspond one-to-one to the display pixels of the display screen.

The contrast estimation unit 37 estimates the contrast of the input image. Therefore, first, the histogram generation unit 41 generates a luminance histogram with respect to the luminance of each pixel of the input image. Next, the contrast detection unit 42 detects the contrast of the input image on the basis of the luminance histogram.

The luminance correction unit 38 corrects the luminance of each of pixels constituting the input image on the basis of the contrast of the input image and the gradation characteristics of the display device 35. The basic configuration of the luminance correction unit 38 will be described below. The gradation correction LUP memory unit 44 memorizes a predetermined gradation correction lookup table RLUT. The gradation correction lookup table RLUT is used in the case where the luminance of each of pixels constituting the image to be subjected to the gradation correction process for the display device is converted for the gradation correction process for the display device. The gradation correction process for the display device is a process for making the gradation characteristics of the display device 35 itself linear. The gradation characteristics are defined as the relationship between the luminance represented by the pixel data and the luminance of the display pixels; more specifically, the gradation characteristics represent how the luminance of the display pixels illuminated depending on the pixel data is changed depending on the change in the luminance represented by the pixel data. In other words, the gradation characteristics of the display device 35 correspond to the input/output characteristics of the display device 35.

Figure 27:
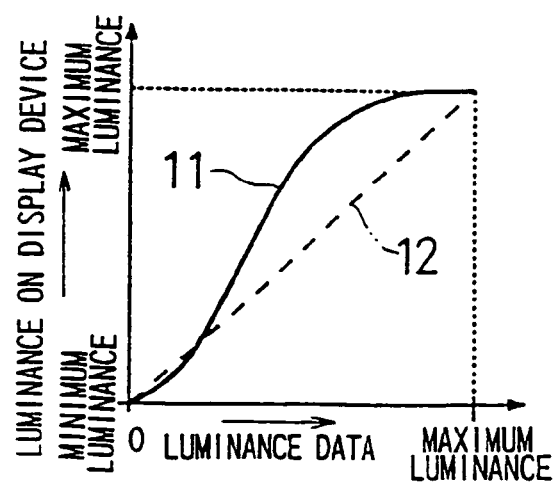
FIG. 27 is a graph showing the gradation characteristics of the display device in the conventional technology.
Figure 28:
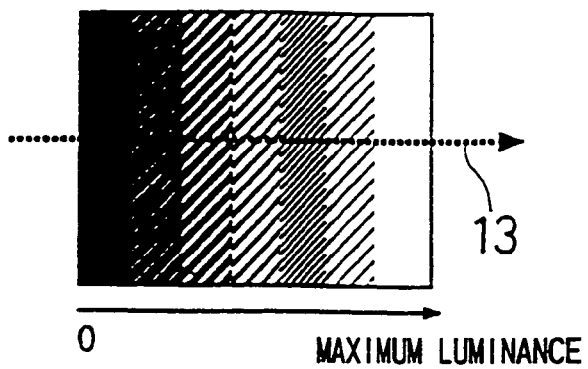
FIG. 28 is a display example of the display device having the gradation characteristics of the graph of FIG. 27.
Figure 29:
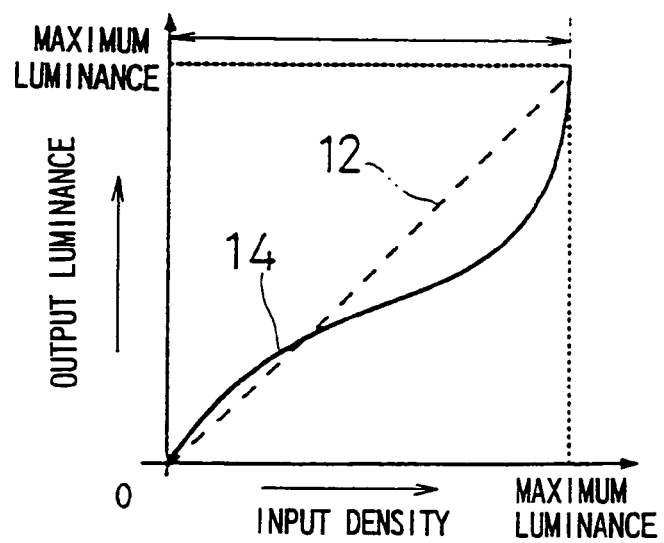
FIG. 29 is a graph showing the relationship between the input density and the output luminance in a gradation correction table corresponding to the gradation characteristics of the graph of FIG. 27.
Figure 30:
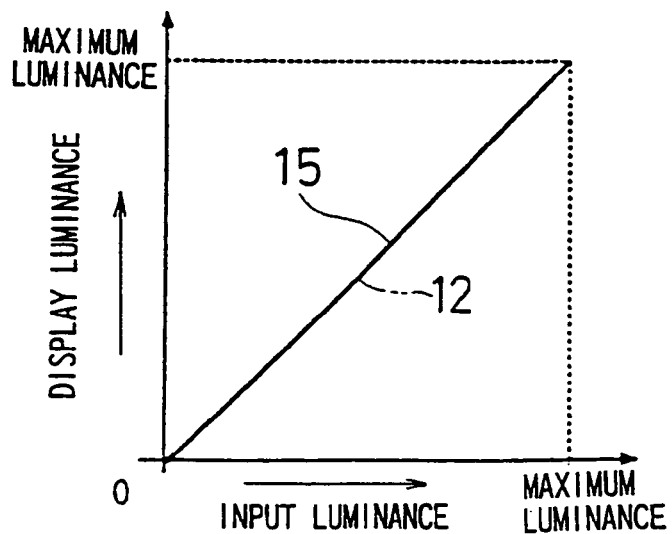
FIG. 30 is a graph showing the gradation characteristics of the entire image processing device having the display device with the gradation characteristics of the graph of FIG. 27 and carrying out the correction process of the gradation correction table of FIG. 29.
Figure 31:
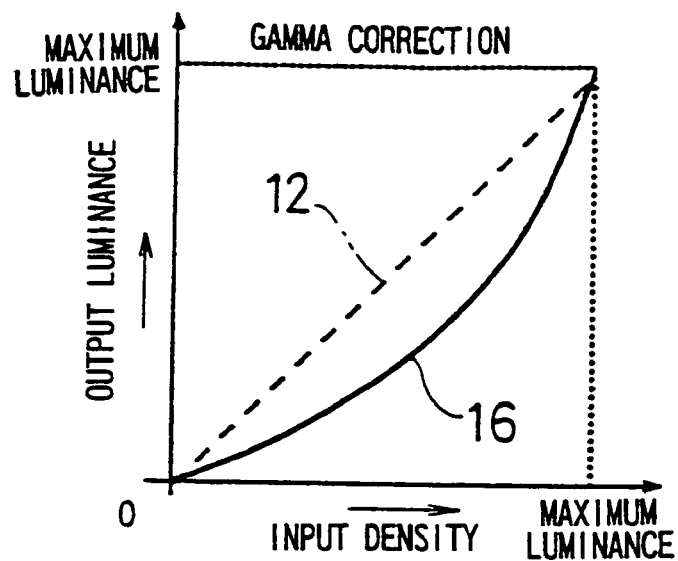
FIG. 31 is a graph showing the relationship between the input density and the output luminance in a gamma correction table corresponding to the gradation characteristics of the graph of FIG. 27.
Figure 32:
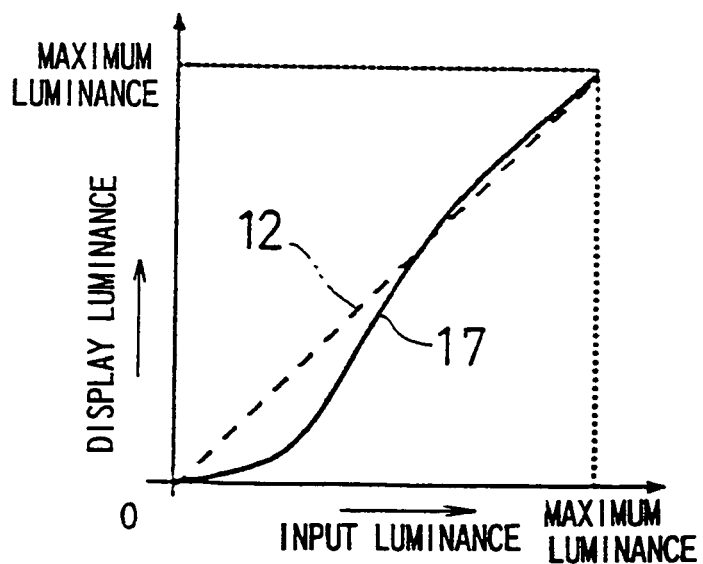
FIG. 32 is a graph showing the gradation characteristics of the entire image processing device having the display device with the gradation characteristics of the graph of FIG. 27 and carrying out the correction process of the gamma correction table of FIG. 31.
Figure 33:
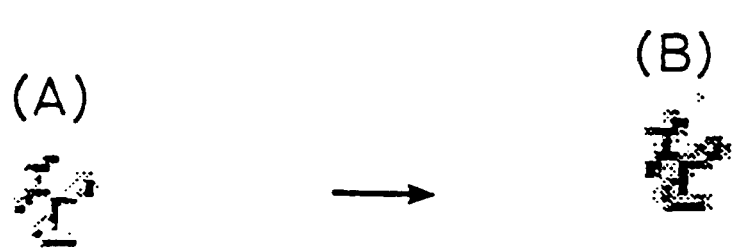
FIGS. 33A and 33B are views showing an image not subjected to the gradation correction process and an image subjected to the gradation correction process in the conventional technology.

The gradation correction lookup table RLUT represents the relationship between the luminance values i (i=0, 1, 2, . . . , Vmax) before processing of the gradation correction process for the display device and the luminance value RLUT [i] after processing of the gradation correction process for the display device. The relationship is uniquely determined depending on the gradation characteristics of the display device 35. For example, in the case where the gradation characteristics of the display device 35 are represented by the gradation characteristic curve 11 of the FIG. 27, the relationship of the gradation correction lookup table RLUT is represented by the luminance conversion curve 14 of FIG. 29. The gradation characteristic curve 11 of the display device 35 is linearly symmetrical with the luminance conversion curve 14 of FIG. 29 with the reference straight line 12 used as a symmetrical axis.

The luminance correction LUT generation unit 45 generates a luminance correction lookup table CaLUT on the basis of the contrast of the input image detected by the contrast detection unit 42 and the gradation correction lookup table memorized in the gradation correction LUT memory unit 44. The luminance correction lookup table CaLUT is used to improve the contrast of the input image and to make the entire gradation characteristics of the image processing unit 31 linear at the same time. The entire gradation characteristics of the image processing unit 31 represent the relationship between the luminance values of the pixel data of the input image data 51 and the luminance values of the display pixels corresponding to the pixel data. In other words, the entire gradation characteristics of the image processing unit 31 correspond to the input/output characteristics of the image processing unit 31. The image luminance conversion unit 46 subjects the pixel data of the input image data to the luminance conversion process based on the luminance correction lookup table CaLUT. The set of the pixel data subjected to the luminance conversion process is output image data 52.

When the contrast estimation unit 41 and the luminance conversion unit 42 carry out the processes respectively, the data memory unit 39 temporarily memorizes various data used for the processes. Therefore, a plurality of memory regions for memorizing the various kinds of data are set in the data memory unit 39. It is assumed that the addresses of the memory regions have been predetermined. The data memory unit 39 is attained by a random access memory for example. The operation unit 40 comprises a keyboard and a plurality of buttons and is used for the operator of the image processing device 31 to operate the data processing unit 34.

The histogram generation unit 41, the contrast detection unit 42, the luminance correction LUT generation unit 45 and the image luminance conversion unit 46 are attained by independent circuits respectively. In addition, at least two units of the units 41, 42, 45 and 46 may be imaginary circuits attained by the arithmetic processes of a single central arithmetic processing unit.

The input image data 51 may be generated by the image input device 33 itself or by a device other than the image processing device 31 and may be supplied to the image input device 33. In the case where the image input device 33 itself generates the input image data 51, the image input device 33 is attained by an optical reading device or a digital camera for example. A scanner is taken as an example of the optical reading device. In addition, in the case where the other device generates the input image data 51, the image input device 33 is attained by a memory medium reading device or by a connection device for connecting the other device to the data processing device 34 so that image data can be received. In the embodiment, it is assumed that the image input device 33 is attained by a scanner and that a manuscript comprising the so-called binary images printed on paper is read to generate input image data. Furthermore, in the following explanations, it is assumed that the gradation of the input image is gradation having three or more levels, that is, the so-called halftone.

On the assumption conditions, it is preferable that the scanner optically reads the manuscript at a resolution higher than the resolution of the display screen to generate image data and that the generated image data is scaled down in accordance with the resolution of the display screen to generate the input image data 51. This is because of the following reason. The resolution of a printing device for printing images on papers to generate manuscripts is higher than that of the scanner, and the resolution of the scanner is higher than that of the display screen. In the case where an image is input from the start at the same resolution as that of the display, one pixel in the input image corresponds to various pixels in the manuscript because of the difference in resolution. As a result, it is impossible to accurately detect colors constituting characters at the time of the detection of contrast in particular. Therefore, in order to detect accurate contrast and to detect characters, it is preferable that input is carried out at a high resolution wherein detection accuracy can be obtained.

It is assumed that the color of the background of the manuscript is nearly true white but not completely true white, such as cream or light ocher, and it is also assumed that the color of the print dots of the manuscript is nearly true black but not completely true black, such as dark brown. True white is the color of a pixel, the image data of which is the upper limit value Vmax in the pixel luminance range, and true black is the color of a pixel, the image data of which is the lower limit value Vmin, that is, 0, in the pixel luminance range. Furthermore, the color of a pixel, the image data of which is a luminance value larger than the minimum value and smaller than the maximum value in the pixel luminance range, is gray; as the luminance value is larger, the color becomes closer to white. The color of the background is determined depending on the paper quality of the manuscript for example, and the color of the print dots is equal to the color of the print ink used to print the manuscript. In other words, the color of the background of the input image and the color of the characters of the input image are influenced by the paper quality of the manuscript and the color of the print ink.

Figure 3:
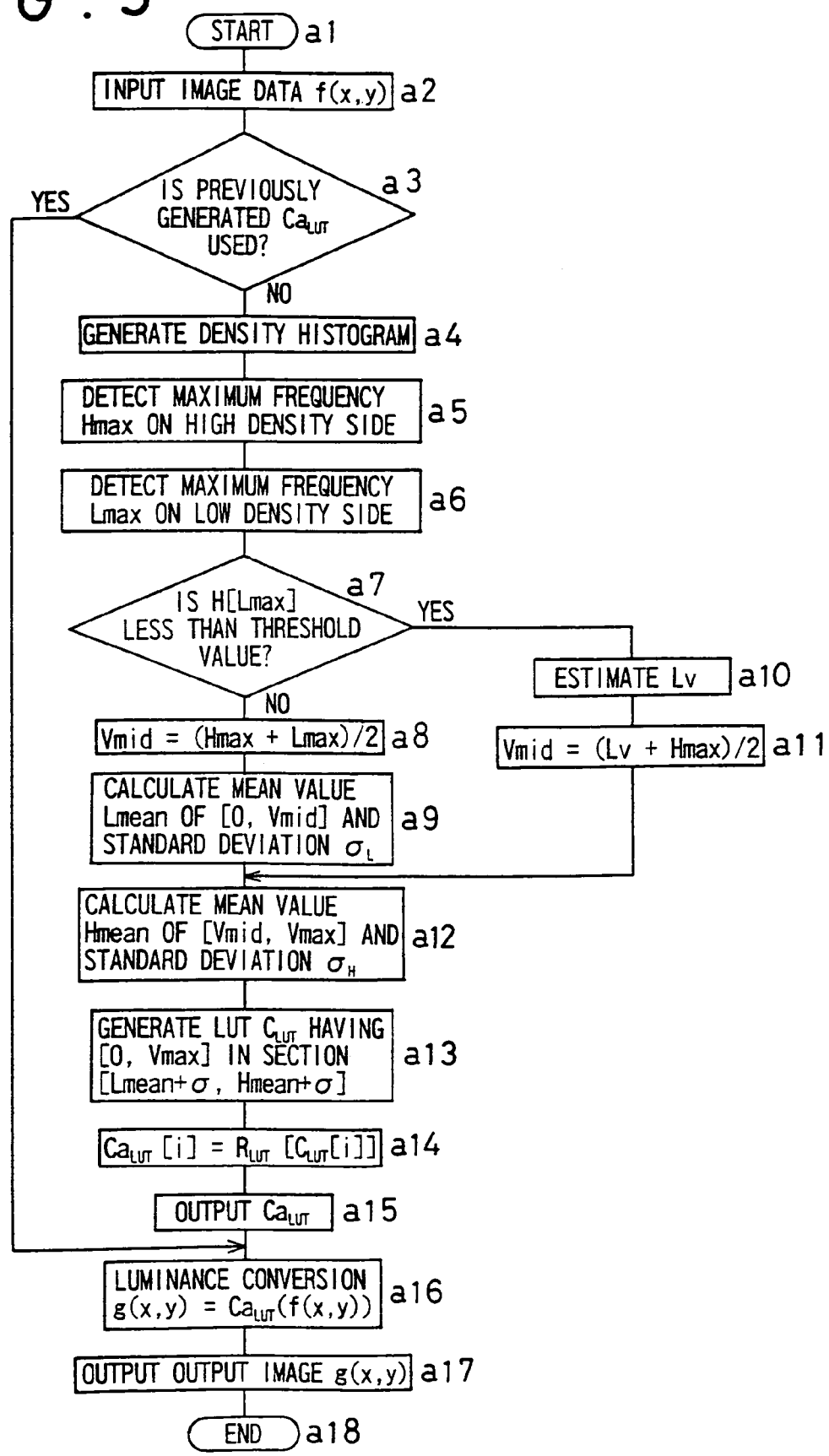
FIG. 3 is a flowchart explaining the image correction process executed by the image processing device 31.

FIG. 3 is a flowchart explaining the image correction process carried out by the image processing device 31. The image correction process will be described by using the flowchart of FIG. 3. For example, when the operator of the image processing device 31 instructs to execute the image correction process from the operation unit 40, the process advances from step a1 to step a2.

First, at step a2, the image input device 33 subjects the input image data 51 to memorization in the predetermined first memory region of the data memory unit 39. The input image data 51 may be generated after the image correction process has started or may be generated in advance before the image correction process starts.

Next, at step a3, a judgment is made as to whether the luminance correction lookup table CaLUT having already memorized in a predetermined second memory region of the data memory unit 39 is used for the image correction process at step a3 and the following steps. In the case of newly generating a luminance correction lookup table CaLUT, the process advances from step a3 to step a4. In the case of using the luminance correction lookup table CaLUT having already been memorized in the region, the process advances from step a3 to step a16. The details of the judgment at step a3 will be described below. The process from step a4 to step a15 is a table generation process for generating the luminance correction lookup table CaLUT.

In the case where the table generation process is carried out, the histogram generation unit 41 first reads the input image data 51 from the first memory region of the data memory unit 39 at step a4, sequentially checks the pixel data of the input image data 51 having been read to generate a luminance histogram. The luminance histogram is memorized in a predetermined third memory region by the data memory unit 39. The luminance histogram represents the appearance distribution of the luminance values of the input image data in the pixel luminance range.

Figure 4:
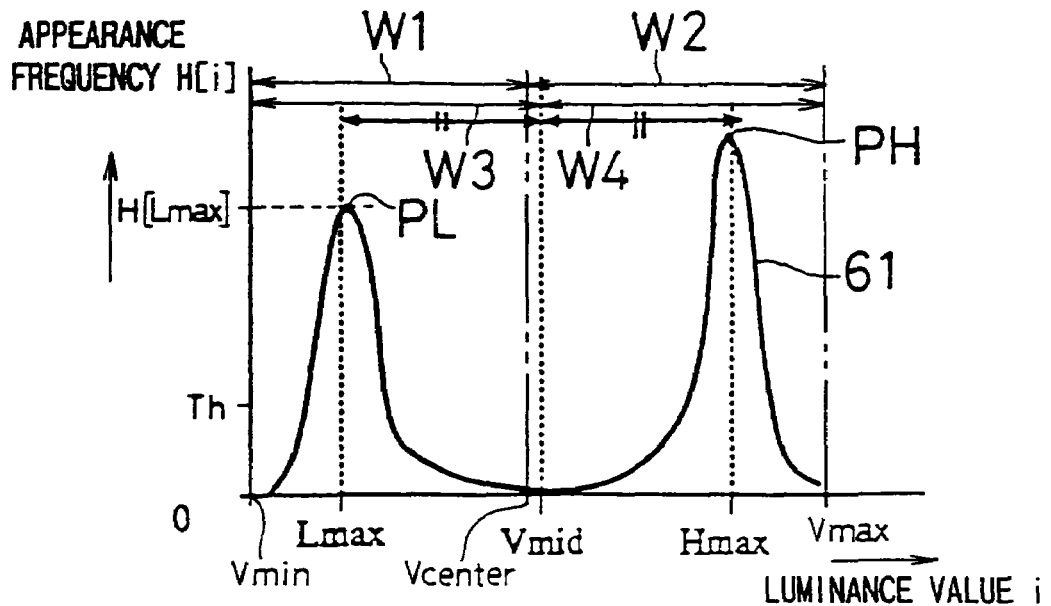
FIG. 4 is a luminance histogram in the case where the input image data 51 supplied to the data processing device 34 represents the so-called document image.
Figure 5:
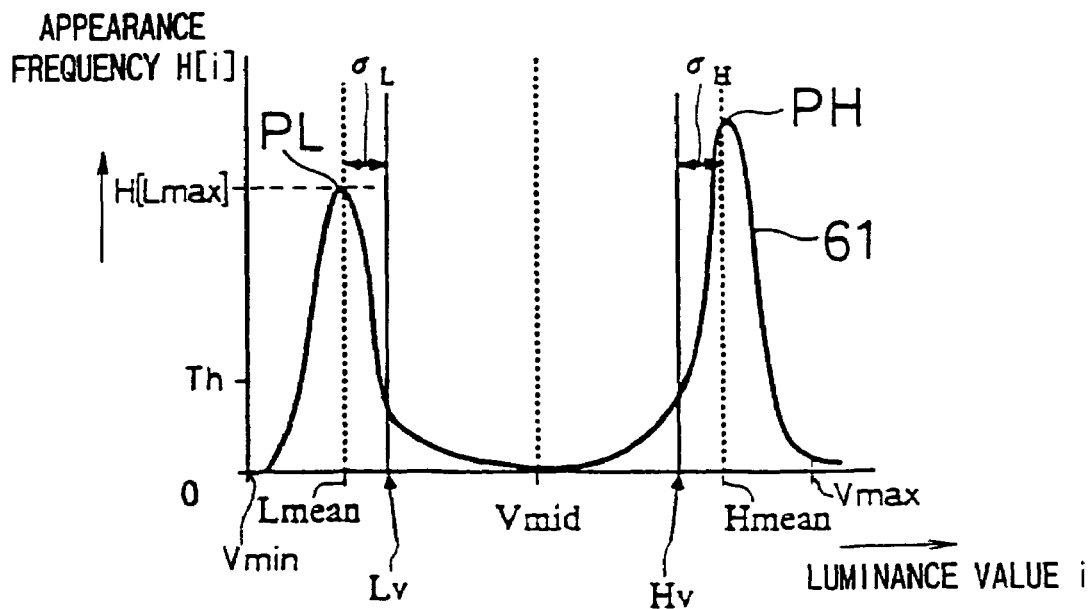
FIG. 5 is a luminance histogram in the case where the input image data 51 represents the so-called document image.

FIG. 4 and FIG. 5 are luminance histograms in the case where the input image data represents the so-called document image. The abscissa represents luminance value i and the ordinate represents appearance frequency H [i]. i is a positive integer not smaller than the lower limit value Vmin and not larger than the upper limit value Vmax. The appearance frequency H [i] of a given luminance value i corresponds to the number of pixel data corresponding to the luminance value i, that is the number of pixels of the color corresponding to the luminance value in the input image. In the case where the input image data 51 is generated by reading the manuscript with a scanner, two maximum points PH and PL appear on a curve 61 representing the appearance distribution of the luminance values.

The luminance value corresponding to the maximum point having higher luminance among the two maximum points PH and PL corresponds to the color of the background of the input image or a color very close to the color of the background. In addition, the luminance value corresponding to the maximum point having lower luminance among the two maximum points corresponds to the color of the lines and dots in the input image or a color very close to the color of the lines and dots. The color of the lines and dots is nearly equal to the color of the print dots of the manuscript. Since the color of the print dots of the manuscript is assumed to be close to true black in the embodiment, it is estimated that the luminance value corresponding to the color of the lines and dots is present in a lower range W1 not less than the lower limit value Vmin and less than the center luminance value Vcenter in the image luminance range. Furthermore, since the color of the background of the input image is assumed to be close to true white, it is estimated that the luminance value corresponding to the color of the background is present in a higher range W2 not less than the center luminance value Vcenter and not more than the upper limit value Vmax. Therefore, in the embodiment, the contrast of the input image is defined by the combination of the upper limit luminance value Hv corresponding to the color of the background of the input image and the lower limit luminance value Lv corresponding to the color of the lines and dots drawn in the input image, and is described as [Hv, Lv].

FIG. 3 is referred to again. The process from step a5 to a13 is a contrast detection process for detecting the contrast of the input image and is carried out by the contrast detection unit 42. First, at step a5, the contrast detection unit 42 reads the luminance histogram from the third memory region of the data memory unit 39. Next, the contrast detection unit 42 obtains the luminance value corresponding to the color of the background of the input image or the color close to the color of the background. The luminance value is a luminance value Hmax, a larger value selected from the luminance values corresponding to the two maximum values PH and PL of the luminance histogram. More specifically, the luminance value Hmax having the maximum appearance frequency among all the luminance values in the higher range W2 in the pixel luminance range is obtained.

Next, at step a6, the contrast detection unit 42 obtains a luminance value corresponding to the color of the lines and dots in the input image or a color close to the color of the lines and dots. The luminance value is a luminance value Lmax, a smaller value selected from luminance values corresponding to the two maximum values PH and PL of the luminance histogram. More specifically, the luminance value Lmax having the maximum appearance frequency among all the luminance values in the lower region W1 in the pixel luminance range is obtained.

Next, at step a7, the contrast detection unit 42 judges whether the maximum value of the appearance frequency in the lower region W1, that is, the appearance frequency H [Lmax] of the smaller luminance value Lmax, is not less than a predetermined threshold value Th. The judgment at step a7 is carried out to determine whether there are two distinct rising portions in the curve 61. In the case where the maximum value of the appearance frequency in the lower range W1 is not less than the threshold value Th, it is regarded that the curve 61 has two distinct rising portions. The method of estimating the lower limit luminance value Lv of the contrast is changed depending on whether the two distinct rising portions are present or not. The detailed reasons for the judgment at step a7 will be described later.

Figure 6:
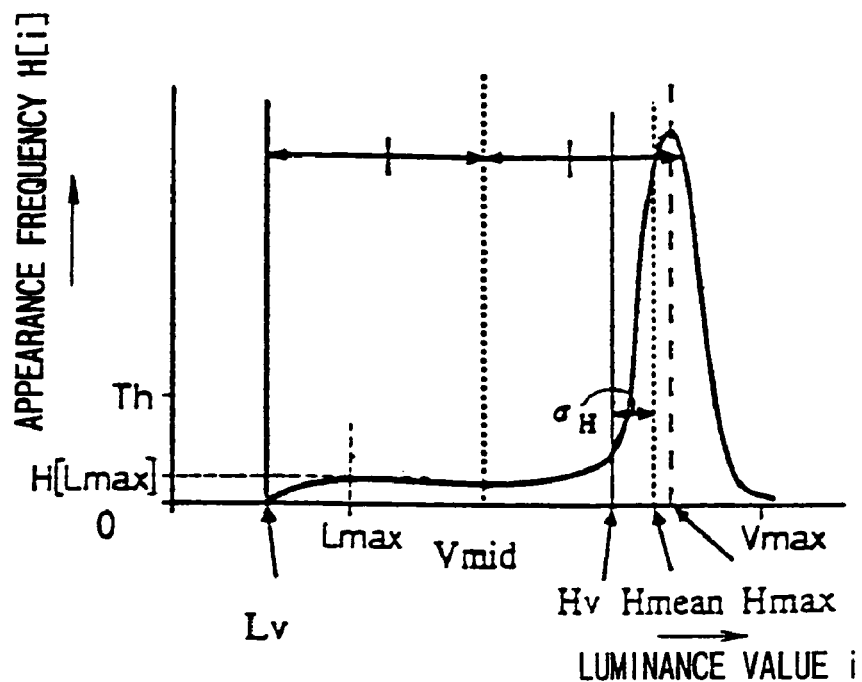
FIG. 6 is a luminance histogram in the case where the input image data 51 represents the so-called document image.

In the case where the curve 61 has two distinct rising portions as shown in FIGS. 4 and 5, the appearance frequency H [Lmax] of the smaller luminance value Lmax is not less than the threshold value Th. In this case, the process advances from step a7 to step a8, and a first estimation process for the lower limit luminance value Lv is carried out. In the case where two distinct rising portions are not present on the curve 61 as shown in FIG. 6, the appearance frequency H [Lmax] is less than the threshold value Th. In this case, the process advances from step a7 to step a10, and a second estimation process for the lower limit luminance value Lv is carried out.

First, the first estimation process for the lower limit luminance value Lv will be described.

At step a8, the contrast detection unit 42 obtains a middle luminance value between the luminance values Hmax and Lmax corresponding to the two maximum values respectively as a division reference luminance value Vmid on the basis of expression 1. Next, at step a9, the contrast detection unit 42 obtains the mean value Lmean of the luminance values in a low luminance side range W3 on the basis of expressions 2 and 3 and further obtains the standard deviation σL of the luminance values in the low luminance side range W3 on the basis of expression 4. The low luminance side range W3 is a range not less than the lower limit value Vmin in the pixel luminance range and less than the division reference luminance value Vmid. In addition, "NL" defined by expression 3 is the number of pixel data corresponding to the luminance values in the low luminance side range W3 among all the pixel data in the input image data. Next, the contrast detection unit 42 obtains the sum of the mean value Lmean of the luminance values in the low luminance side range W3 and the standard deviation σL of the luminance values in the low luminance side range W3 as the lower limit luminance value Lv. The first estimation process is completed by taking the steps.

$$V\mathrm{mid}=(H\mathrm{max}+L\mathrm{max})\div 2 \quad (1)$$

$$Lmean = \frac{1}{NL}\sum_{i=0}^{Vmid} H[i] \times i \quad (2)$$

$$NL = \sum_{i=0}^{Vmid} H[i] \quad (3)$$

$$\sigma L = \sqrt{\left\{\frac{1}{NL-1}\left(\sum_{i=0}^{Vmid} H[i] \times i^2 - NL \times Lmean\right)\right\}} \quad (4)$$

$$Lv = Lmean + \sigma L \quad (5)$$

Next, the second estimation process for the minimum luminance value Lv will be described.

First, at step a10, the contrast detection unit 42 obtains the minimum luminance value among all the pixel data in the input image data and sets the minimum luminance value as the lower limit luminance value Lv. The minimum luminance value is the minimum luminance value among the luminance values having appearance frequencies other than zero in the luminance histogram of the input image as shown in FIG. 6. Therefore, in order to find out the minimum luminance value, for example, a judgment as to whether the appearance frequency of a pixel having each luminance value is zero or not should be carried out sequentially in the direction wherein the luminance value increases from the minimum luminance value Vmin, and the luminance value whose appearance frequency is judged not zero for the first time should be regarded as the minimum luminance value. Furthermore, instead of setting the minimum luminance value as the lower limit luminance value Lv, it may be possible to define that the lower limit luminance value Lv is always the minimum value Vmin, that is, zero. Next, at step a11, the contrast detection unit 42 obtains a middle luminance value between the lower limit luminance value Lv and the luminance value Hmax, that is, the larger value among the luminance values corresponding to the two maximum values PH and PL of the luminance histogram respectively, as the division reference luminance value Vmid. The second estimation process is completed by taking the steps.

$$V\mathrm{mid}=(Lv+H\mathrm{max})\div 2 \quad (6)$$

When the lower limit luminance value Lv is estimated by one of the first and second estimation processes, the process advances from step a9 or a11 to step a12. Next, at step a12, the contrast detection unit 42 obtains the mean value Hmean of the luminance values in the high luminance side range W4 on the basis of expression 7, and further obtains the standard deviation σH of the luminance values in the high luminance side range W4 on the basis of expression 9. The high luminance side range W4 is a range not less than the division reference luminance value Vmid and not more than the maximum value Vmax in the pixel luminance range. In addition, "NH" defined by expression 8 is the number of pixel data corresponding to the luminance values in the high luminance side range W4 among all the pixel data in the input image data 51. Furthermore, the contrast detection unit 42 obtains the difference obtained by subtracting the standard deviation σH of the luminance values in the high luminance side range W3 from the mean value Hmean of the luminance values in the high luminance side range W3 on the basis of expression 10 as the upper limit luminance value Hv.

$$Hmean = \frac{1}{NH} \sum_{i=Vmid}^{Vmax} H[i] \times i \quad (7)$$

$$NH = \sum_{i=Vmid}^{Vmax} H[i] \quad (8)$$

$$\sigma H = \sqrt{\left\{ \frac{1}{NH-1} \left( \sum_{i=Vmid}^{Vmax} H[i] \times i^2 - NH \times Hmean \right) \right\}} \quad (9)$$

$$Hv = Hmean - \sigma H \quad (10)$$

As described above, the contrast [Lv, Hv] of the input image is defined by the lower limit luminance value Lv obtained at step a9 or step a11 and the upper limit luminance value Hv obtained at step a12. The so-called contrast ratio is the ratio of the lower limit luminance value Lv and the upper limit luminance value Hv. The contrast detection means 42 supplies the estimated contrast [Lv, Hv] of the input image to the luminance correction LUT generation unit 45. The process at steps a4 to a12 is a contrast estimation process wherein the contrast estimation unit 37 estimates the contrast [Lv, Hv] of the input image.

The contrast estimation unit 37 has determined the lower limit luminance value Lv and the upper limit luminance value Hv in consideration of the standard deviations σL and σH without coinciding them with the luminance values Lmax and Hmax corresponding to the two maximum values of the luminance histogram respectively because of the following two reasons. As a first reason, the values are determined to prevent the estimated contrast of the input image from deviating from the actual contrast of the input image owing to statistic errors at the time generating the luminance histogram on the basis of all the pixel data of the input image data. As a second reason, since the color of the background of the input image may become a color other than true white depending on the paper quality of the manuscript read by the scanner, the values are determined so that the color of the background is made close to true white by using dispersion (σH², σL²).

Then, at step a13, the luminance correction LUT generation unit 45 generates a contrast correction lookup table CLUT on the basis of the contrast [Lv, Hv] of the input image supplied from the contrast detection unit 42. The contrast correction lookup table CLUT is used for a contrast correction process for improving the contrast [Lv, Hv] of the input image to the maximum contrast [Vmin, Vmax] in conformity with the data standard of the input image data. The maximum contrast in conformity with the data standard is defined by the lower limit value Vmin in the pixel luminance range and the upper limit value Vmax in the pixel luminance range.

Figure 7:
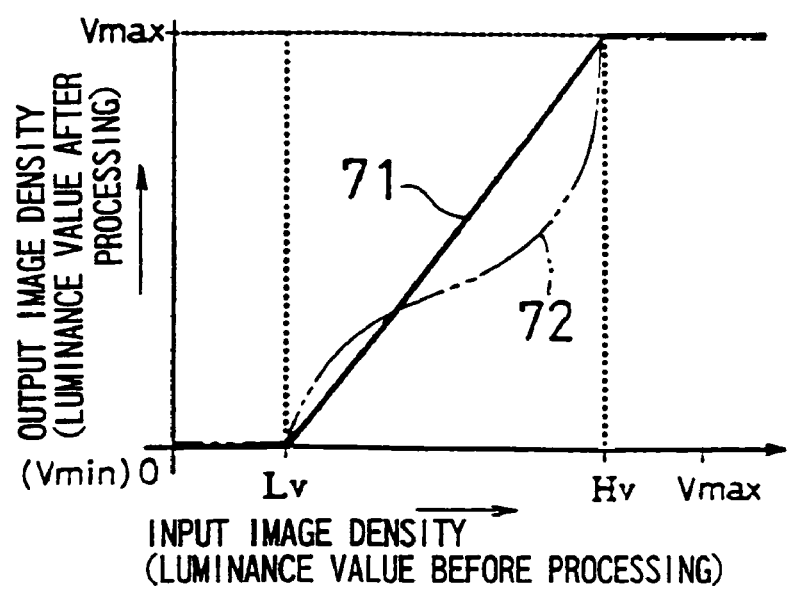
FIG. 7 is a graph showing the relationship between a luminance value k before processing and a luminance value CaLUT[k] after processing in a luminance correction lookup table CaLUT used for the data processing device.

TABLE 1 represents a concrete configuration of the contrast correction lookup table CLUT. FIG. 7 is a graph showing the luminance conversion curve 71 of the contrast correction lookup table CLUT. The luminance conversion curve 71 represents the relationship between the luminance value j (j=0, 1, 2, . . . , Vmax) before processing and the luminance value CLUT [j] (j=0, 1, 2, . . . , Vmax) after processing.

TABLE 1

| Luminance value j before processing | Luminance value CLUT [j] after processing |
|---|---|
| 0 | 0 |
| . | . |
| . | . |
| . | . |
| Lv | 0 |
| . | . |
| . | . |
| . | . |
| Hv | Vmax |
| . | . |
| . | . |
| . | . |
| Vmax | Vmax |

The relationship between the luminance value j before processing and the luminance value CLUT [j] after processing in the contrast correction lookup table CLUT will be described below. In the case where the luminance value j before processing is not less than the lower limit value Vmin and not more than the lower limit luminance value Lv in the pixel luminance range, the luminance value CLUT [j] after processing is the lower limit value Vmin. In the case where the luminance value j before processing is more than the lower limit luminance value Lv and not more than the upper limit value Hv, the luminance value CLUT [j] after processing increases linearly in proportion to the luminance value j before processing. In the case where the luminance value j before processing is more than the upper limit luminance value Hv and not more than the upper limit value Vmax in the pixel luminance range, the luminance value CLUT [j] after processing is the upper limit value Vmax.

FIG. 3 is referred to again. Next, at step a14, the luminance correction LUT generation unit 45 generates a luminance correction lookup table CaLUT on the basis of the contrast correction lookup table CLUT and the gradation correction lookup table RLUT. The luminance correction lookup table CaLUT is obtained by one-to-one correspondence between the luminance value k (k=0, 1, 2, . . . , Vmax) before processing and the luminance value CaLUT[k] (k=0, 1, 2, . . . , Vmax) after processing. The luminance correction LUT generation unit 45 subjects the luminance correction lookup table CaLUT generated at step a14 to memorization in the second memory region of the data memory unit 39 at step a15. More specifically, a plurality of small regions individually corresponding to the luminance values k before processing have been set in advance in the second memory region, and the luminance values CaLUT[k] after processing are memorized in the small regions.

The luminance correction lookup table CaLUT will be described below in detail. The luminance value CaLUT[k] after processing in the luminance correction lookup table CaLUT is defined by expression 11.

CaLUT[k]=RLUT[CLUT[k]]

k=0, 1, 2, . . . , Vmax            (11)

The luminance value CaLUT[k] after processing corresponding to a given luminance value k before processing is determined by the following procedure. First, the luminance value CLUT[k] after processing in the contrast correction lookup table corresponding to the given luminance value k before processing is obtained. Next, the luminance value RLUT[CLUT[k]] after processing, corresponding to the luminance value i before processing and being equal to the obtained luminance value CLUT[k] after processing, is obtained in the gradation correction lookup table RLUT. In the end, the obtained luminance value RLUT[CLUT[k]] after processing is defined as the luminance value CaLUT[k] after processing in the luminance correction LUT and memorized in the small region corresponding to the given luminance value k before processing in the second memory region.

In other words, the relationship between the luminance value k before processing and the luminance value CaLUT [k] after processing in the luminance correction LUT is as described below. In the case where the luminance value k before processing is not less than the lower limit value Vmin and not more than the lower limit luminance value Lv in the pixel luminance range, the luminance value CaLUT[k] after processing is the lower limit value Vmin, that is, zero. In the case where the luminance value k before processing is more than the lower limit luminance value Lv and not more than the upper limit luminance value Hv, the luminance value CLUT[k] after processing changes in accordance with the luminance conversion curve 14 of the gradation correction lookup table RLUT. In the case where the luminance value k before processing is more than the upper limit luminance value Hv and not more than the upper limit value Vmax in the pixel luminance range, the luminance value CaLUT[k] after processing is the upper limit value Vmax. The curve 72 of FIG. 7 is a luminance conversion curve representing the relationship between the luminance value k before processing and the luminance value CaLUT[k] after processing in the luminance correction lookup table CaLUT. The shape of the portion in the range more than the lower limit luminance value Lv and not more than the upper limit luminance value Hv in the luminance conversion curve 72 is equal to the shape of the portion reduced in parallel with the abscissa of the graph in the range not less than the lower limit value Vmin and not more than the upper limit value Vmax in the luminance conversion curve 14.

FIG. 3 is referred to again. At step a16, the image luminance conversion unit 46 subjects the input image data 51 to a luminance conversion process on the basis of the luminance correction lookup table CaLUT. More specifically, the image luminance conversion unit 46 first reads the luminance correction lookup table CaLUT from the second memory region of the data memory unit 39. Next, the image luminance conversion unit 46 reads the input image data 51 memorized in the first memory region of the data memory unit 39 in the same way. The pixel data f(x, y) of the input image data 51 is converted on the basis of expression 12 described below and the luminance correction lookup table CaLUT to obtain the pixel data g(x, y) of the output image data 51. A predetermined fourth memory region in the data memory unit 39 is provided with a plurality of small regions for memorizing the pixel data of the output image data 52. The obtained pixel data g(x, y) is memorized in the small regions. "(x, y)" in f(x, y) and g(x, y) represents positional coordinates of each pixel corresponding to pixel data in the input and output images, and x and y represent given integers respectively.

$g(x,y)=CaLUT[f(x,y)]$            (12)

In other words, given pixel data f(x, y) of the input image data 51 is converted into the pixel data g(x, y) of the output image data by the following procedure. First, the luminance value k before processing, being equal to the given pixel data f(x, y) of the input image data 51, is searched for from the luminance correction lookup table CaLUT; and then, the luminance value CaLUT [f(x, y)] after processing corresponding to the searched luminance value k before processing is obtained. In the end, the obtained luminance value CaLUT[f(x, y)] after processing is determined as the pixel data g(x, y) of the output image data 51 corresponding to the given pixel data f(x, y) of the input image data 51, and the determined image data g(x, y) is memorized in the small regions. When the process of the procedure is carried out for all the pixel data f(x, y) in the input image data, all the pixel data g(x, y) constituting the output image data 52 is memorized in the fourth memory region. As a result, the output image data 52 can be obtained. In the end, at step a17, the generated output image data 52 is supplied to the display device 35, thereby completing the image correction process at step a18.

The reason why the judgment at step a3 is carried out will be described below. At the time when contents are converted into data by using the so-called authoring system for electronic publishing, each entire page of the contents is regarded as a picture, and an electronic publication may be formed from image data representing each entire page. In the case where the image processing device 31 of the embodiment is used as the authoring system, each page of the contents is read by a scanner to generate a plurality of input image data items, and the input image data is subjected to the image correction process of FIG. 3. Accordingly, the image correction process is repeated plural times. The pages of the contents are equal to one another with respect to paper quality and print ink. Therefore, in the case of repeating the image correction process plural times, at the first image correction process, a negative response should be given to the judgment at step a3 and the luminance correction lookup table CaLUT should be generated at steps a3 to a15; and at the second and following image correction processes, an affirmative response should be given to the judgment at step a3 and the process at step a16 should be carried out by using the luminance correction lookup table CaLUT generated at the time when the input image data of the first page is subjected to the image correction process. As a result, in the case of repeating the image correction process plural times, the second and following image correction processes can be simplified, whereby it is possible to shorten the time required for processing. The affirmative or negative response to the judgment at step a3 may be determined depending on the result of the operation of the operation unit 40 by the operator, or the judgment may be performed automatically by the data processing device 34 itself.

In addition, in the case of repeating the image correction process plural times, in the first image correction process, input image data generated, by reading pages among the pages of the contents on which only characters are printed, by using a scanner, should preferably be processed. This is because the contrast [Hv, Lv] of the estimated input image is unlikely to cause errors, since the curve representing the distribution of the appearance frequency of the luminance values of the luminance histogram of the data surely includes two distinct rising portions. Therefore, the luminance correction lookup table CaLUT can surely conform to the paper quality and print ink of the pages of the contents.

Furthermore, in the case, in the first image correction process, test image data prepared beforehand may be processed, and in the second and following image correction processes, image data generated by reading each page of the contents may be processed. By using the print ink having the same color as that of the pages of the contents, a pattern wherein the area ratio of the background portion is equal to the area ratio of the portion to be printed in print ink is printed on paper having the same quality as that of each page of the contents, and the surface of the paper on which the pattern is printed is read by a scanner to generate the test image data. Even when this method is used, the generated luminance correction lookup table CaLUT can also surely conform to the paper quality and the color of the print ink on each page of the contents.

Moreover, even in the second and following image correction processes, in the case where the input image data to be processed does not conform to the luminance correction lookup table CaLUT, a negative response may be given to the judgment at step a3, and the luminance correction lookup table CaLUT may be regenerated. As examples of the case, a case wherein the quality of the paper of the page having been read at the time of generating the input image data to be processed differs from the paper quality of the other pages, a case wherein the color of the print ink on the page having been read differs from the color of the print ink of the other pages, and a case wherein a picture is included in the page having been read can be included for example.

The reason why the judgment at step a7 is carried out will be described below. For example, in the case where the image processing device 31 is used to generate the electronic publication, the image printed on the manuscript to be read by the scanner may sometimes be the so-called document image. The document image includes only characters in the image. In this case, if the number of characters is scarce or the lines constituting the characters are thin, the number of the pixel data of the luminance values corresponding to the color of the characters in the input image data 51 may be nearly equal to the number of the pixel data of luminance values other than the luminance values corresponding to the color of the characters. In this case, no distinct rising portion may appear in the low range W1 of the luminance histogram curve 61; in this case, the luminance value having the highest appearance frequency among the luminance values in the low range W2 does not necessarily correspond to the color of the characters or a color similar to the color of the characters. Therefore, in the case, if the lower limit luminance value Lv of the contrast is estimated on the basis of the luminance value Lmax corresponding to the smaller maximum value of the curve 61, the lower limit luminance value Lv may not coincide with the luminance value corresponding to the actual color of the characters. Therefore, to prevent the lower limit luminance value Lv from becoming in error, the estimation method for the lower limit luminance value Lv is changed by the judgment at step a7.

In addition, the judgment at step a7 does not carry out any judgment as to whether the maximum value of the appearance frequency in the high range W2 is not less than the threshold value Th because of the following reason. The luminance value corresponding to the rising portion in the high range W2 of the curve 61 is estimated to correspond to the color of the background of the input image or a color very close to the color of the background of the input image. The pixels having the luminance value corresponding to the rising portion as pixel data constitute the background portion of the input image. It is estimated that the number of the pixels constituting the background portion of the input image is far more than the number of the pixels constituting the remaining portions other than the background region in the input image, that is, the number of the pixels constituting the lines and dots drawn in the input image. Therefore, it is estimated that the appearance frequency of the luminance value in the input image data 51 is far higher than the appearance frequency of the other luminance values. Accordingly, it is regarded that a distinct rising portion is surely present in the high range W2 of the curve 61; therefore, no judgment is carried out as to whether the rising portion is present or not.

In addition, in the image correction process of FIG. 3, instead of the LUT generation process at steps a14 and a15, the luminance correction lookup table CaLUT may be generated on the basis of expressions 13 to 15.

$$\text{CaLUT}[i]=0: i<Lv \tag{13}$$

$$CaLUT[i] = RLUT\left[\frac{V\max}{Hv - Lv} \times (i - Lv)\right] : Lv \leq i \leq Hv \tag{14}$$

$$\text{CaLUT}[i]=V\max: i>Hv \tag{15}$$

The luminance value CaLUT[k] after processing corresponding to a given luminance value k before processing is determined by the following procedure. First, a judgment is made as to whether the given luminance value k before processing is not less than the lower limit luminance value Lv and less than the upper limit luminance value Hv. If the given luminance value before processing is less than the lower limit luminance value Lv, the luminance value CaLUT[k] after processing is determined to zero on the basis of expression 13. If the given luminance value before processing is not less than the lower limit luminance value Lv and not more than the upper limit luminance value Hv, the right side of expression 14 is calculated, and the luminance value CaLUT[k] after processing is determined as the calculated value. If the given luminance value before processing is more than the upper limit luminance value Hv, the luminance value CaLUT[k] after processing is determined as the upper limit value Vmax on the basis of expression 15. In the end, each determined luminance value CaLUT[k] after processing is memorized in the small regions in the second memory region corresponding to the given luminance value k before processing. As a result, the luminance correction lookup table CaLUT can be generated directly by using the gradation correction lookup table RLUT and the input image contrast [Lv, Hv], without generating the contrast correction lookup table CLUT. Therefore, time and labor for generating the contrast correction lookup table CLUT can be saved, and the table generation process can be simplified.

Furthermore, the gradation correction lookup table is generated in advance depending on the display device 35 and memorized in the gradation correction LUT memory unit 44. In the case where the display device 35 in the image processing device 31 is replaced with other display device having different gradation characteristics, the memory contents of the memory unit 44 are just changed depending on the gradation characteristics of the other display device; it is not necessary to change the process at each step of the image correction process of FIG. 3. For this reason, in the case of replacing the display device 35, the change portions in the data processing device 34 are few, whereby the work associated with the replacement of the display device 35 can be simplified.

In the image correction process of FIG. 3, the luminance correction unit 38 may sequentially subject the input image data 51 to the luminance conversion process on the basis of the gradation correction lookup table RLUT and the luminance conversion process on the basis of the contrast correction lookup table CLUT without generating the luminance correction lookup table CaLUT. In the case where the luminance correction lookup table CaLUT is generated as described above, the image luminance conversion unit 46 subjects the input image data 51 to the luminance conversion process only once; therefore, the contrast correction and the gradation correction are carried out simultaneously by the onetime luminance conversion process, whereby the process is simplified. In addition, the process may be simplified by omitting steps a7, a10 and a11, and by connecting step a6 to step a8.

In the case where the output image data obtained by the image correction process is displayed on the display device 35, the contrast of the image to be displayed is expanded to the maximum contrast [Vmin, Vmax] in conformity with the data standard. Accordingly, the contrast can be improved by eliminating the effects of the paper quality, the color of the print ink and the like of the manuscript for the input image data from the contrast of the image to be displayed on the display device. In addition, since the gradation characteristics of the display device 35 are corrected by the relationship between the pixel data of the output image data and the pixels of the input image, the entire gradation characteristics of the image processing device 31 become linear. The relationship corresponds to the input/output characteristics of the system comprising the image input device 33 and the data processing device 34. In other words, the bias in the gradation characteristics of the display device 35 is absorbed by the output image data. In this way, by subjecting the input image data to the image correction process, the gradation characteristics of the display device 35 can be corrected. For these reasons, the image processing device 31 of the first embodiment simultaneously corrects the contrast of the input image and the display characteristics of the display device 35, thereby being capable of improving the visibility of the image displayed on the display device 35.

An image processing device in accordance with a second embodiment of the invention will be describe below. The image processing device in accordance with the second embodiment is different from the image processing device in accordance with the first embodiment in that the data processing device 34 is replaced with the data processing device 81 shown in FIG. 8, and is equal in the other respects; therefore, the devices, data and tables having the same configurations are designated by the same numeral codes, and their explanations are omitted.

Figure 8:
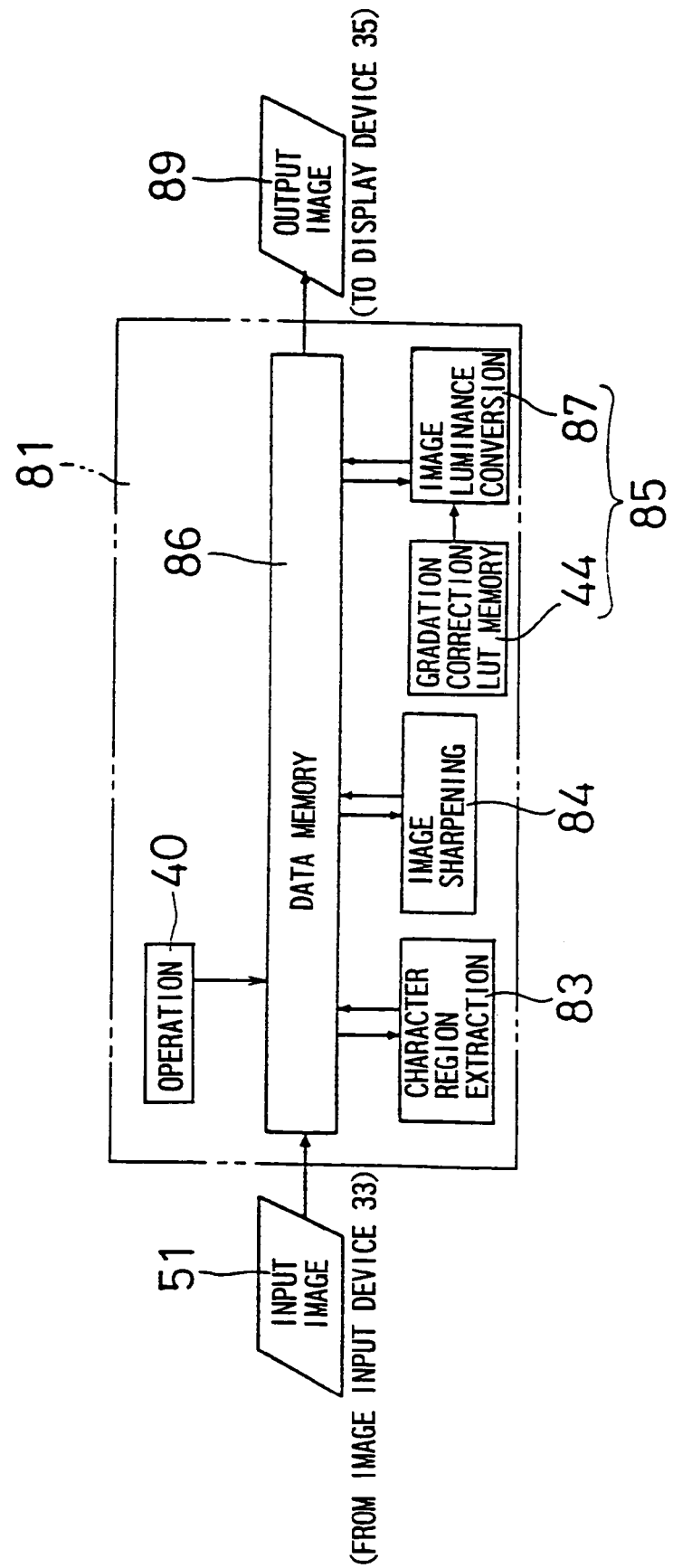
FIG. 8 is a block diagram showing the electrical configuration of a data processing device 81 in an image processing device in accordance with a second embodiment.

FIG. 8 is a block diagram showing the electrical configuration of the data processing device 81 in the image processing device in accordance with the second embodiment. The data processing device 81 includes a character region extracting unit 83, an image sharpening unit 84, a luminance correction unit 85, a data memory unit 86 and an operation unit 40. The luminance correction unit 85 includes a gradation correction LUT memory unit 44 and an image luminance conversion unit 87. The character region extracting unit 83 extracts one or a plurality of character regions from an input image 51. The character region is a portion having characters in the input image 51. The image sharpening unit 84 subjects the input image data 51 to the so-called selective sharpening process on the basis of the result of the extraction of the character regions of the character region extracting unit 83. In this case, the sharpening level of the sharpening process performed for the character regions in the input image is higher than the sharpening level of the sharpening process performed for the remaining regions other than the character regions in the input image. The input image data 51 having been subjected to the sharpening process is referred to as sharpened-image data.

The luminance correction unit 85 subjects the sharpened-image data to a luminance correction process on the basis of the gradation correction lookup table RLUT. Therefore, the data memory unit 39 and the image luminance conversion unit 46 subject the pixel data of the sharpened-image data to a luminance conversion process on the basis of the gradation correction lookup table RLUT. The set of the pixel data subjected to the luminance conversion process is output image data 89. When the character region extracting unit 83, the image sharpening unit 84 and the luminance correction unit 85 carry out the processes respectively, the data memory unit 86 temporarily memorizes various kinds of data used for the processes. Therefore, a plurality of memory regions for memorizing the various kinds of data respectively are set in the data memory unit 86. It is assumed that the addresses of the memory regions have been determined in advance. The data memory unit 86 is attained by a random access memory for example.

The character region extracting unit 83, the image sharpening unit 84 and the image luminance conversion unit 87 are attained by independent circuits respectively. In addition, at least two units of the units 83, 84 and 87 may be imaginary circuits attained by the arithmetic processes of a single central arithmetic processing circuit.

First, the sharpening process will be described generally. The sharpening process is generally represented by expression 16. Expressions 16 to 18 are disclosed on page 549 of "Image Analysis Handbook" (supervised by Mikio Takagi and Haruhisa Shimoda, published by University of Tokyo Press). "F(x, y) in the following expression is a functional representation of the input image data 51. "$\nabla^2 F(x, y)$" is a functional representation of the so-called Laplacian image. "G(x, y)" is a functional representation of the sharpened-image. "h(x, y)" represents a sharpening level.

$$G(x,y)=F(x,y)-h(x,y)\times\nabla^2 F(x,y) \tag{16}$$

$$h(x,y)=\text{constant: uniform sharpening process} \tag{17}$$

$$h(x,y)\neq\text{constant: selective sharpening process} \tag{18}$$

If the sharpening level h(x, y) is a predetermined constant at all times as represented by expression 17, the sharpening process is uniformly performed for the entire input image on the basis of expression 16. In addition, if the sharpening level is a value changing on the basis of the predetermined condition in each pixel as represented in expression 18, the so-called selective image sharpening process is performed for the input image on the basis of expression 16. For example, in the case where the sharpening level h(x, y) is determined by the so-called line detection operator, only the vicinities of the linear structure portions in the input image are sharpened.

It is assumed that the input image data 51 is generated by reading a manuscript comprising pictures and characters printed on paper by using a scanner. Portions in the input image in which characters are drawn are referred to as character regions. In this case, when the input image data is subjected to a sharpening process, characters become easy to read generally since the contrast around the edges thereof becomes high. However, if the sharpening level is too high, the luminance of the pixel near the edge of the character in the image is biased to true white or true black, whereby the character may appear to be similar to a binary image. As a result, the character becomes collapsed or faded; therefore, the character becomes hard to read on the contrary. In particular, the problem occurs remarkably in the case of characters wherein the number of pixels constituting one character is less than the number of pixels required to clearly display the one character because of the structure of the display device. For example, in the case of displaying characters by using halftone, pixels of 20 dots×20 dots or more are required to display printed general characters including Chinese characters in a legible size; in the case where an attempt is made to display characters by using fewer pixels, the problem will occur.

In addition, pictures are drawn by the same method as that for the so-called light-and-dark image or the same method as that for the so-called dot image. In the case where the sharpening process is performed for a picture drawn by the same method as that for the light-and-dark image, the noise included in the input image data is intensified; therefore, the appearance may become coarse or jaggies may become conspicuous at edges. In addition, in the case where the sharpening process is performed for a picture drawn by the same method as that for the dot image, the high frequency components of the spatial frequency are intensified, and moires may occur. To prevent these problems, in the image processing device of the embodiment, the sharpening level h(x, y) of the character regions in the input image data 51 is made different from that of the remaining regions.

Figure 9:
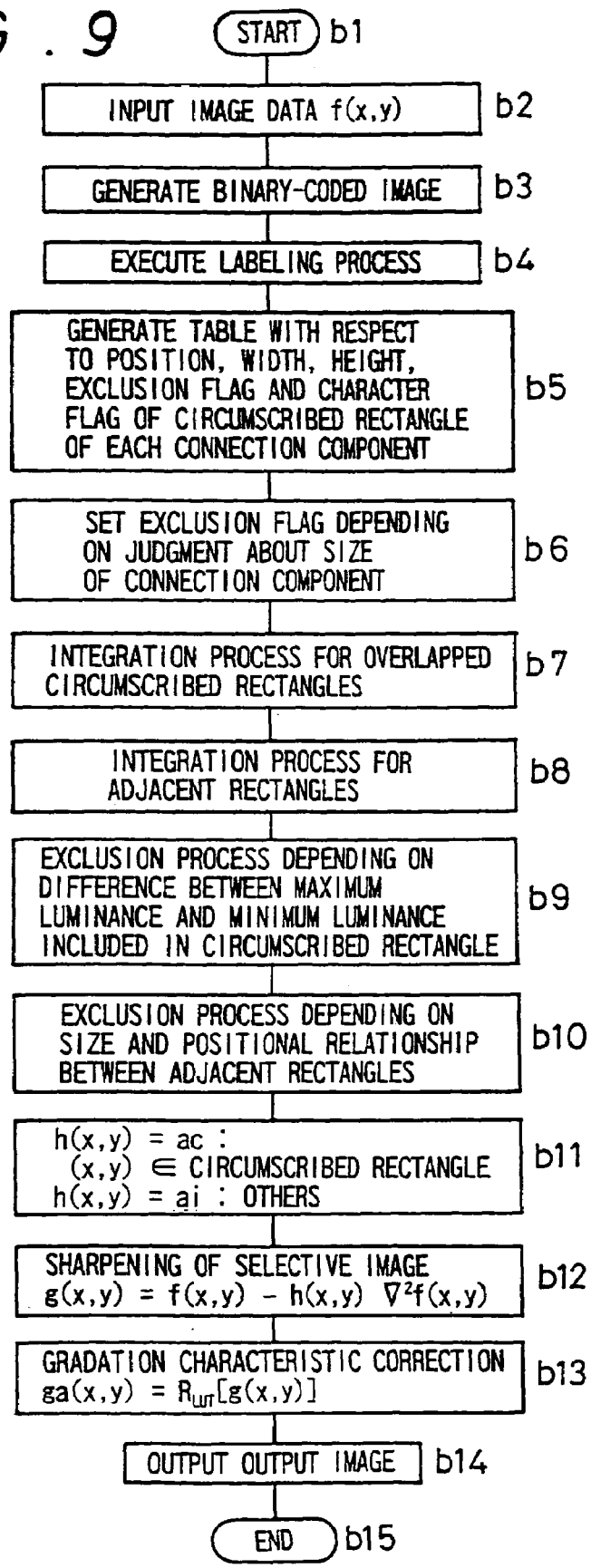
FIG. 9 is a flowchart explaining the image correction process executed by the image processing device in accordance with the second embodiment.

FIG. 9 is a flowchart explaining the image correction process carried out by the image processing device of the second embodiment. The image correction process will be described by using the flowchart of FIG. 9. For example, when the operator of the image processing device instructs to execute the image correction process by using the operation unit 40, the process advances from step b1 to step b2.

Figure 10:
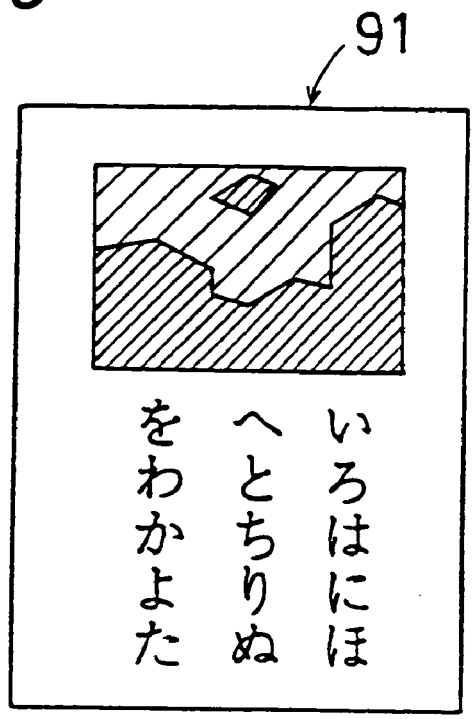
FIG. 10 is a view showing an input image 91 represented by the input image data 51 supplied to the data processing device 81.

First, at step b2, an image input device 33 subjects input image data 51 to memorization in the predetermined first memory region of the data memory unit 86. The input image data 51 may be generated after the image correction process has started or may be generated in advance before the image correction process starts. An example of an input image 91 represented by the input image data 51 is shown in FIG. 10. In FIG. 10, the dark portions of the picture is shown by using oblique lines, and it is assumed that the portion is darker as the number of the oblique lines is larger.

Figure 11:
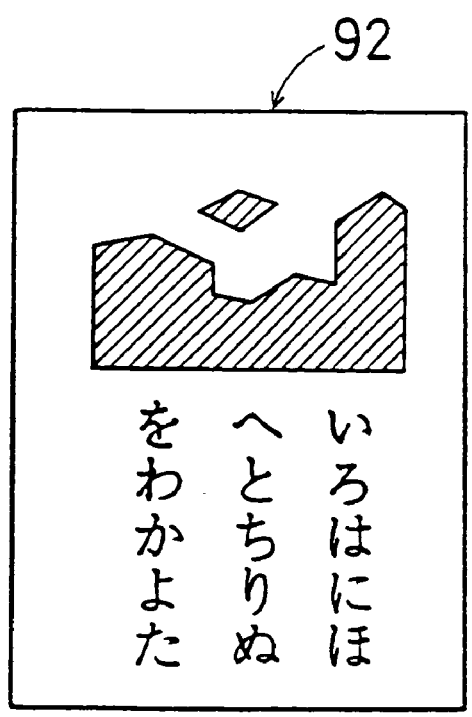
FIG. 11 is a view showing a label image 92 represented by label image data used as the binary-coded input image data 51.
Figure 12:
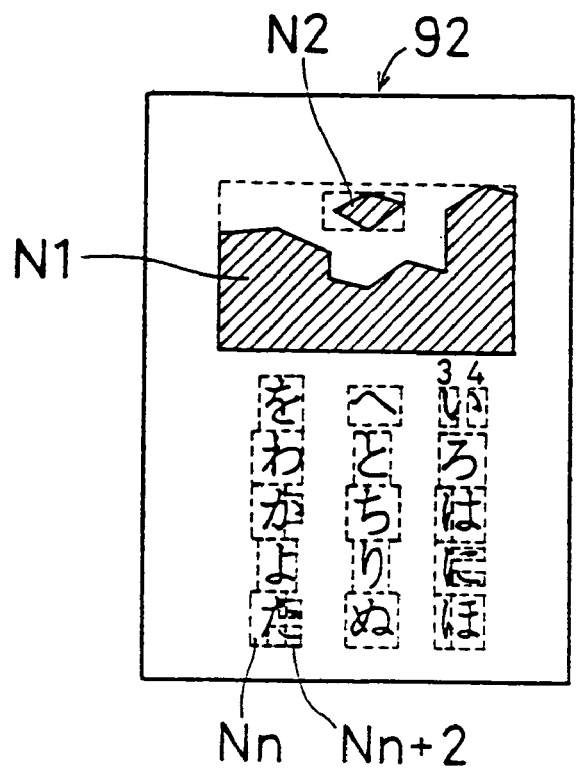
FIG. 12 is a view showing the circumscribed rectangles N1 to Nn+2 of the blocks of connected pixels in the label image 92 obtained after a circumscribed rectangle extraction process in the image correction process of FIG. 9.
Figure 13:
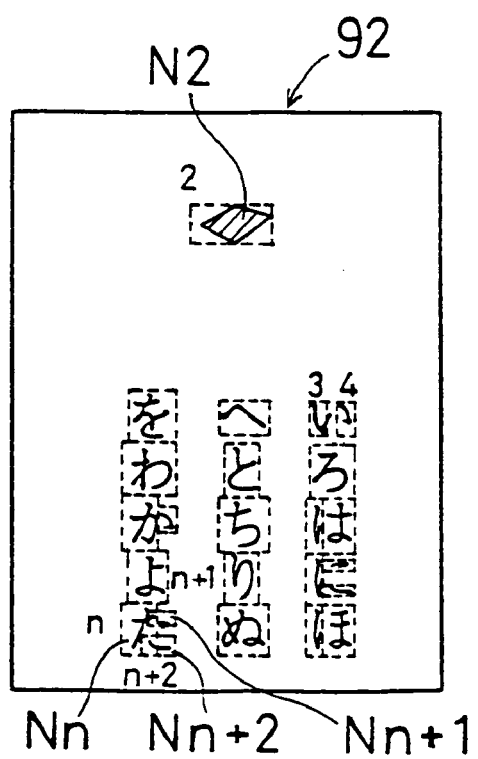
FIG. 13 is a view showing the circumscribed rectangles N2 to Nn+2 of the blocks of connected pixels in the label image 92 obtained after a first exclusion process in the image correction process of FIG. 9.

Next, the character region extracting unit 83 performs a character region extraction process at steps b3 to b10. More specifically, first, the character region extracting unit 83 subjects the input image data to a binary-coding process at step b3. Accordingly, among all the pixel data of the input image, the pixel data corresponding to the pixels constituting the background portion of the input image 91 is converted into "0", and the remaining pixel data other than the pixel data corresponding to the pixels constituting the background portion is converted into "1." The remaining pixel data corresponds to the pixels constituting lines and dots for forming characters, and pixels constituting the dark portions of pictures and photographs. The input image data subjected to the binary-coding process is referred to as binary image data, and the image represented by the binary image data is referred to as a binary image. The pixel data of the binary image data is not used to mean luminance values. The binary image data is memorized in the predetermined second memory region of the data memory unit 86. More specifically, the binary-coding process is performed by using the discrimination analysis method, the mode method or the differential histogram method for example, and the parameters of the methods are adjusted so that the pixel data of the input image data can be converted as described above. A binary image 92 is shown in FIG. 11. In FIG. 11, a pixel with pixel data "1" is represented by a black pixel, and a pixel with pixel data "0" is represented by a white pixel. It is assumed that the pixels in the regions with oblique lines in FIGS. 11 to 13 are all black pixels.

Next, at step b4, the character region extracting unit 83 obtains all the blocks of connected pixels of the pixels with the pixel data 1 in the binary image 92. The block of connected pixels is a portion wherein a plurality of pixels with pixel data 1 are adjacent to one another sequentially in the binary image 92. In other words, all the pixels constituting the block of connected pixels have pixel data 1, and a given pixel constituting the block of connected pixels is adjacent to at least one of the other pixels constituting the block of connected pixels. Therefore, the character region extracting unit 83 subjects the binary data to the so-called labeling process, whereby the same label, that is, the same number, is assigned to pixel data corresponding to the pixels constituting a single block of connected pixels. Since the details of the labeling process are the same as those of the known technology, the detailed explanation thereof is omitted.

In the case where the labeling process is performed for the binary image data representing the binary image 92 of FIG. 11, a plurality of blocks of connected pixels are obtained. At the time when the process at step b4 is completed, in the case of a character having a plurality of lines constituting the character, such as "いい," the respective lines are taken as independent blocks of connected pixels, and different labels are assigned to the lines. Furthermore, in the case where a picture is drawn as the so-called light-and-dark image, the dark portion of the picture is regarded as one block of connected pixels. Moreover, in the case where a picture is drawn as the so-called dot image, a plurality of dots formed of two or more pixels are regarded respectively as independent blocks of connected pixels.

Next, the character region extracting unit 83 obtains a circumscribed rectangle of each block of connected pixels obtained at step b4. Since the block of connected pixels is estimated as a character, the obtained circumscribed rectangle becomes a candidate for the character region. Next, the character region extracting unit 83 generates a labeling table. The labeling table is a table that provides correspondence among the labels assigned to the pixels constituting each block of connected pixels for each circumscribed rectangle, parameters for defining the circumscribed rectangle of each block of connected pixels, the exclusion flag for each circumscribed rectangle and the character flag for each circumscribed rectangle. The parameters for regulating the ith circumscribed rectangle are the coordinates (si, ti) of the upper left apex of the circumscribed rectangle, the coordinates (ui, vi) of the lower left apex of the circumscribed rectangle and the height hi and the width wi of the circumscribed rectangle. i is a given integer. The coordinates of the apexes are the coordinates of the two-dimensional coordinate system having been set for the binary image 92 to specify the positions of the pixels in the binary image 92. The exclusion flags for the circumscribed rectangles represent that all are in the reset state in the initial state at step b5 and that each circumscribed rectangle is a candidate for a character region. The exclusion flag for a circumscribed rectangle, which is judged not to be a character region by an exclusion process described later, is set. The character flag for each circumscribed rectangle is used for a third exclusion process described later. The labeling table is memorized in the predetermined third memory region of the data memory unit 86.

TABLE 2

| Label | Upper left coordinates | Lower right coordinates | Width (dots) | Height (dots) | Exclusion flag | Character flag |
|---|---|---|---|---|---|---|
| 1 | (100, 100) | (400, 250) | 300 | 150 | 0 | 0 |
| 2 | (220, 120) | (280, 150) | 60 | 30 | 0 | 0 |
| 3 | (350, 300) | (360, 330) | 10 | 30 | 0 | 0 |
| . | . | . | . | . | . | . |
| . | . | . | . | . | . | . |
| . | . | . | . | . | . | . |
| n | (110, 600) | (135, 640) | 25 | 40 | 0 | 0 |
| n + 1 | (120, 610) | (150, 620) | 30 | 10 | 0 | 0 |
| n + 2 | (110, 630) | (150, 640) | 40 | 10 | 0 | 0 |

TABLE 2 is a labeling table generated in the case where circumscribed rectangles are obtained on the basis of the binary image 92 of FIG. 11. In addition, the circumscribed rectangles N1 to Nn+2 at the blocks of connected pixels obtained in this case are shown in FIG. 12. Hereinafter, it is assumed that the x coordinate value x and the y coordinate value y of the coordinates (x, y) correspond to the numbers of the pixels in the range from a predetermined reference point in the binary image 92 to the row and the column corresponding to the pixel located at the coordinates (x, y) in parallel with the x-coordinate axis and the y-coordinate axis. In addition, the unit of the width and the height of the circumscribed rectangle is assumed to be the number of dots, that is, the number of pixels. At the time when the process at step b5 is completed, a character formed of one line, such as "ろ," is included in a single circumscribed rectangle. On the other hand, in the case of a character having a plurality of lines to form the character, such as "い," each line is included in an independent circumscribed rectangle, and the entire character is not included in one circumscribed rectangle.

In other words, the process at steps b3 and b4 is a circumscribed rectangle setting process for setting a circumscribed rectangle circumscribing the blocks of connected pixels formed of a plurality of connected pixels having similar luminance in the input image 91. Since the block of connected pixels is estimated as a character, the circumscribed rectangle to be set becomes a candidate for a character region. However, in the case where only the circumscribed rectangle setting process is performed, a single character may sometimes be not included in a single circumscribed rectangle owing to the shape of the character just like the "い." In addition, in the case of the case, in addition to the circumscribed rectangles of the characters, the circumscribed rectangles for the dark portions of the picture are also obtained simultaneously. Furthermore, in the case, if ruled lines are drawn in the input image 91, the circumscribed rectangles of the ruled lines are also obtained simultaneously. Therefore, the character region extracting unit 83 selects only the circumscribed rectangles of characters from among all the circumscribed rectangles obtained by the circumscribed rectangle setting process by the character judgment process at steps b6 to b10.

First, at step b6, the character region extracting unit 83 performs a first exclusion process to exclude the circumscribed rectangles circumscribing blocks of connected pixels other than those of the characters from among all the circumscribed rectangles on the basis of the size of each circumscribed rectangle. Therefore, the character region extracting unit 83 judges whether the height and width of each circumscribed rectangle memorized in the labeling table conform to the first exclusion condition regarding the height and width of a predetermined character to be sharpened respectively. The first exclusion condition is represented by expression 19.

$$(hi \geq Smax) \text{ or } (hi \geq Smin) \text{ or } (wi \geq Smax) \text{ or } (wi \leq 5min) \quad (19)$$

In the case where at least one of the height hi and the width wi of the circumscribed rectangle having a given label number i satisfies at least one of the conditions of the terms of expression 19, it is judged that the first exclusion condition is satisfied. Smin is the minimum value of the height and width of a character to be sharpened. Smax is the maximum value of the height and width of a character to be sharpened. For example, the minimum value 5 min is 2 dots, and the maximum value Smax is 30 dots. Whether a character is legible or not is determined by the number of dots constituting the character. The specific values of the minimum value 5 min and the maximum value Smax are those in the case of handling the data of display resolution. Blocks of connected pixels of two dots or less are excluded because they may be noise occurred at the time of dot formation or binary coding. Blocks of connected pixels of 30 dots or more are not so required to be strongly sharpened and thus excluded, because even if they are characters, the characters having so many dots are legible. Furthermore, in the case of an image having a resolution higher than the display resolution, that is, an image obtained at the time of being read by using a scanner, the minimum value 5 min and the maximum value Smax become values multiplied by (input resolution/display resolution). In generally-used Japanese fonts, the circumscribed rectangles of characters have various shapes, such as a square, a vertically long rectangle, a horizontally long rectangle and the like; therefore, the maximum value of the height is made equal to the maximum value of the width, and the minimum value of the height is also made equal to the minimum value of the width.

The character region extracting unit 83 excludes the circumscribed rectangles conforming to the first exclusion condition from the labeling table. More specifically, the exclusion flags for the circumscribed rectangles conforming to the first exclusion condition are set. In the case where the exclusion flags are set, the circumscribed rectangles corresponding to the exclusion flags are excluded from the candidates for character regions; and in the case where they are not set, the circumscribed rectangles corresponding to the exclusion flags are regarded as the candidates for character regions.

Generally, a dark portion in a picture drawn by the same method as that for a light-and-dark image is larger than a character to be sharpened. In addition, a dot in a picture drawn by the same method as that for a dot image is smaller than a character to be sharpened. Furthermore, in the case of a ruled line, one of the height and width thereof is larger than a character to be sharpened. Therefore, the circumscribed rectangles of dark portions in a picture and ruled lines can be excluded from the candidates for character regions by the first exclusion process.

TABLE 3

| Label | Upper left coordinates | Lower right coordinates | Width (dots) | Height (dots) | Exclusion flag | Character flag |
|---|---|---|---|---|---|---|
| 2 | (220, 120) | (280, 150) | 60 | 30 | 0 | 0 |
| 3 | (350, 300) | (360, 330) | 10 | 30 | 0 | 0 |
| . | . | . | . | . | . | . |
| . | . | . | . | . | . | . |
| . | . | . | . | . | . | . |
| n | (110, 600) | (135, 640) | 25 | 40 | 0 | 0 |
| n + 1 | (120, 610) | (150, 620) | 30 | 10 | 0 | 0 |
| n + 2 | (110, 630) | (150, 640) | 40 | 10 | 0 | 0 |

TABLE 3 represents a labeling table at the time when the process at step b6 is completed in the case where the input image 91 of FIG. 10 is processed. In addition, FIG. 13 shows circumscribed rectangles N2 to Nn+2 remaining in the labeling table at the time. At the time, the circumscribed rectangle N1 having label number 1 is excluded from the candidate for a character region since it circumscribes a block of connected pixels corresponding to a dark portion in the picture; however, the circumscribed rectangle N2 having label number 2 is not excluded from the candidate for a character region, although it circumscribes a block of connected pixels corresponding to a dark portion in the picture, because the height and width of the block of connected pixels are close to the height and width of a character respectively. In addition, the circumscribed rectangles N3 to Nn+1 having label numbers 3 to n+1 are not excluded from the candidates for character regions, because they circumscribe characters or portions of the characters.

FIG. 9 is referred to again. Next, the character region extracting unit 83 performs a first integration process at step b7. In the first integration process, circumscribed rectangles with no exclusion flag set and overlapping one another are integrated into one circumscribed rectangle. Therefore, the character region extracting unit 83 judges whether one of the circumscribed rectangles with no exclusion flag set in the labeling table overlaps at least a portion of a circumscribed rectangle other than the one of the circumscribed rectangles. In the case where the one of the circumscribed rectangles overlaps at least a portion of a circumscribed rectangle other than the one of the circumscribed rectangles, first, a minimum circumscribed rectangle, in which the block of connected pixels of the one of the circumscribed rectangles and the block of connected pixels of the other circumscribed rectangle are included, is obtained. Next, the coordinates of the upper left and lower right apexes, width and height, in the labeling table, of one of the circumscribed rectangles among the one of the circumscribed rectangles and the other circumscribed rectangles are replaced with the coordinates of the upper left and lower right apexes, width and height of the obtained circumscribed rectangle so as to be renewed, and an exclusion flag is set for one of the one of the circumscribed rectangles and the other circumscribed rectangle. This process is repeated while changing the one of the circumscribed rectangles in the order of the label for example, and is continued until circumscribed rectangles overlapping other circumscribed rectangles are not present.

TABLE 4

| Label | Upper left coordinates | Lower right coordinates | Width (dots) | Height (dots) | Exclusion flag | Character flag |
|---|---|---|---|---|---|---|
| 2 | (220, 120) | (280, 150) | 60 | 30 | 0 | 0 |
| 3 | (350, 300) | (360, 330) | 10 | 30 | 0 | 0 |
| . | . | . | . | . | . | . |
| . | . | . | . | . | . | . |
| . | . | . | . | . | . | . |
| n | (110, 600) | (135, 640) | 25 | 40 | 0 | 0 |

TABLE 4 represents a labeling table at the time when the process at step b7 is completed in the case where the input image 91 of FIG. 10 is processed. In the time, the states of the circumscribed rectangles N1 to Nn−1 having label numbers 1 to n−1 are equal to the states in TABLE 3. In addition, the parameters of the circumscribed rectangle Nn having label number n are rewritten by the parameters of the circumscribed rectangle circumscribing the entire "た," and the circumscribed rectangles Nn+1 and Nn+2 having label numbers n+1 and n+2 are excluded from the candidates for character regions. Therefore, in the case where a single character is divided into a plurality of blocks of connected pixels, if the circumscribed rectangles circumscribing the blocks of connected pixels overlap one another, these circumscribed rectangles are integrated, whereby it is possible to obtain a single circumscribed rectangle circumscribing the entire character.

FIG. 9 is referred to again. Next, the character region extracting unit 83 performs a second integration process at step b8. In the second integration process, among circumscribed rectangles with no exclusion flag set, a circumscribed rectangle having a height-and-width ratio greatly different from a predetermined reference ratio is integrated with the circumscribed rectangles around the circumscribed rectangle having the different ratio into one circumscribed rectangle. The second integration process is performed in the case where a single character is divided into a plurality of blocks of connected pixels, just like "い" and when the circumscribed rectangles circumscribing the blocks of connected pixels do not overlap one another in order to obtain a single circumscribed rectangle circumscribing the entire character. The details of the second integration process will be described later. By performing the process at steps b7 and b8, it is possible to obtain a circumscribed rectangle circumscribing an entire character divided into a plurality of blocks of connected pixels, such as "た" and "い."

Next, the character region extracting unit 83 performs a second exclusion process at step b9. In the second exclusion process, a judgment is made as to whether each circumscribed rectangle with no exclusion flag set is a character region or not on the basis of the difference between the maximum value and the minimum value among the luminance values of the plurality of pixels constituting a portion corresponding to the circumscribed rectangle in the input image 91. Since the pixels in the input image 91 correspond one-to-one to the pixels in the binary image 92 respectively, the portion corresponding to the circumscribed rectangle in the input image 91 is a portion wherein a rectangle defined in the input image 91 by the same parameters as the parameters of the circumscribed rectangle is used as the outer circumference. TABLE 5 represents a labeling table at the time when the process at step b9 is completed in the case where the input image 91 of FIG. 10 is processed.

TABLE 5

| Label | Upper left coordinates | Lower right coordinates | Width (dots) | Height (dots) | Exclusion flag | Character flag |
|---|---|---|---|---|---|---|
| 3 | (350, 300) | (360, 330) | 10 | 30 | 0 | 0 |
| . | . | . | . | . | . | . |
| . | . | . | . | . | . | . |
| . | . | . | . | . | . | . |
| n | (110, 600) | (135, 640) | 25 | 40 | 0 | 0 |

Figure 14:
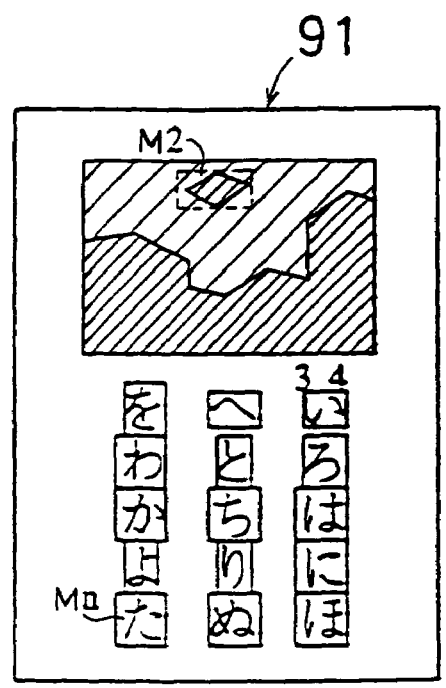
FIG. 14 is a view showing the portions M2 to Mn in the input image 91 corresponding to the circumscribed rectangles N2 to Nn+2 of the blocks of connected pixels in the label image 92 obtained after a second exclusion process in the image correction process of FIG. 9.

The reason why circumscribed rectangles other than character regions can be excluded from circumscribed rectangles with no exclusion f lag set by using the second exclusion process will be described referring to FIG. 14. The rectangles in FIG. 14 represent portions M2 to Mn in the input image 91 corresponding to the circumscribed rectangles remaining in the labeling table at the time when the process at step b9 is completed. The portion Mn in the input image 91 is a portion corresponding to the circumscribed rectangle Nn circumscribing a character, and the portion M2 in the input image 91 is a portion corresponding to the circumscribed rectangle N2 circumscribing a dark portion of the picture. The luminance value of the pixels constituting the lines of a character in the portion Mn corresponds to true black or a color close to true black, and the luminance value of the pixels constituting the background portion in the portion Mn corresponds to true white or a color close to true white. Therefore, it is regarded that the difference between the maximum value and the minimum value of the luminance values of the pixels constituting the portion Mn is nearly equal to the difference between the maximum value Vmax and the minimum value Vmin in the pixel luminance range.

On the other hand, the luminance value of the pixels constituting the portion adjacent to the dark portion of the picture in the portion M2 does not necessarily correspond to true white or a color close to true white. Therefore, the difference between the maximum value and the minimum value of the luminance values of the pixels constituting the portion M2 is likely to become smaller than the difference between the maximum value Vmax and the minimum value Vmin in the pixel luminance range. For this reason, a judgment as to whether the portion is a character region or not can be made on the basis of the difference between the maximum value and the minimum value of the luminance values of the plurality of pixels constituting the portions in the input image 91 corresponding to the circumscribed portion.

Therefore, the character region extracting unit 83 first obtains portions corresponding to the circumscribed rectangles in the input image 91. Next, for each of the corresponding portions, the maximum value and the minimum value of the pixel data of the plurality of pixels constituting the portion, that is, the maximum value and the minimum value of the luminance values of the plurality of pixels constituting the portion are obtained. Next, for each of the corresponding portions, a judgment as to whether the difference between the maximum value and the minimum value of the luminance values is more than a predetermined threshold value or not is made, and the exclusion flags for the circumscribed rectangles are set depending on the result of the judgment. In other words, it is regarded that the portion wherein the difference is more than the threshold value is highly likely to be a character region, and the exclusion flag for the circumscribed rectangle corresponding to the portion is retained in the reset state. The portion wherein the difference is not more than the threshold value is regarded as a portion of the picture, and the exclusion flag for the circumscribed rectangle corresponding to the portion is set.

Next, the character region extracting unit 83 performs a third exclusion process at step b10. In the third exclusion process, a judgment is made as to whether the circumscribed rectangles are character regions or not on the basis of the positional relationship among the circumscribed rectangles with no exclusion flag set and the presence or absence of resemblance in the size of the circumscribed rectangles. The third exclusion process is performed because of the following reason. In the case where the characters in the input image 91 constitute a sentence, if the sentence is written vertically, the circumscribed rectangles for the plurality of characters are arranged in the vertical direction; if the sentence is written horizontally, the circumscribed rectangles for the plurality of characters are arranged in the horizontal direction. Furthermore, in this case, the sizes of the circumscribed rectangles are nearly equal to one another. However, the circumscribed rectangle of a dark portion in the picture is isolated from the circumscribed rectangles of the characters if the dark portion is singular; even if the dark portions are plural, the circumscribed rectangles for the dark portions are arranged irregularly, and it is regarded that their sizes are different variously. Therefore, a judgment as to whether the circumscribed rectangles circumscribe characters or not can be made on the basis of the positional relationship and resemblance in size among the circumscribed rectangles. The detailed explanation of the third exclusion process is omitted.

By the process, the exclusion flags for the circumscribed rectangles of the characters remain reset in the labeling table, and the exclusion flags for the circumscribed rectangles for the blocks of connected pixels other than characters are set. The character region extracting unit 83 establishes the correspondence between the parameters of the circumscribed rectangles having the exclusion flags remaining reset and the labels of the circumscribed rectangles in the labeling table, and writes in the third memory region of the data memory unit 86. A final labeling table is formed from data written in the memory region. By the procedure, the character region extraction process is completed.

Next, at step b11, the image sharpening unit 84 sets the sharpening level h(x, y) of each pixel (x, y) of the input image 91 to perform an image sharpening process depending on region. Each of x and y is a given integer and determined uniquely on the basis of the coordinates of each pixel in the input image 91. The sharpening level h(x, y) of each pixel (x, y) is defined by expression 20. Predetermined first and second constants $\alpha c$ and $\alpha i$ are determined depending on the characteristics of the display device, the relationship between the character and the pixel with respect to size and how the user feels at the time of watching the display device 35, and input into the data processing device 81 in advance by the operator of the image processing device of the second embodiment. For example, the first constant αc is 0.5, and the second constant αi is 0.2.

$$(x, y) \in \text{remaining circumscribed rectangle}: h(x, y) = \alpha c \quad (20)$$
$$\text{Others}: h(x, y) = \alpha i$$
$$0 \leq \alpha i < \alpha c \leq 1.0$$

Figure 15:
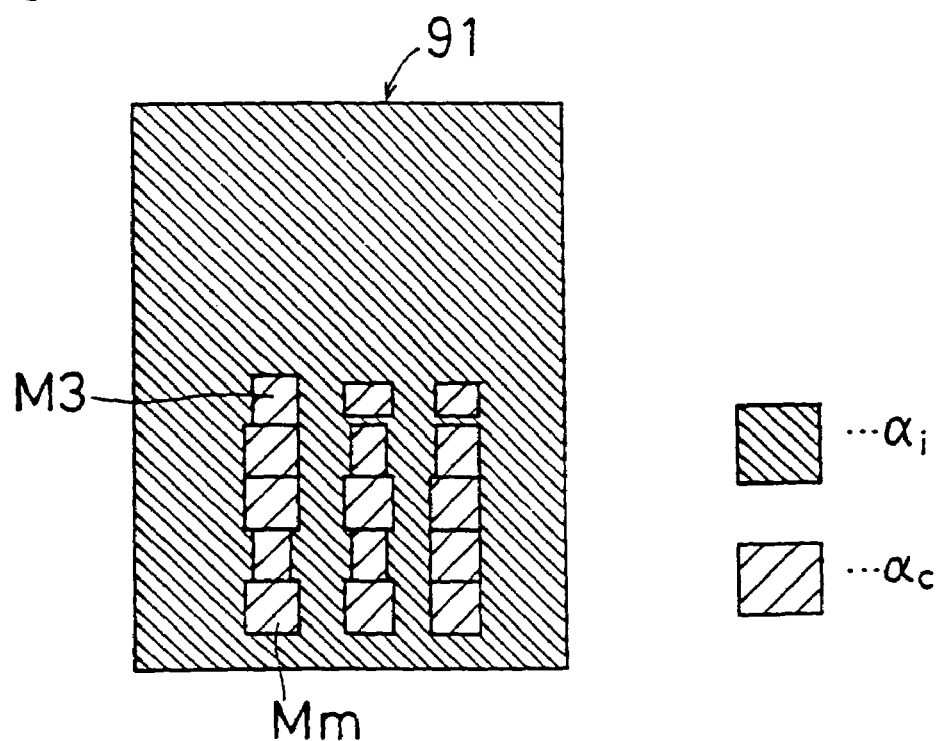
FIG. 15 is a view showing the sharpening level h(x, y) of each pixel set at step b11 of the image correction process of FIG. 9.

More specifically, the image sharpening unit 84 reads the final labeling table from the data memory unit 86. Next, a judgment is made as to whether each pixel (x, y) is within a circumscribed rectangle defined by the parameters of the circumscribed rectangle in the final labeling table, that is, within a character region. The sharpening level h(x, y) of a pixel in the character region is set at the predetermined first constant αc, and the sharpening level h(x, y) of a pixel outside the character region is set at the predetermined second constant αi. Accordingly, as shown in FIG. 15, only the sharpening level h(x, y) of the pixel in the character region is set at the first constant αc, and the sharpening level h(x, y) of the pixel outside the character region is set at the second constant αi.

Next, at step b12, the image sharpening unit 84 subjects the input image data 51 memorized in the data memory unit 86 to a selective image sharpening process by using the pixel sharpening level h(x, y) defined at step b11. More specifically, the pixel data f(x, y) of the input image data is converted on the basis of expression 21 by using the sharpening levels h(x, y) of the pixels corresponding to the pixel data to obtain the pixel data g(x, y) of a sharpened-image. f(x+1, y), f(x−1, y), f(x, y+1), f(x, y−1) are the pixel data of four adjacent pixels to which the pixel data f(x, y) corresponds. The set of the pixel data g(x, y) of the obtained sharpened-image is sharpened-image data G. In comparison with the input image data, the sharpened-image data only differs in the actual luminance values of the pixel data, and is equal in the other respects. The sharpened-image data G is memorized in the predetermined fourth memory region of the data memory unit 86. By the procedure, the image sharpening process is completed.

$$g(x, y) = \quad (21)$$
$$f(x, y) - h(x, y) \times \nabla^2 f(x, y) = f(x, y) - h(x, y) \times [f(x+1, y) +$$
$$f(x-1, y) + f(x, y+1) + f(x, y-1) - 4 \times f(x, y)]$$

Next, at step b13, the image luminance conversion unit 87 subjects the sharpened-image data G to a luminance correction process on the basis of the gradation correction lookup table RLUT. More specifically, the gradation characteristic correction lookup table RLUT is read out from the gradation correction LUT memory unit 44, and the sharpened-image data G is read out from the memory region of the data memory unit 86. Then, the pixel data g(x, y) of the sharpened-image data G is subject to luminance conversion on the basis of expression 22 and the gradation characteristic correction lookup table RLUT to obtain the pixel data ga(x, y) of the output image data 89. The obtained pixel data ga(x, y) is memorized at addresses in the predetermined fifth memory region of the data memory unit 86. The addresses are predetermined respectively on the basis of the positional coordinates of the pixels in the output image to which the obtained pixel data ga(x, y) corresponds.

$$ga(x,y)=RLUT[g(x,y)] \quad (22)$$

In comparison with the luminance conversion process of the image processing device of the first embodiment at step a16, the luminance conversion process at step b13 differs in that the sharpened-image data G instead of the input image data 51 is processed and in that the gradation correction lookup table RLUT is used instead of the luminance correction lookup table CaLUT, and is equal in the other respects. As a result, output image data 89 is obtained. In the end, at step b14, the obtained output image data 89 is supplied to the display device 35, and the image correction process ends is completed at step b15.

In the image correction process of FIG. 9, the first to third exclusion processes are performed sequentially, and the first and second integration processes are performed sequentially. In the image correction process, at least one of the three exclusion processes should be performed. Furthermore, in the case where two of the three exclusion processes are executed, the combination and the sequence of the exclusion processes to be executed may be determined arbitrarily. Furthermore, the sequence of the three exclusion processes is not limited to the sequence. In reality, in the case of executing two or more exclusion processes, if the third exclusion process is executed last, the number of plural circumscribed rectangles to be processed is less than that in the case where the third exclusion process is executed at the first or second time, whereby the process becomes simple, thereby providing a preferable result. Furthermore, in the case where only the circumscribed rectangles are obtained by the process at steps b3 to b5, these exclusion processes may be omitted to simplify the process. Moreover, in the image correction process, only one of the two integration processes may be carried out. In addition, the sequence in the case of carrying out two integration processes is not limited to the sequence. Furthermore, in the case where a single character is included in one circumscribed rectangle by the process at steps b3 to b5, these integration processes may be omitted to simplify the process.

Figure 16:
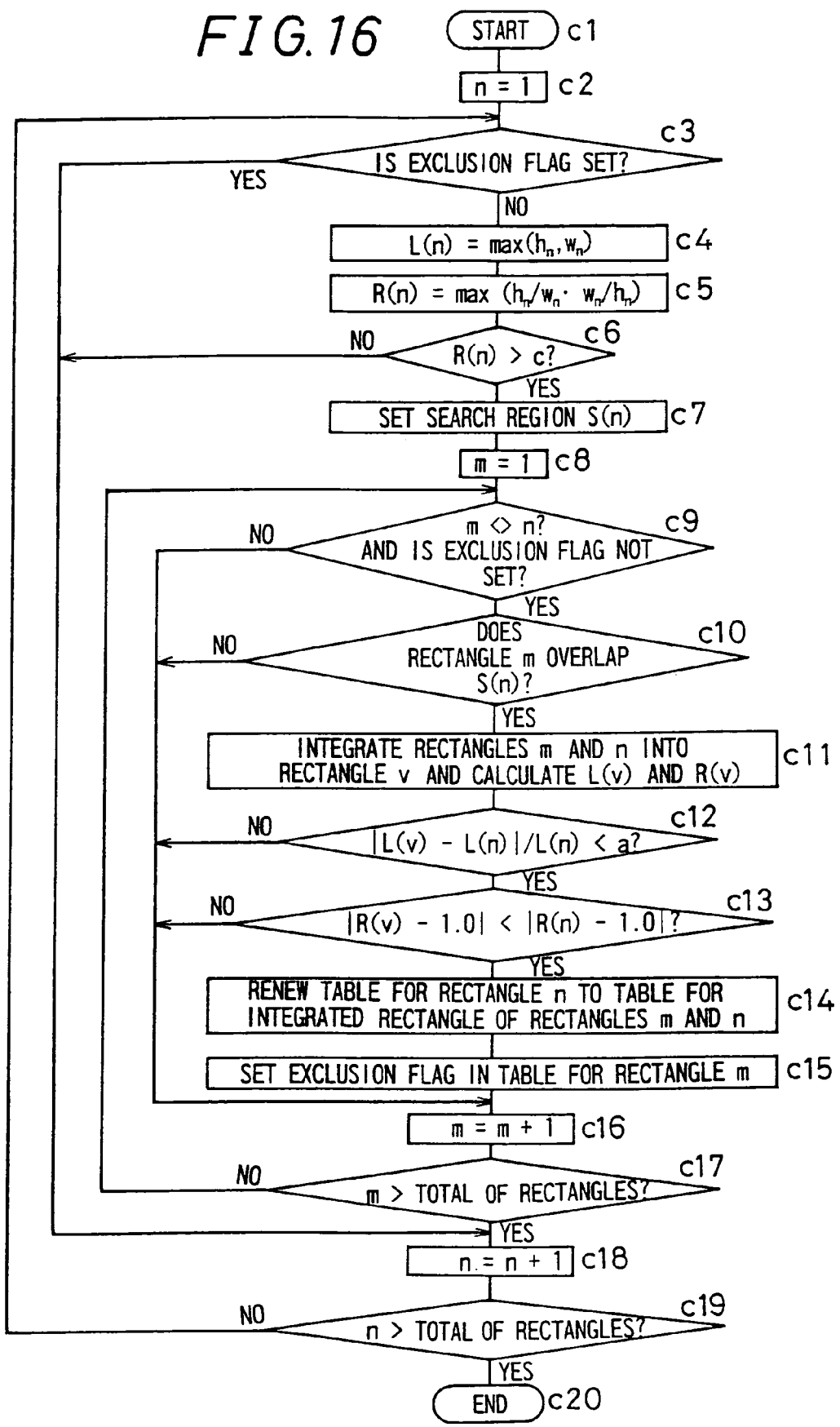
FIG. 16 is a flowchart explaining a second integration process in the image correction process of FIG. 9 in detail.

FIG. 16 is a flowchart for explaining the second integration process in detail. The process advances from step c1 to step c2 when the process advances from step b7 to step b8 in the image correction process of FIG. 9. The character region extracting unit 83 first initializes a counter n at step c2, whereby 1 is memorized. In the labeling table, a circumscribed rectangle defined by the parameters corresponding to the label equal to the value memorized in the counter n becomes a circumscribed rectangle to be processed. Next, at step c2, the character region extracting unit 83 judges whether an exclusion flag corresponding to the circumscribed rectangle to be processed is set or not. In the case where it is set, the process advances from step c3 to step c18. In the case where it is not set, the process advances from step c3 to step c4.

At step c4, on the basis of expression 23, the character region extracting unit 83 sets a first value L(n) regarding the size of the circumscribed rectangle to be processed. The first value L(n) is the larger value of the height hn and the width wn of the circumscribed rectangle to be processed. In addition, at step c4, the character region extracting unit 83 sets a second value R(n) regarding the size of the circumscribed rectangle to be processed on the basis of expression 24 at step c5. The second value R(n) is the larger value of the ratio of the height hn of the circumscribed rectangle to be processed and the width wn of the circumscribed rectangle to be processed and the ratio of the width wn of the circumscribed rectangle to be processed and the height hn of the circumscribed rectangle to be processed.

$$L(n)=\max(hn,wn) \quad (23)$$

$$R(n)=\max(hn/wn,wn/hn) \quad (24)$$

Next, the character region extracting unit 83 judges whether the height of the circumscribed rectangle to be processed greatly differs from the width of the circumscribed rectangle to be processed, that is, whether the circumscribed rectangle to be processed is a square. For this purpose, the character region extracting unit 83 judges whether the second value R(n) is more than a predetermined constant c on the basis of expression 25.

$$R(n)>c \quad (25)$$

In the case where the circumscribed rectangle to be processed circumscribes a single entire character, the circumscribed rectangle to be processed becomes nearly square, and the second value R(n) becomes close to 1. In the actual process, the constant c is set at 1.5 for example in consideration of a deviation and an error depending on the type of the character. This is caused because of the difference in font and owing to the existence of a character whose circumscribed rectangle is not square, such as "り" and "つ." In the case where the second value R(n) is not more than the constant c, it is regarded that the circumscribed rectangle to be processed is nearly square. In this case, since the circumscribed rectangle to be processed circumscribes an entire single character, it is regarded that it is not necessary to carry out the second integration process. Therefore, in this case, the process advances from step c6 to c18. Furthermore, in the case where the second value R(n) is more than the constant c, it is regarded that the circumscribed rectangle to be processed is a vertically long rectangle or a horizontally long rectangle. In this case, since it is regarded that the circumscribed rectangle to be processed circumscribes only a portion of a plurality of blocks of connected pixels constituting a single character, it is necessary to carry out the integration process for the adjacent rectangles. Therefore, in this case, the process advances from step c6 to step c7.

At step c7, the character region extracting unit 83 sets a search region S(n) for examining the presence of other circumscribed rectangles that can be integrated with the circumscribed rectangle to be processed. The coordinates (x, y) of the plurality of pixels constituting the search region S(n) are defined by expression 26 described below for example. C(n)x and C(n)y are the x coordinate and the y coordinate of the coordinates of the center of the circumscribed rectangle to be processed.

$$\{C(n)x-L(n)\leq x\leq C(n)x+L(n)\}\cap\{C(n)y-L(n)\leq y\leq C(n)y+L(n)\} \quad (26)$$

Next, at steps c8 to c10, the character region extracting unit 83 searches for a circumscribed rectangle overlapping the search region S(n) from the remaining circumscribed rectangles other than the circumscribed rectangle to be processed among the circumscribed rectangles set in the binary image 92, that is, from all the circumscribed rectangles not having label n. More specifically, the character region extracting unit 83 first initializes a counter m at step c8, whereby 1 is memorized. The circumscribed rectangle defined by the parameter corresponding to the label equal to the value memorized in the counter m becomes a circumscribed rectangle to be compared. Next, at step c9, a judgment is made as to whether the value memorized in the counter m differs from the value memorized in the counter n and whether an exclusion flag corresponding to the circumscribed rectangle to be compared is set. In the case where the values memorized in the counters n and m are equal to each other, or in the case where the exclusion flag is set, the process advances from step c9 to step c16. In the case where the values memorized in the counters n and m are different from each other and the exclusion flag is reset, the process advances from step c9 to step c11.

At step c11, the character region extracting unit 83 regards the circumscribed rectangle obtained by integrating the circumscribed rectangle to be processed and the circumscribed rectangle to be compared as a temporary circumscribed rectangle v. The temporary circumscribed rectangle v is a minimum rectangle including the block of connected pixels of the circumscribed rectangle to be processed and the block of connected pixels of the circumscribed rectangle to be compared. Next, the first value L(v) and the second value R(v) of the temporary circumscribed rectangle v are calculated. Then, at step c12, the character region extracting unit 83 judges whether the first value L(v) of the temporary circumscribed rectangle satisfies the first integration condition represented by expression 27. The first integration condition is used to limit the change in the size of the circumscribed rectangle. In the case where the first value L(v) of the temporary circumscribed rectangle does not satisfy the first integration condition, the process advances from step c12 to step c16. In the case where the first value L(v) of the temporary circumscribed rectangle satisfies the first integration condition, the process advances from step c12 to step c13. At step c13, the character region extracting unit 83 judges whether the second value R(v) of the temporary circumscribed rectangle satisfies the second integration condition represented by expression 28. The second integration condition is used to confirm as to whether the ratio of the height of the temporary circumscribed rectangle and the width of the temporary circumscribed rectangle is close to 1 or not. In the case where the second value R(v) of the temporary circumscribed rectangle does not satisfy the second integration condition, the process advances from step c13 to step c16. In the case where the second value R(v) of the temporary circumscribed rectangle satisfies the second integration condition, the process advances from step c13 to step c14. In other words, in the case where the first and second values L(v) and R(v) of the temporary circumscribed rectangle satisfy the first and second integration conditions respectively, the block of connected pixels in the circumscribed rectangle to be processed and the block of connected pixels in the circumscribed rectangle to be compared are each regarded as one of a plurality of blocks of connected pixels constituting the same single character. Herein, a is 0.2.

$$|L(v)-L(n)|\div L(n)<a \text{ and} \quad (27)$$

$$|R(v)-1.0|<|R(n)-1.0| \quad (28)$$

At step c14, the character region extracting unit 83 sets a new circumscribed rectangle obtained by integrating the circumscribed rectangle to be processed and the circumscribed rectangle to be compared, and rewrites the parameters for the circumscribed rectangle to be processed in the labeling table into the parameters for the new circumscribed rectangle. The parameters for the new circumscribed rectangle are equal to the parameters for the temporary circumscribed rectangle for example. Then, at step c15, the character region extracting unit 83 sets an exclusion flag corresponding to the parameters for the circumscribed rectangle to be compared in the labeling table.

Then, at step c16, the character region extracting unit 83 adds 1 to the value memorized in the counter m to renew the value, and at step c17 judges whether the renewed value of the counter m is more than the total of the circumscribed rectangles set in the binary image 92. In the case where the renewed value of the counter m is not more than the total, the process returns from step c17 to step c9, and the process between step c9 and step c16 is repeated while the circumscribed rectangle defined by the parameters corresponding to the label equal to the renewed value of the counter m is used as a new circumscribed rectangle to be compared. In the case where the renewed value of the counter m is more than the total, the process advances from step c17 to step c18.

Next, at step c18, the character region extracting unit 83 adds 1 to the value memorized in the counter n to renew the value, and at step c19 judges whether the renewed value of the counter n is more than the total. In the case where the renewed value of the counter n is not more than the total, the process returns from step c19 to step c3, and the process between step c4 and step c19 is repeated while the circumscribed rectangle defined by the parameters corresponding to the label equal to the renewed value of the counter n is used as a new circumscribed rectangle to be processed. In the case where the renewed value of the counter n is more than the total, the second integration process ends at step c20.

Figure 17:
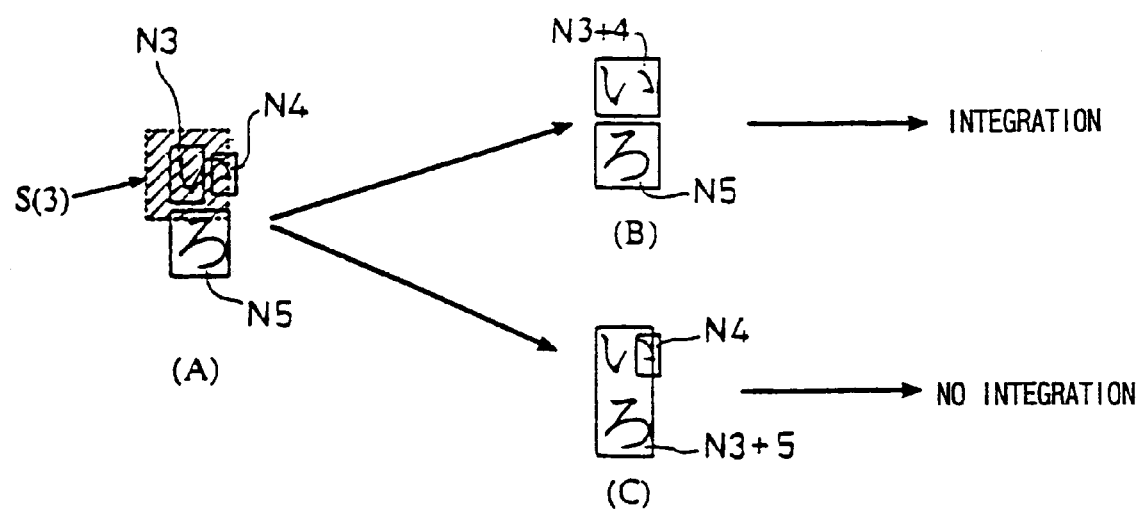
FIGS. 17A to 17C are views explaining the second integration process.

By using FIG. 17, the process between steps c9 and c16 will be described specifically. In FIG. 17, circumscribed rectangles N3 and N4 circumscribe the two blocks of connected pixels of the uppermost character "い" in the left end sentence portion of the sentence at the lower portion of the input image 91 respectively, and the circumscribed rectangle N5 circumscribes the second character "ろ" from the top of the sentence portion. The rectangle region to be processed is assumed to be the circumscribed rectangle N3. In addition, in FIG. 17A, the search region S3 of the circumscribed rectangle N3 to be processed is indicated by oblique lines. In this case, since portions of the circumscribed rectangles N4 and N5 overlap the search region S(3), they are selected as circumscribed rectangles to be compared. In the case where it is assumed that the circumscribed rectangles N3 and N4 are integrated as shown in FIG. 17B, the first and second values L(3+4) and R(3+4) of the temporary circumscribed rectangle N3+5 satisfy the first and second integration conditions as represented by expressions 29 and 31 respectively. In the case where it is assumed that the circumscribed rectangles N3 and N5 are integrated as shown in FIG. 17C, the first value L(3+5) of the temporary circumscribed rectangle N3+5 does not satisfy the first integration condition as represented by expression 31.

$$|L(3+4)-L(3)|\div L(3)=0.1 < a \qquad (29)$$

$$|R(3+4)-1.0|=0.05 < |R(3)-1.0|=1.0 \qquad (30)$$

$$|L(3+5)-L(3)|\div L(3)=1.3 > a \qquad (31)$$

TABLE 6

| i | Width wi | Height hi | First value L(i) | Second value R(i) |
|---|---|---|---|---|
| 3 | 5 | 10 | 10 | 2.0 |
| 4 | 4 | 6 | 6 | 1.5 |
| 5 | 10 | 10 | 10 | 1.0 |

TABLE 6-continued

| i | Width wi | Height hi | First value L(i) | Second value R(i) |
|---|---|---|---|---|
| 3 + 4 | 11 | 10 | 11 | 1.1 |
| 3 + 5 | 10 | 23 | 23 | 2.3 |

(Unit: dot)

Since the results shown in the table are obtained for the temporary circumscribed rectangles Ni (i=3, 4, 5, 3+4, 3+5), the calculations of expressions 29 to 31 are based on these. The reason why a is set at 0.2 is because if the rectangles are different by 20% or more in size, they are not suited for integration into the same character.

Since the temporary circumscribed rectangle N3+4 is obtained by integrating the circumscribed rectangles circumscribing the plurality of blocks of connected pixels constituting the single character "い" respectively as described above, the temporary circumscribed rectangle satisfies the first and second integration conditions. On the other hand, since the temporary circumscribed rectangle N3+5 is obtained by integrating the circumscribed rectangle circumscribing one of the plurality of blocks of connected pixels constituting the single character "い" and the circumscribed rectangle circumscribing the single character "ろ," the temporary circumscribed rectangle does not satisfy at least one of the first and second integration conditions. Therefore, the character region extracting unit 83 can integrate only the circumscribed rectangles circumscribing the plurality of blocks of connected pixels constituting a single character respectively on the basis of the first and second integration conditions represented by expressions 27 and 28.

Figure 18:
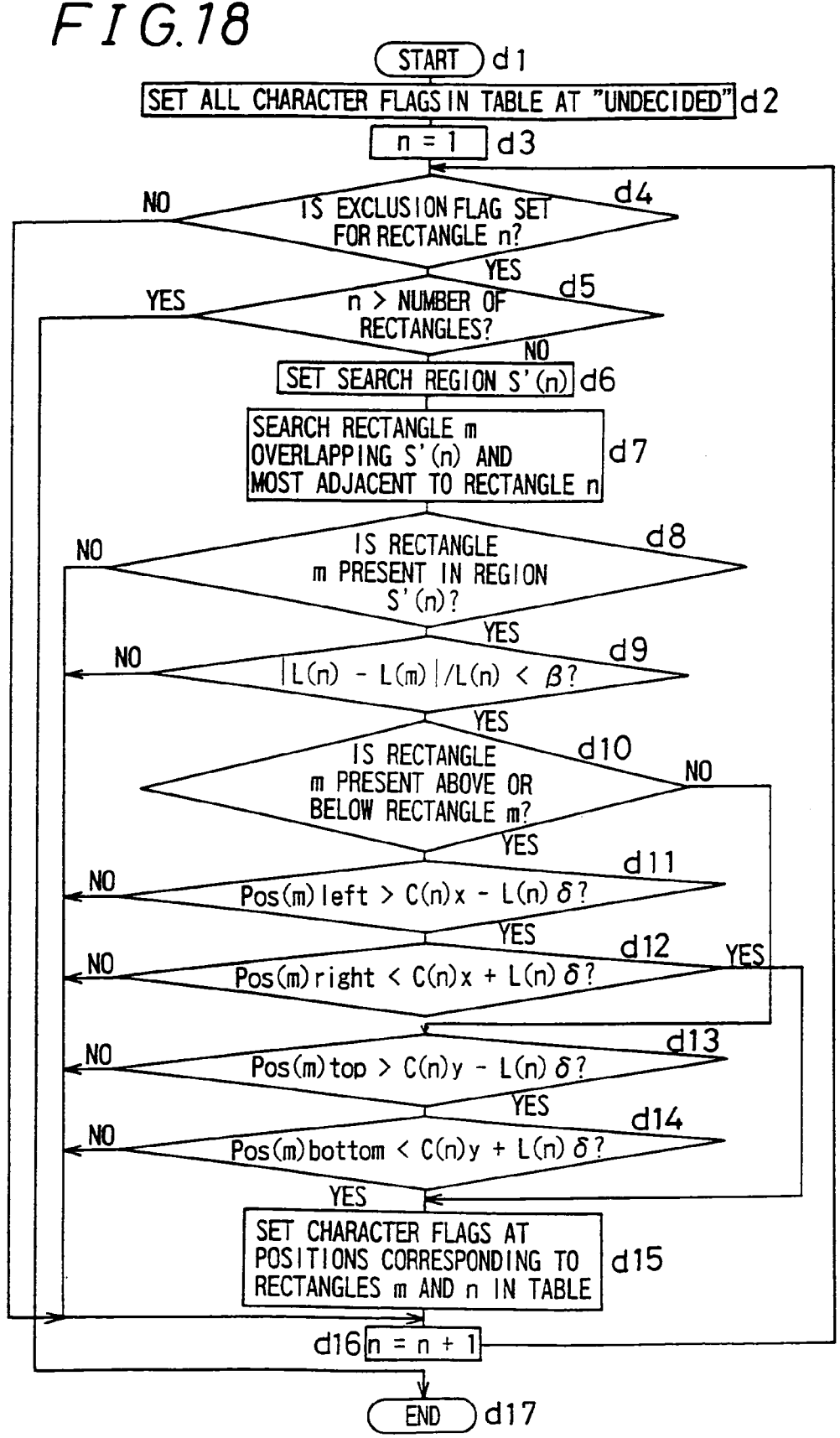
FIG. 18 is a flowchart explaining a third exclusion process in the image correction process of FIG. 9 in detail.

FIG. 18 is a flowchart explaining a third exclusion process in detail. When the image correction process of FIG. 9 advances from step b9 to step b10, the exclusion process advances from step d1 to step d2. At step d2, the character region extracting unit 83 first sets all the character flags in the labeling table at "undecided." Next, at step d3, the character region extracting unit 83 initializes the counter n, whereby 1 is memorized. In the labeling table, the circumscribed rectangle defined by the parameters corresponding to the label equal to the value memorized in the counter n becomes a circumscribed rectangle to be processed. Then, at step d4, the character region extracting unit 83 judges whether an exclusion flag corresponding to the circumscribed rectangle to be processed is set or not. In the case where it is set, the process advances from step d4 to step d16. In the case where it is not set, the process advances from step d4 to step d5. The process at steps d5 to d15 is a process for selectively setting character flags.

First, at step d5, the character region extracting unit 83 judges whether the value memorized in the counter n is more than the total of the circumscribed rectangles set in the binary image 92. In the case where the value memorized in the counter n is more than the total, the process advances from step d5 to step d17. In the case where the value memorized in the counter n is not more than the total, the process advances from step d5 to step d6.

Figure 19:
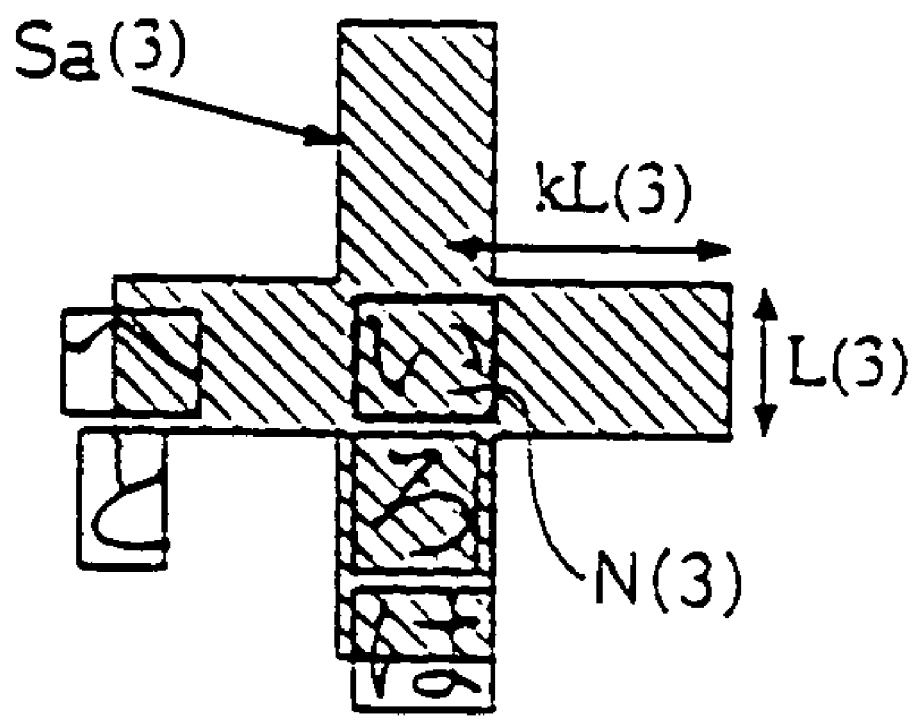
FIG. 19 is a view explaining a search region Sa(n) used for the third exclusion process.

At step d6, the character region extracting unit 83 sets a search region Sa(n) for examining whether the circumscribed rectangle to be processed is a character or not. The coordinates (x, y) of the plurality of pixels constituting the search region Sa(n) are defined by expression 32 for example. As a result, the search region Sa(n) becomes a cross-shaped region centered at the circumscribed rectangle to be processed and extending by a length kL(n) in parallel in the vertical and horizontal directions in the input image 91 respectively as shown in FIG. 19. The vertical direction is a direction in parallel with the x coordinate axis of the coordinate system being set in the input image 91. The horizontal direction is a direction in parallel with the y coordinate axis of the coordinate system being set in the input image 91. C(n)x and C(n)y are the x coordinate and the y coordinate of the coordinates of the center of the circumscribed rectangle n to be processed. L(n) is the larger value of the height hn and the width wn of the circumscribed rectangle to be processed. k is a constant for limiting the area of the search range Sa(n) and is set at 2.0 for example.

$$((((C(n)x-L(n)\div 2) \leq x \leq (C(n)x+L(n)\div 2)) \cap$$

$$((C(n)y-k \times L(n)) \leq y \leq (C(n)y+k \times L(n)))) \cup$$

$$((((C(n)x-k \times L(n)) \leq x \leq (C(n)x+k \times L(n))) \cap$$

$$((C(n)y-L(n)\div 2) \leq y \leq (C(n)y+L(n)\div 2))) \quad (32)$$

At step d7, the character region extracting unit 83 searches for a circumscribed rectangle that is closest to the circumscribed rectangle to be processed from the circumscribed rectangles overlapping the search region Sa(n) among the circumscribed rectangles with no exclusion flag set in the labeling table as a circumscribed rectangle to be compared. Next, at step d8, the character region extracting unit 83 judges whether a circumscribed rectangle to be compared has been searched for or not, that is, whether a circumscribed rectangle to be compared is present or not. In the case where a circumscribed rectangle to be compared is not present, the process advances from step d8 to step d16. In the case where a circumscribed rectangle to be compared is present, the process advances from step d8 to step d9.

At step d9, the character region extracting unit 83 judges whether both the block of connected pixels of the circumscribed rectangle to be processed and the block of connected pixels of the circumscribed rectangle to be compared are likely to be a character or not on the basis of the size of the circumscribed rectangle to be processed and the size of the circumscribed rectangle to be compared. For this purpose, the character region extracting unit 83 judges whether the first value L(n) of the circumscribed rectangle to be processed and the first value L (m) of the circumscribed rectangle to be compared satisfy the judgment condition of expression 33. β is a constant set at 0.2 for example. In the case where the first values L(n) and L(m) do not satisfy the judgment condition of expression 33, it is regarded that at least one of the circumscribed rectangle to be processed and the circumscribed rectangle to be compared does not circumscribe a character. In this case, the process advances from step d9 to step d16. In the case where the first values L(n) and L(m) satisfy the judgment condition of expression 33, it is regarded that both the circumscribed rectangle to be processed and the circumscribed rectangle to be compared circumscribe a character. In this case, the process advances from step d9 to step d10.

$$|L(n)-L(m)|\div L(n) < \beta \quad (33)$$

Next, at steps d10 to d14, the character region extracting unit 83 judges whether the deviation between the circumscribed rectangle to be compared and the search region Sa(n) is less than a predetermined value or not. More specifically, at step d10, a judgment is made as to whether the circumscribed rectangle to be compared and the circumscribed rectangle to be processed are arranged in the vertical direction or not. In the case where they are arranged in the vertical direction, the process advances from step d10 to step d11. In the case where they are not arranged in the vertical direction, it is regarded that the circumscribed rectangle to be compared and the circumscribed rectangle to be processed are arranged in the horizontal direction, and the process advances from step d10 to step d13.

At step d11, the character region extracting unit 83 judges whether the coordinate Pos(m)left of the left end side of the circumscribed rectangle to be compared, that is, the x coordinate value sm of the coordinates of the upper left apex of the circumscribed rectangle to be compared, satisfies the judgment condition represented by expression 34 described below. In the case where the coordinate Pos(m)left of the left end side of the circumscribed rectangle to be compared does not satisfy the judgment condition of expression 34, the process advances from step d11 to step d16. In the case where the coordinate Pos(m)left of the left end side of the circumscribed rectangle to be compared satisfies the judgment condition of expression 34, the process advances from step d11 to step d12. Then, at step d12, the character region extracting unit 83 judges whether the coordinate Pos(m)right of the right end side of the circumscribed rectangle to be compared, that is, the x coordinate value um of the coordinates of the lower right apex of the circumscribed rectangle to be compared, satisfies the judgment condition represented by expression 35 described below. In the case where the coordinate Pos(m)right of the right end side of the circumscribed rectangle to be compared does not satisfy the judgment condition of expression 35, the process advances from step d12 to step d16. In the case where the coordinate Pos(m)right of the right end side of the circumscribed rectangle to be compared satisfies the judgment condition of expression 35, the process advances from step d12 to step d15.

$$(Pos(m)\text{left} > (C(n)x - L(n) \times \delta)) \text{ and} \quad (34)$$

$$(Pos(m)\text{right} < (C(n)x + L(n) \times \delta)) \quad (35)$$

Furthermore, at step d13, the character region extracting unit 83 judges whether the coordinate Pos(m)top of the top end side of the circumscribed rectangle to be compared, that is, the y coordinate value tm of the coordinates of the upper left apex of the circumscribed rectangle to be compared, satisfies the judgment condition represented by expression 36. In the case where the coordinate Pos(m)top of the top end side of the circumscribed rectangle to be compared does not satisfy the judgment condition of expression 36, the process advances from step d13 to step d16. In the case where the coordinate Pos(m)top of the left end side of the circumscribed rectangle to be compared satisfies the judgment condition of expression 36, the process advances from step d13 to step d14. Then, at step d14, the character region extracting unit 83 judges whether the coordinate Pos(m) bottom of the bottom end side of the circumscribed rectangle to be compared, that is, the y coordinate value vm of the coordinates of the lower right apex of the circumscribed rectangle to be compared, satisfies the judgment condition represented by expression 37. In the case where the coordinate Pos(m)bottom of the bottom end side of the circumscribed rectangle to be compared does not satisfy the judgment condition of expression 37, the process advances from step d14 to step d16. In the case where the coordinate Pos(m)bottom of the bottom end side of the circumscribed rectangle to be compared satisfies the judgment condition of expression 37, the process advances from step d14 to step d15.

$$(Pos(m)\text{top} > (C(n)y - L(n) \times \delta)) \text{ and} \quad (36)$$

$$(Pos(m)\text{bottom} < (C(n)y + L(n) \times \delta)) \quad (37)$$

In other words, at steps d10 to d11, in the case where the circumscribed rectangle to be compared and the circumscribed rectangle to be processed are arranged in nearly parallel in the vertical direction, only in the case where both the distances from an imaginary straight line passing through the center of the circumscribed rectangle to be processed and being parallel in the vertical direction to the left end side and the right end side of the circumscribed rectangle to be compared are less than a predetermined distance L(n)×δ, it is regarded that the deviation between the circumscribed rectangle to be compared and the search region Sa(n) is less than a reference deviation. Furthermore, in the case where the circumscribed rectangle to be compared and the circumscribed rectangle to be processed are arranged in nearly parallel in the horizontal direction, only in the case where both the distances from an imaginary straight line passing through the center of the circumscribed rectangle to be processed and being parallel in the horizontal direction to the top end side and the bottom end side of the circumscribed rectangle to be compared are less than the predetermined distance L(n)×δ, it is regarded that the deviation between the circumscribed rectangle to be compared and the search region Sa(n) is less than the reference deviation. The predetermined distance is basically a half value of the first value L(n). However, the constant δ is set at five eighths (⅝) for example in consideration of difference in character and error.

Only in the case where the circumscribed rectangle to be processed is nearly equal to the circumscribed rectangle to be compared in size and when the circumscribed rectangle to be processed and the circumscribed rectangle to be compared are arranged in nearly parallel in the vertical or horizontal direction by the process at steps d19 to d14, the process at step d15 is carried out. At step d15, the character region extracting unit 83 sets 1 in the character flag of the circumscribed rectangle to be processed and the character flag of the circumscribed rectangle to be compared respectively.

Then, at step d16, the character region extracting unit 83 adds 1 to the value memorized in the counter n to renew the value, and the process returns to step d4. Accordingly, the process at steps d4 to d16 is repeated while the circumscribed rectangle defined by the parameters corresponding to the label equal to the renewed value in the counter n is used as the circumscribed rectangle to be processed.

Furthermore, at step d5, in the case where the value memorized in the counter n is more than the total of the defined circumscribed rectangles, the process of the character region extracting unit 83 advances from step d5 to step d17, and the third exclusion process ends.

Then, the character region extracting unit 83 sets 1 in the exclusion flags of the circumscribed rectangles with no character flag set. Accordingly, among all the circumscribed rectangles in the input image, only the plurality of circumscribed rectangles arranged in nearly parallel in a predetermined character arrangement direction remain as the candidates for character regions in the labeling table. In the explanation of the flowchart of FIG. 18, the explanation is performed assuming that the characters in the input image are arranged in parallel in the vertical or horizontal direction; however, in the case where the characters are arranged in parallel in an oblique direction, not in the vertical or horizontal direction, the research region Sa(n) and the judgments at steps d10 to d14 may be changed depending on the character arrangement direction.

In the selective sharpening process carried out by the image processing device of the second embodiment described above, the sharpening level of the character regions is higher than the sharpening level of the remaining regions other than the character regions. Furthermore, the sharpened-image is subjected to the luminance conversion process by using the gradation correction LUT. Accordingly, the blurred edges of the characters to be sharpened in the character regions are improved by the sharpening process, and the visibility thereof is improved by the gradation correction process. At the same time, the remaining regions are subjected to a proper sharpening process to the extent that noise is not intensified; therefore, the blurs around the edges are improved, and the visibility is improved by the gradation correction process. Accordingly, in the case where the output image is displayed on the display device, the characters in the character regions become easy to read, and at the same time, the remaining regions become an easy-to-see image having less noise.

An image processing device in accordance with a third embodiment of the invention will be describe below. The image processing device in accordance with the third embodiment is different from the image processing device in accordance with the first embodiment in that the data processing device 34 is replaced with the data processing device 101 shown in FIG. 20, and is equal in the other respects; therefore, the devices, data and tables having the same configurations are designated by the same numeral codes, and their explanations are omitted.

Figure 20:
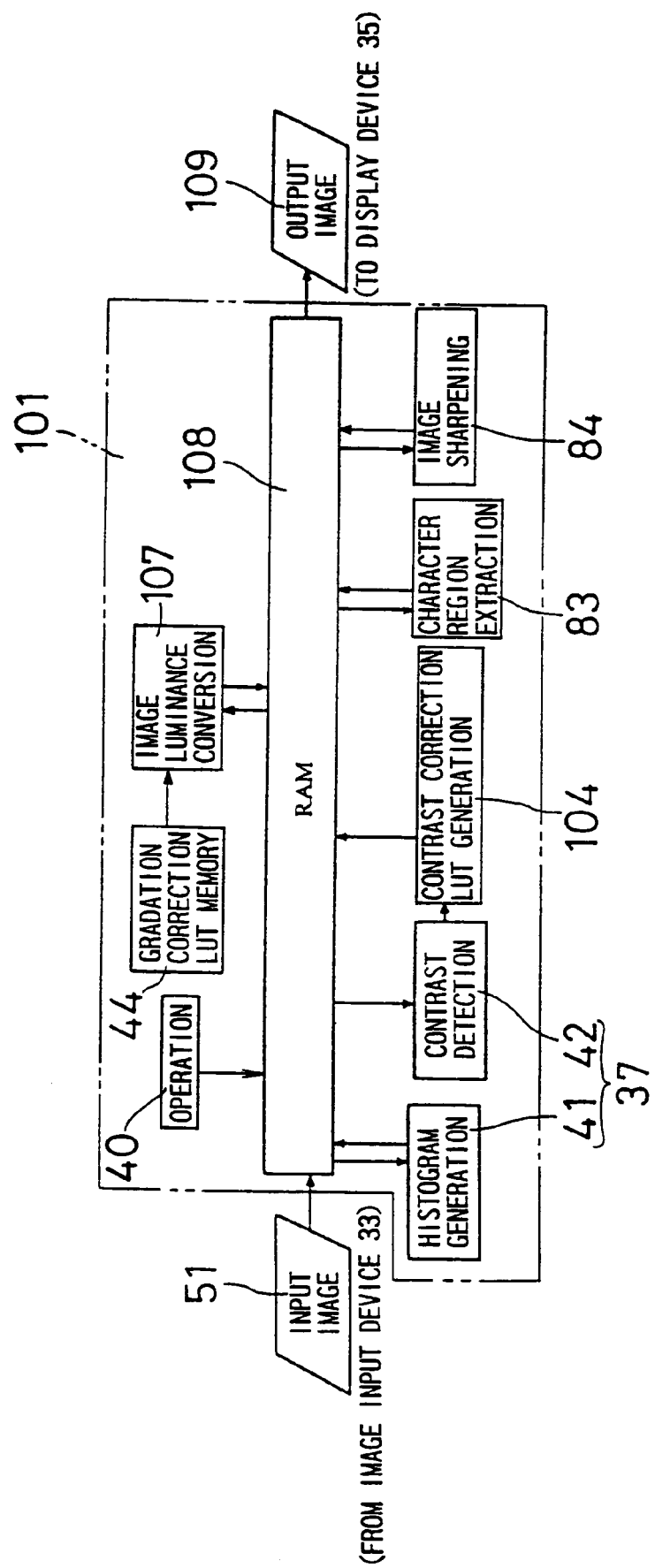
FIG. 20 is a block diagram showing the electrical configuration of a data processing device 101 in an image processing device in accordance with a third embodiment of the invention.

FIG. 20 is a block diagram showing the electrical configuration of the data processing device 101 in the image processing device in accordance with the third embodiment. Among the units in the data processing device 101, the units carrying out the same operations as those of the units in the data processing devices 34 and 81 of the first and second embodiments are designated by the same numeral codes and their detailed explanations are omitted.

The data processing device 101 includes a contrast estimation unit 37, a contrast correction LUT generation unit 104, a character region extracting unit 83, an image sharpening unit 84, an image luminance conversion unit 107, a gradation correction LUT memory unit 44, a data memory unit 108 and an operation unit 40. A contrast correction LUT generation unit 103 generates a contrast correction lookup table CLUT on the basis of the contrast [Lv, Hv] estimated by the contrast estimation unit 37. The image luminance conversion unit 107 carries out a luminance correction process for contrast correction and a luminance correction process for gradation correction. When the contrast estimation unit 37, the contrast correction LUT generation unit 104, the character region extracting unit 83, the image sharpening unit 84 and the image luminance conversion unit 107 carry out their respective processes, the data memory unit 108 temporarily memorizes various kinds of data used for the processes. Therefore, a plurality of memory regions for memorizing various kinds of data have been set in the data memory unit 108 in advance, and the addresses of the memory regions have been determined in advance.

A histogram generation unit 41, a contrast detection unit 42, the contrast correction LUT generation unit 104, the character region extracting unit 83, the image sharpening unit 84, the image luminance conversion unit 107 are attained by individual circuits respectively. Furthermore, at least two units of the units 41, 42, 104, 83, 84 and 107 may be imaginary circuits attained by the arithmetic processes of a single central arithmetic processing circuit.

Figure 21:
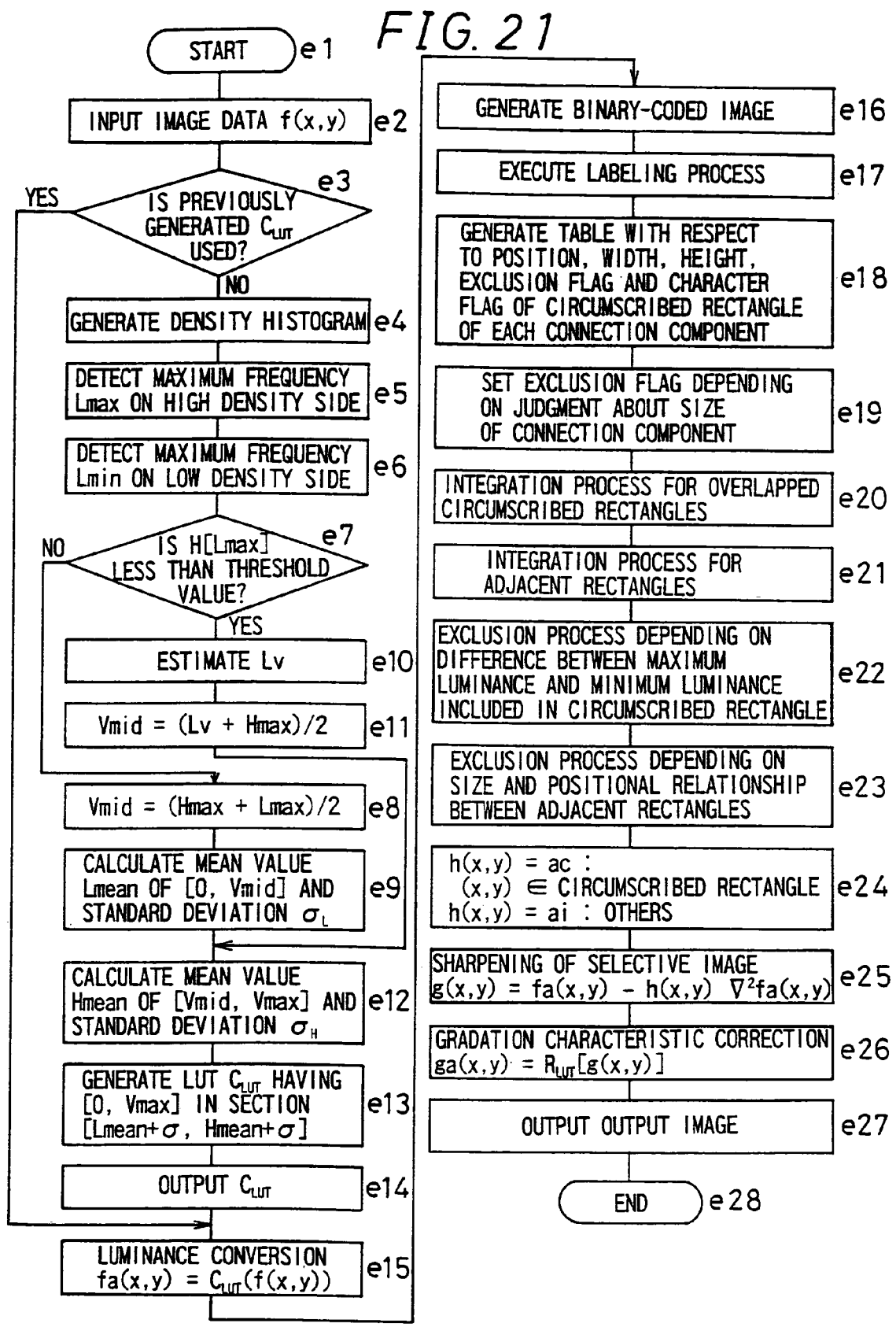
FIG. 21 is a flowchart explaining the image correction process executed by the image processing device in accordance with the third embodiment.

FIG. 21 is a flowchart explaining the image correction process carried out by the image processing device 101 of the image processing device of the third embodiment. The image correction process will be described by using the flowchart of FIG. 21. The flowchart of FIG. 21 includes steps for carrying out operations similar to those of the flowcharts of FIG. 2 and FIG. 9, and the detailed explanations of the steps for carrying out the similar operations are omitted.

For example, when the operator of the image processing device instructs to execute the image correction process by using the operation unit 40, the process advances from step e1 to step e2. The image data input process at step e2 and the estimation process of the contrast [Lv, Hv] of the input image at steps e3 to e12 are equal to the process at step a2 and the process at steps a3 to a12 of the flowchart of FIG. 2 respectively.

At step e13, the contrast correction LUT generation unit 104 generates the contrast correction lookup table CLUT by using the same process as that at step a13. Next, the contrast correction LUT generation unit 104 subjects the contrast correction lookup table CLUT generated at step e14 to memorization in the predetermined second memory region of the data memory unit 108.

Next, the image luminance conversion unit 107 operates as a contrast correction unit for carrying out contrast correction at step e15. In this case, the image luminance conversion unit 107 subjects input image data 51 to a luminance correction process on the basis of the contrast correction lookup table CLUT. More specifically, first, the contrast correction lookup table CLUT is read from the data memory unit 108, and the input image data 51 is read from the data memory unit 108. Then, the pixel data f(x, y) of the input image data 51 is subjected to luminance conversion on the basis of the following expression 38 and the contrast correction lookup table CLUT to obtain pixel data f(x, y) of the corrected image data. The obtained pixel data fa(x, y) is memorized at the addresses in the predetermined third memory region of the data memory unit 86. The addresses have been determined in advance on the basis of the coordinates of the positions of the pixels corresponding to the obtained pixel data fa(x, y) in the corrected image. The corrected image is an image represented by the corrected image data.

$$fa(x,y)=CLUT[f(x,y)] \qquad (38)$$

In comparison with the luminance conversion process at step a16 by the image processing device of the first embodiment, the luminance conversion process at step e15 differs in that the contrast correction lookup table CLUT is used instead of the luminance correction lookup table CaLUT, and is equal in the other respects. As a result, the contrast [Lv, Hv] of the input image is expanded to the maximum contrast [Vmin, Vmin] in conformity with the standard of the image data.

In comparison with steps b3 to b10 of the flowchart of FIG. 9, the character region extraction process at steps e16 to e23 differs in that the corrected image data is processed instead of the input image data 51, and is equal in the other respects. Furthermore, the image sharpening process at steps e24 and e25 is equal to the process at steps b11 and b12 of the flowchart of FIG. 9. Accordingly, the corrected image data is subjected to the selective sharpening process described in the second embodiment. Next, at step e26, the image luminance conversion unit 107 operates as a gradation correction unit for carrying out gradation correction. In this case, the image luminance conversion unit 107 subjects the input image data 51 to a luminance correction process on the basis of the gradation correction lookup table RLUT. The luminance correction process for gradation correction at step e24 is equal to the process at step b13 of the flowchart of FIG. 9. The output image data obtained by this process is supplied to a display device 35 at step e28, and the image correction process ends at step a29.

In the image correction process explained referring to FIG. 21, instead of using the contrast correction lookup table CLUT at step e13, the luminance correction CaLUT may be generated by using the method explained by using expressions 13 to 15 in the first embodiment, and a luminance correction process using the luminance correction lookup table may be carried out at step e15. In this case, the luminance correction process for correcting gradation characteristics at step a27 can be omitted, whereby the process can be simplified.

By the processes, the contrast of the image displayed on the display device is made higher than that of the input image. In addition, the sharpening level of the sharpening process carried out for the character regions in the input image is made higher than the sharpening level of the sharpening process carried out for the remaining regions other than the character regions. Furthermore, gradation correction depending on the display device is carried out. Because of these three reasons, the characters described in the image displayed on the display device become easy to read, and the visibility becomes high.

Figure 22:
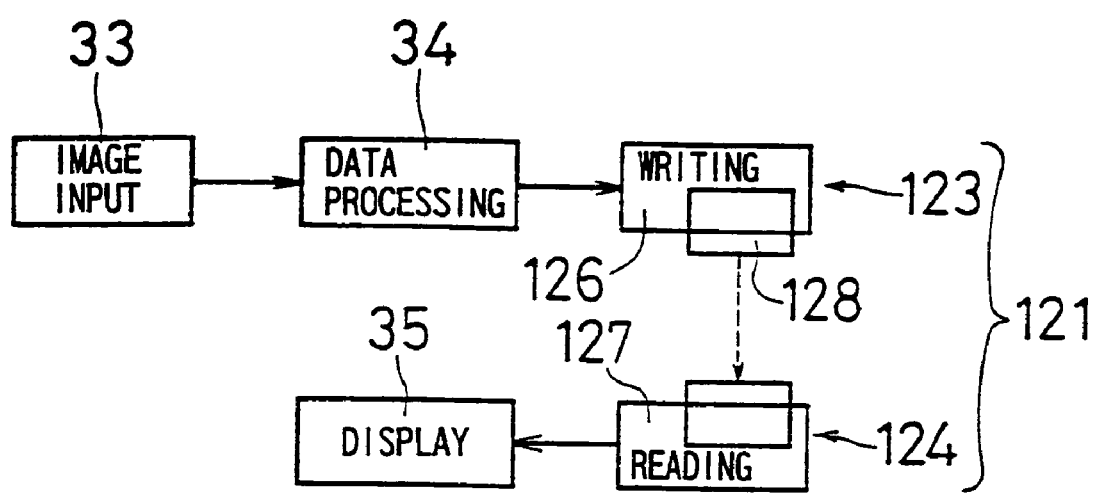
FIG. 22 is a block diagram showing the electrical configuration of an image processing device 121 in accordance with a fourth embodiment of the invention.
Figure 23:
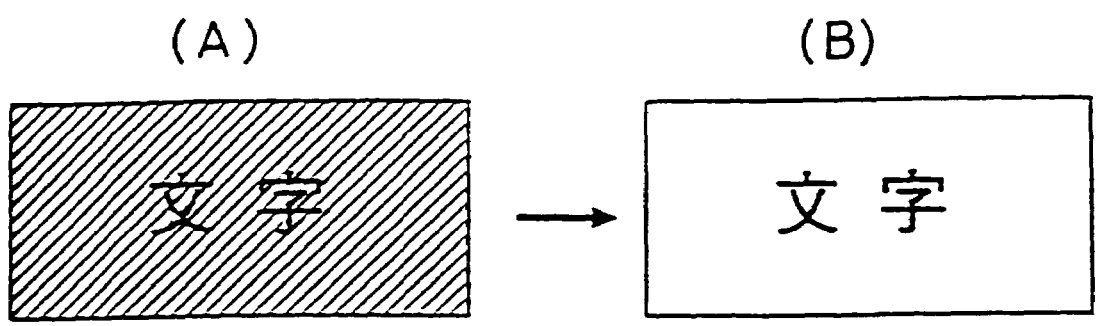
FIG. 23A is a view showing an image having a contrast lower than the maximum contrast in conformity with the standard of image data in a conventional technology.
FIG. 23B is a view showing an image having the maximum contrast in the conventional technology.
Figure 24:
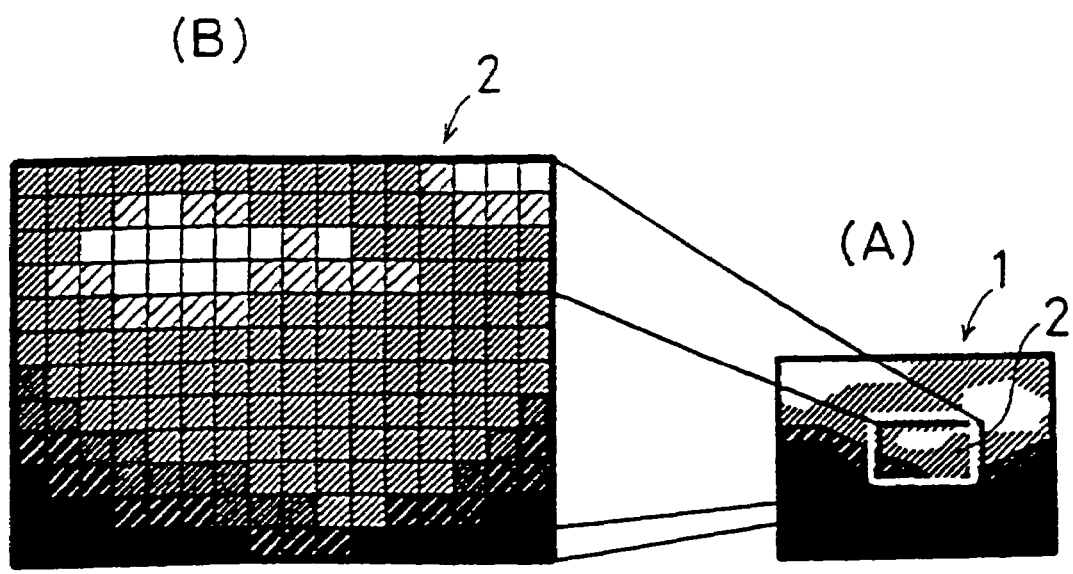
FIGS. 24A and 24B are views explaining the structure of the display screen of a display device in the conventional technology.
Figure 25:
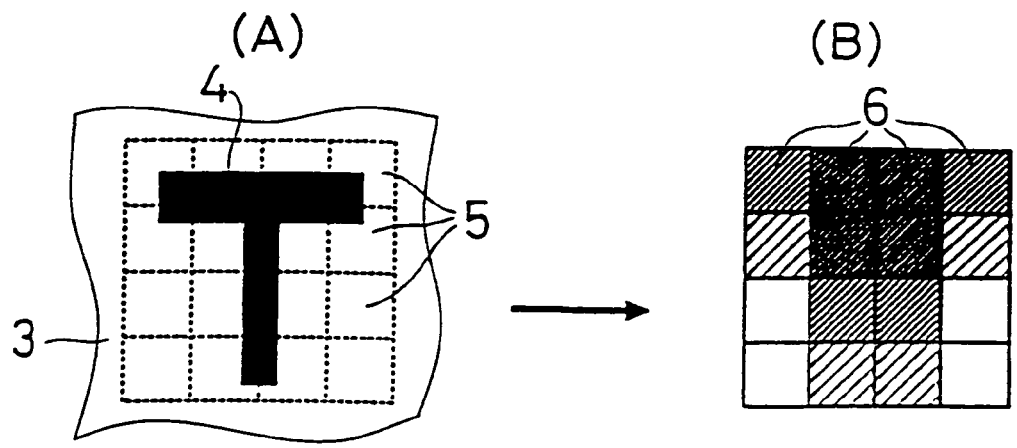
FIG. 25A is a view showing a manuscript having print dots smaller than the display pixels of the display screen in the conventional technology.
FIG. 25B is a view showing a display screen displaying the manuscript of FIG. 25A.
Figure 26:
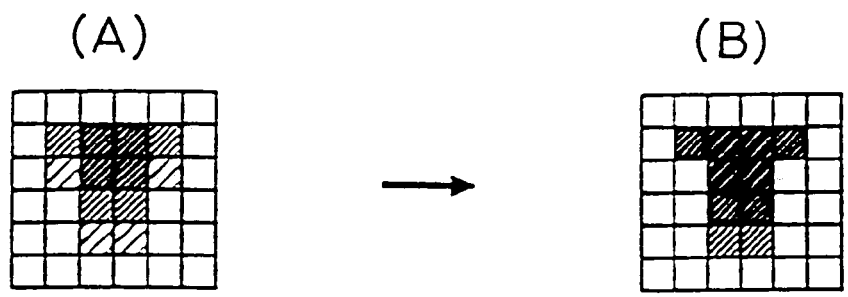
FIGS. 26A and 26B are views showing an image not subjected to a sharpening process and an image subjected to the sharpening process in the conventional technology.

FIG. 22 is a block diagram showing the electrical configuration of an image processing device 121 in accordance with a fourth embodiment of the invention. In the image processing device in accordance of the fourth embodiment, the devices, data and tables having the same configurations as those in the image processing device in accordance of the first embodiment are designated by the same numeral codes, and their explanations are omitted. The image processing device 121 comprises a data generation device 123 and a data browsing device 124. The data generation device 123 comprises an image input device 33, a data processing device 34 and a memory medium writing device 126. The data browsing device 124 comprises a memory medium reading device 127 and a display device 35.

The data processing device 34 subjects the image data input from the image input device 33 to a predetermined image correction process to generate output image data, and supplies the output image data to the memory medium writing device 126. At this time, the image correction process is carried out on the basis of the display characteristics of the display device 35 of the data browsing device 124. The memory medium writing device 126 writes the output image data on a memory medium 128. The memory medium is attained by a floppy disk or CD-ROM for example. The memory medium 128 can be removably loaded in the memory medium writing device 126 and the memory medium reading device 127. The memory medium on which the output image data has been written is removed from the memory medium writing device 126, and loaded in the memory medium reading device 124. The memory medium reading device 127 reads the output image data from the memory medium 128 and supplies to the display device 35. The display device 35 displays an image on its display screen on the basis the supplied image.

In the image processing device 121 having the configuration, the data generation device 123 can be used as the so-called authoring system for electronic publishing, and the data browsing device 124 can be used as a device for browsing the so-called electronic publications of electronic publishing. In this case, the memory medium 128 memorizes, as an electronic publication, a plurality of image data items representing each entire page of contents as a single image. Since the image data is subjected to the image correction process, the reduction in the visibility of the image owing to bias in gradation characteristics, the contrast of the image and the resolution of the image is prevented from occurring on the image displayed on the display screen of the display unit 35. Therefore, the characters described in the image displayed on the display screen can be made easy to read while the resolution of the display screen of the display device 35 of the data browsing device 124 is kept at the resolution of the conventional technology. Accordingly, at the time of generating electronic publications, time and labor for proofreading can be saved and the generation process can be simplified; at the same time, the characters can be made easy to read while the impression of the appearance of the sentences printed on each page of the contents is kept unchanged.

In this way, in the image processing device 121, the data generation device 123 can be separated from the data browsing device 124. Therefore, the image processing device 123 is not limited to comprise a single data generation device 123 and a single data browsing device 124, but it may comprise a plurality of data generation devices 123 and a single data browsing device 124, it may comprise a single data generation device 123 and a plurality of data browsing devices 124, or it may comprise a plurality of data generation devices 123 and a plurality of data browsing devices 124. Furthermore, instead of the data processing device 34, one of the data processing device 81 of the image processing device of the second embodiment and the data processing device 101 of the image processing device of the third embodiment may be used.

In the explanations of the image processing devices in accordance with the first to fourth embodiments, it is assumed that the input image data is a monochrome image. These image processing devices can use color images as input image data. In the case where the input image data is data of the type of the so-called RGB signals, that is, data comprising a red luminance signal component, a green luminance signal component and a blue luminance signal component, the process procedure of the image processing device will be described in brief. In the case, in order to subject the input image data to a luminance conversion process for contrast correction and gradation correction, the image processing device first extracts only the luminance signal components from the input image data. Next, the luminance signal components are used to generate lookup tables for gradation correction and contrast correction. Furthermore, the lookup tables are acted on the original image, that is, the color signal components of the input image data of the type of the RGB signals to obtain the output image data. The luminance component data is a Y signal among the data of the type of the so-called YUV signals.

Furthermore, in order to subject the input image data to a sharpening process in the case, the image processing device first extracts the luminance signal component (the Y signal) from the input image data and carries out a character region extraction process by using only the luminance signal component. Next, a selective sharpening process on the basis of the character region obtained by the character extraction process is carried out for the original image, that is, the color signal components of the input image data of the type of the RGB signals to obtain output image data.

The image processing devices in accordance with the first to fourth embodiments may be attained by a computer. For this purpose, software including programs and data for making the central arithmetic processing unit of the computer carry out the image correction processes explained in FIGS. 2, 8 and 20 is memorized on a memory medium readable by the computer. This memory medium is a floppy disk or CD-ROM for example. In the case where a computer provided with an image input device and a display device is operated as the data processing device, the memory medium is first loaded in the computer, and the software in the memory medium is installed in the computer, and then the programs in the software are executed by the central arithmetic processing unit. As a result, the central arithmetic processing unit and memory in the computer operate as a data processing device; therefore, the entire computer operates as an image processing device. For this reason, the image processing devices in accordance with the first to fourth embodiments can be attained by using a general-purpose computer.

The image processing devices in accordance with the first to fourth embodiments are examples of the image processing device of the invention; and the image processing device can be embodied in other various forms, provided that the major operations thereof are identical. In particular, the detailed operations of the devices and units thereof are not limited to these operations but may be attained by other operations, provided that the same process results are obtained.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, in accordance with the invention, in consideration of the gradation characteristics of a display means and the contrast of an image to be processed at the same time, the image processing device carries out the luminance conversion of the pixels constituting the image. Therefore, in the case where the image is displayed on the display means, the reduction in the visibility of the image owing to both the contrast of the image and the gradation characteristics of the display means can be prevented.

Furthermore, in accordance with the invention, the sharpening means of the image processing device operates so that the level of the sharpening performed for the character regions in an image to be processed is higher than the level of the sharpening performed for the remaining regions other than the character regions in the image to be processed. At the same time, the luminance conversion means of the image processing device carries out the luminance conversion of the pixels of the sharpened-image on the basis of the gradation characteristics of the display device. Therefore, the reduction in the visibility of the image owing to both the difference between the resolution of the image and the resolution of the display means and the gradation characteristics of the display means can be prevented.

Moreover, in accordance with the invention, the sharpening means subjects the image to be processed to a sharpening process by using the so-called selective sharpening process. Therefore, the procedure for changing the sharpening level depending on whether the pixels to be processed by the selective sharpening process are in the character regions or the remaining regions is simplified.

Furthermore, in accordance with the invention, in order to obtain a character region, circumscribed rectangles circumscribing one or a plurality of blocks of connected pixels comprising a plurality of connected pixels having mutually similar luminance among the pixels constituting the image are obtained, and among all the circumscribed rectangles, circumscribed rectangles overlapping one another at least at portions thereof are integrated. Next, in one or a plurality of regions wherein the circumscribed rectangles in the image are used as contours, a region wherein the difference between the maximum value and the minimum value of the luminance values of the plurality of pixels in the regions is a predetermined reference difference value or more is extracted as a character region. Therefore, in the case where at least one character is drawn in the image, the circumscribed rectangle circumscribing the character can be extracted easily as a character region.

Moreover, in accordance with the invention, in order to obtain a character region, circumscribed rectangles circumscribing a plurality of blocks of connected pixels comprising a plurality of connected pixels having mutually similar luminance among the pixels constituting the image are obtained, and among all the circumscribed rectangles, circumscribed rectangles overlapping one another at least at portions thereof are integrated. Next, in a plurality of regions wherein the circumscribed rectangles in the image are used as contours, a plurality of circumscribed rectangles arranged on a straight line are extracted easily as character regions. Therefore, in the case where sentences are drawn in the image, only the circumscribed rectangles circumscribing the characters constituting the sentence can be extracted as character regions.

Furthermore, in accordance with the invention, in the image processing device, the contrast of the image to be processed can be improved higher than the original contrast of the image by the contrast correction means in addition to the sharpening process by the sharpening means and the luminance correction process by the luminance correction means. Therefore, the reduction in the visibility of the image owing to the contrast of the image can be prevented further.

Moreover, in accordance with the invention, the contrast detection means changes the contrast estimation method depending on whether the curve representing the appearance frequency of the luminance in the histogram of the luminance of the pixels constituting the image has two distinct rising portions or not. Therefore, the contrast of the image can be surely obtained at all times regardless of the relationship between the number of pixels having the luminance corresponding to the color of the character and the number of the pixels having luminance other than the luminance.

Furthermore, in accordance with the invention, in the case where the luminance of each pixel of the image to be processed is represented by the sum of the three color components, the character region is extracted on the basis of the sum of the three color components, the sharpening process is carried out for the three color components individually, and the luminance correction on the basis of the gradation characteristics of the display device is also carried out for the three color components individually. Therefore, even in the case where the image is a color image, the image processing device can prevent the reduction in the visibility of the image owing to both the difference between the resolution of the image and the resolution of the display means and the gradation characteristics of the display means.

Moreover, in accordance with the invention, by the image processing method of the invention, in consideration of the gradation characteristics of the display means and the contrast of the image to be processed at the same time, the luminance conversion of the pixels constituting the image is carried out. Therefore, in the case where the image is displayed on the display means, the reduction in the visibility of the image owing to both the contrast of the image and the gradation characteristics of the display means can be prevented.

Furthermore, in accordance with the invention, by the image processing method of the invention, a selective sharpening process wherein the level of the sharpening performed for the character regions is higher than the level of the sharpening performed for the remaining regions is carried out for the image to be processed, and a luminance conversion process on the basis of the gradation characteristics of the display means are carried out for the image. Therefore, the reduction in the visibility of the image owing to both the difference between the resolution of the image and the resolution of the display means and the gradation characteristics of the display means can be prevented.

What is claimed is:

1. An image processing device comprising:
  display means having predetermined gradation characteristics;
  image input means for inputting an image composed of a plurality of pixels;
  contrast estimation means for estimating contrast of the image; and
  luminance correction means for correcting luminance of each of the plurality of pixels constituting the image based on a function derived from estimated contrast and said predetermined gradation characteristics of said display means,
  wherein the luminance correction means corrects the luminance of each of the plurality of pixels by making the luminance data linearly symmetrical with said predetermined gradation characteristics of said display means and
  the display means displays the image in which the luminance of each of the pixels has been corrected by the luminance correction means.

2. An image processing device comprising:
  display means having predetermined gradation characteristics;
  image input means for inputting an image composed of a plurality of pixels;
  character region extracting means for extracting a character region in which characters are drawn, from the image;
  sharpening means for carrying out sharpening for remaining regions other than the character region in the image at a predetermined sharpening level and for carrying out sharpening for the character region at a sharpening level higher than the level of the sharpening performed for the remaining regions; and
  luminance correction means for correcting luminance of each of the plurality of pixels constituting the character region and the remaining regions subjected to the sharpening based on said predetermined gradation characteristics of said display means,
  wherein the luminance correction means corrects the luminance of each of the plurality of pixels by making the luminance data linearly symmetrical with said predetermined gradation characteristics of said display means and
  the display means displays the image in which the luminance of each of the pixels has been corrected by the luminance correction means.

3. The image processing device of claim 2,
  wherein the sharpening means independently obtains the luminance $g(x, y)$ of each of the sharpened pixels by substituting the luminance $f(x, y)$ of each of the plurality of pixels constituting the image and the coefficient h(x, y) of the sharpening level of each of the pixels into the following expression:

$$g(x,y)=f(x,y)-h(x,y)\times \Box^2 f(x,y)$$

and
the coefficient h(x, y) of the sharpening level of each of the pixels is a predetermined first constant αi in the case where each of the pixels is in the remaining regions, and the coefficient is a second constant αc larger than the first constant αi in the case where each of the pixels is in the character regions.

4. The image processing device of claim 2,
wherein the character region extracting means converts the luminance of each of the plurality of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and
from among regions of the circumscribed rectangles used as contours in the image, the character region extracting means extracts a region in which the difference between the maximum value and minimum value of luminance of the plurality of pixels in the respective regions is not less than a reference difference value, as a character region.

5. The image processing device of claim 2,
wherein the character region extracting means converts the luminance of each of the plurality of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and
from among regions in the image with the circumscribed rectangles used as contours, the character region extracting means extracts regions arranged in nearly parallel with a predetermined reference axis line as character regions.

6. An image processing device of claim 2, further comprising:
contrast estimation means for estimating contrast of the image, and
contrast correction means for raising the contrast of the image on the basis of estimated contrast.

7. The image processing device of claim 2, wherein, in the case where the luminance of each of the plurality of pixels is represented by the sum of predetermined three color components, the character region extracting means extracts character regions on the basis of the sum of the three color components, the sharpening means individually sharpens the three color components, and the luminance correction means individually corrects the three color components.

8. An image processing method comprising the steps of:
inputting an image composed of a plurality of pixels;
estimating contrast of the image;
correcting luminance of each of the plurality of pixels constituting the image on the basis of a function derived from estimated contrast and gradation characteristics of display means for displaying the image; and
displaying the image, in which the luminance of each of the plurality of pixels has been corrected, on the display means,
wherein correcting luminance includes correcting the luminance of each of the plurality of pixels by making luminance data linearly symmetrical with the gradation characteristics of the display means.

9. An image processing method comprising the steps of:
inputting an image composed of a plurality of pixels;
extracting character regions with drawn characters in the image;
sharpening remaining regions other than the character regions in the image at a predetermined sharpening level and sharpening the character regions in the image at a sharpening level higher than the level of the sharpening performed for the remaining regions;
correcting the luminance of each of the plurality of pixels constituting the character regions and the remaining regions subjected to the sharpening on the basis of the gradation characteristics of display means for displaying the image; and
displaying the image, in which the luminance of each of the plurality of pixels has been corrected, on the display means
wherein correcting luminance includes correcting the luminance of each of the plurality of pixels by making the luminance data linearly symmetrical with the gradation characteristics of display means.

10. The image processing device of claim 1,
wherein the contrast estimate means estimates contrast (Lv, Hv) as contrast of the input image, which is defined by a combination of luminance Lv corresponding to a color of lines and dots generated in the input image and luminance Hv corresponding to a color of a background of the input image, and
the luminance correction means raises the contrast (Lv, Hv) of the input image to a maximum of contrast (Vmin, Vmax) which is defined by a combination of lower limit of luminance Vmin and upper limit of luminance Vmax of possible luminances, so that a lower luminance and higher luminance of luminances Lv, Hv which define the contrast of the input image are converted to the lower limit of luminance Vmin and upper limit of luminance Vmax.

11. The image processing method of claim 8,
wherein the estimated contrast (Lv, Hv) is defined by a combination of luminance Lv corresponding to a color of lines and dots generated in the input image and luminance Hv corresponding to a color of a background of the input image, and
wherein the contrast (Lv, Hv) of the input image is raised to a maximum of contrast (Vmin, Vmax) which is defined by a combination of lower limit of luminance Vmin and upper limit of luminance Vmax of possible luminances, so that a lower luminance and higher luminance of luminances Lv, Hv which define the contrast of the input image are converted to the lower limit of luminance Vmin and upper limit of luminance Vmax.

12. An image processing device of claim 6,
wherein the contrast estimation means generates a histogram of luminance of pixels constituting the image, and
the histogram provides a first luminance value corresponding to a maximum value of frequency in the histogram in a first range which ranges from a predetermined reference luminance to a maximum of luminance which can be taken by the pixels, the histogram provides a maximum value of frequency in the histogram in a second range of values which is not less than a minimum of luminance which can be taken by the pixels and less than the reference luminance, and if the maximum value of the frequency in histogram in the second range is not less than a predetermined reference value, then the contrast estimation means estimates the contrast of the image on the basis of the first luminance value and the luminance value corresponding the maximum value of the frequency in the histogram in the second range, and if the maximum value of the frequency in the histogram in the second range is less than the reference value, the contrast estimation means estimates the contrast of the image on the basis of the first luminance value and the lowest luminance value among the luminance values of all the pixels constituting the image.

13. The image processing device of claim 1, wherein the luminance correction means corrects the luminance of each of the plurality of pixels by making the luminance data linearly symmetrical with the gradation characteristics so that the gradation characteristics of the display means are linear.

14. The image processing device of claim 2, wherein the luminance correction means corrects the luminance of each of the plurality of pixels by making the luminance data linearly symmetrical with the gradation characteristics so that the gradation characteristics of the display means are linear.

15. An image processing device comprising:
display means having predetermined gradation characteristics;
image input means for inputting an image composed of a plurality of pixels;
contrast estimation means for estimating contrast of the image; and
luminance correction means for correcting luminance of each of the plurality of pixels constituting the image based on a function derived from estimated contrast and said predetermined gradation characteristics of said display means,
wherein the luminance correction means corrects the luminance of each of the plurality of pixels so as to reduce nonlinearity of said predetermined gradation characteristics of said display means and
the display means displays the image in which the luminance of each of the pixels has been corrected by the luminance correction means.

16. The image processing device of claim 15,
wherein the contrast estimate means estimates contrast (Lv, Hv) as contrast of the input image, which is defined by a combination of luminance Lv corresponding to a color of lines and dots generated in the input image and luminance Hv corresponding to a color of a background of the input image, and
the luminance correction means raises the contrast (Lv, Hv) of the input image to a maximum of contrast (Vmin, Vmax) which is defined by a combination of lower limit of luminance Vmin and upper limit of luminance Vmax of possible luminances, so that a lower luminance and higher luminance of luminances Lv, Hv which define the contrast of the input image are converted to the lower limit of luminance Vmin and upper limit of luminance Vmax.

17. The image processing device of claim 15, wherein the luminance correction means corrects the luminance of each of the plurality of pixels with the gradation characteristics so that the gradation characteristics of the display means are linear.

18. An image processing device comprising:
display means having predetermined gradation characteristics;
image input means for inputting an image composed of a plurality of pixels;
character region extracting means for extracting a character region in which characters are drawn, from the image;
sharpening means for carrying out sharpening for remaining regions other than the character region in the image at a predetermined sharpening level and for carrying out sharpening for the character region at a sharpening level higher than the level of the sharpening performed for the remaining regions; and
luminance correction means for correcting luminance of each of the plurality of pixels constituting the character region and the remaining regions subjected to the sharpening based on said predetermined gradation characteristics of said display means,
wherein the luminance correction means corrects the luminance of each of the plurality of pixels so as to reduce nonlinearity of said predetermined gradation characteristics of said display means and
the display means displays the image in which the luminance of each of the pixels has been corrected by the luminance correction means.

19. The image processing device of claim 18,
wherein the sharpening means independently obtains the luminance g(x, y) of each of the sharpened pixels by substituting the luminance f(x, y) of each of the plurality of pixels constituting the image and the coefficient h(x, y) of the sharpening level of each of the pixels into the following expression:

$$g(x,y)=f(x,y)-h(x,y)\times\nabla^2 f(x,y)$$

and
the coefficient h(x, y) of the sharpening level of each of the pixels is a predetermined first constant αi in the case where each of the pixels is in the remaining regions, and the coefficient is a second constant ac larger than the first constant αi in the case where each of the pixels is in the character regions.

20. The image processing device of claim 18,
wherein the character region extracting means converts the luminance of each of the plurality of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and
from among regions of the circumscribed rectangles used as contours in the image, the character region extracting means extracts a region in which the difference between the maximum value and minimum value of luminance of the plurality of pixels in the respective regions is not less than a reference difference value, as a character region.

21. The image processing device of claim 18,
wherein the character region extracting means converts the luminance of each of the plurality of pixels constituting the image into binary form, obtains one or more blocks of connected pixels composed of a plurality of pixels having mutually equal binary-coded luminance, obtains the circumscribed rectangles circumscribing the blocks of connected pixels, and integrates the circumscribed rectangles overlapping with one another at least at portions into a single circumscribed rectangle, and from among regions in the image with the circumscribed rectangles used as contours, the character region extracting means extracts regions arranged in nearly parallel with a predetermined reference axis line as character regions.

22. An image processing device of claim 18, further comprising:

contrast estimation means for estimating contrast of the image, and contrast correction means for raising the contrast of the image on the basis of estimated contrast.

23. An image processing device of claim 18, wherein the contrast estimation means generates a histogram of luminance of pixels constituting the image, and the histogram provides a first luminance value corresponding to a maximum value of frequency in the histogram in a first range which ranges from a predetermined reference luminance to a maximum of luminance which can be taken by the pixels, the histogram provides a maximum value of frequency in the histogram in a second range of values which is not less than a minimum of luminance which can be taken by the pixels and less than the reference luminance, and if the maximum value of the frequency in histogram in the second range is not less than a predetermined reference value, then the contrast estimation means estimates the contrast of the image on the basis of the first luminance value and the luminance value corresponding the maximum value of the frequency in the histogram in the second range, and if the maximum value of the frequency in the histogram in the second range is less than the reference value, the contrast estimation means estimates the contrast of the image on the basis of the first luminance value and the lowest luminance value among the luminance values of all the pixels constituting the image.

24. The image processing device of claim 18, wherein, in the case where the luminance of each of the plurality of pixels is represented by the sum of predetermined three color components, the character region extracting means extracts character regions on the basis of the sum of the three color components, the sharpening means individually sharpens the three color components, and the luminance correction means individually corrects the three color components.

25. The image processing device of claim 18, wherein the luminance correction means corrects the luminance of each of the plurality of pixels by making the luminance data linearly symmetrical with the gradation characteristics so that the gradation characteristics of said display means are linear.

26. An image processing method comprising the steps of:

inputting an image composed of a plurality of pixels;

estimating contrast of the image;

correcting luminance of each of the plurality of pixels constituting the image on the basis of a function derived from estimated contrast and gradation characteristics of display means for displaying the image; and displaying the image, in which the luminance of each of the plurality of pixels has been corrected, on the display means, wherein correcting luminance includes correcting the luminance of each of the plurality of pixels so as to reduce nonlinearity of the gradation characteristics of the display means.

27. The image processing method of claim 26, wherein the estimated contrast (Lv, Hv) is defined by a combination of luminance Lv corresponding to a color of lines and dots generated in the input image and luminance Hv corresponding to a color of a background of the input image, and wherein the contrast (Lv, Hv) of the input image is raised to a maximum of contrast (Vmin, Vmax) which is defined by a combination of lower limit of luminance Vmin and upper limit of luminance Vmax of possible luminances, so that a lower luminance and higher luminance of luminances Lv, Hv which define the contrast of the input image are converted to the lower limit of luminance Vmin and upper limit of luminance Vmax.

28. An image processing method comprising the steps of:

inputting an image composed of a plurality of pixels;

extracting character regions with drawn characters in the image;

sharpening remaining regions other than the character regions in the image at a predetermined sharpening level and sharpening the character regions in the image at a sharpening level higher than the level of the sharpening performed for the remaining regions;

correcting the luminance of each of the plurality of pixels constituting the character regions and the remaining regions subjected to the sharpening on the basis of a function derived from the gradation characteristics of display means for displaying the image; and displaying the image, in which the luminance of each of the plurality of pixels has been corrected, on the display means wherein correcting luminance includes correcting the luminance of each of the plurality of pixels so as to reduce nonlinearity of the gradation characteristics of display means.

* * * * *

UNITED STATES PATENT AND TRADEMARK OFFICE
CERTIFICATE OF CORRECTION

PATENT NO. : 7,283,683 B1  
APPLICATION NO. : 09/600936  
DATED : October 16, 2007  
INVENTOR(S) : Mitsuaki Nakamura et al.

It is certified that error appears in the above-identified patent and that said Letters Patent is hereby corrected as shown below:

On Title Page

Added to the list of references cited: please add

Item 56  
--ADOBE: "Adobe Photoshop 3 LE Online Guide" XP001152033 October 1995 (1995-10).--

Signed and Sealed this

First Day of April, 2008

JON W. DUDAS  
*Director of the United States Patent and Trademark Office*